United States Patent
Turner et al.

(10) Patent No.: US 6,957,417 B2
(45) Date of Patent: Oct. 18, 2005

(54) METHOD AND SYSTEM FOR ASSEMBLING AND UTILIZING COMPONENTS IN COMPONENT OBJECT SYSTEMS

(75) Inventors: Stephen J. Turner, Twickenham (GB); Patrick M. Hogan, Austin, TX (US); William E. Gibson, Epson (GB)

(73) Assignee: Computer Associates Think, Inc., Islandia, NY (US)

( * ) Notice: Subject to any disclaimer, the term of this patent is extended or adjusted under 35 U.S.C. 154(b) by 615 days.

(21) Appl. No.: 09/800,597

(22) Filed: Mar. 6, 2001

(65) Prior Publication Data

US 2001/0018648 A1 Aug. 30, 2001

Related U.S. Application Data

(63) Continuation of application No. 08/845,583, filed on Apr. 25, 1997, now Pat. No. 6,230,309.

(51) Int. Cl.[7] .................................................. G06F 9/44
(52) U.S. Cl. ...................................................... 717/108
(58) Field of Search ............................... 717/106–109, 717/114–117, 120–123

(56) References Cited

U.S. PATENT DOCUMENTS

| | | | |
|---|---|---|---|
| 5,019,961 A | 5/1991 | Addesso et al. ............ 700/87 |
| 5,295,222 A | 3/1994 | Wadhwa et al. ............ 717/104 |
| 5,487,141 A | 1/1996 | Cain et al. .................. 715/764 |
| 5,627,979 A | 5/1997 | Chang et al. ............... 715/763 |
| 5,632,022 A | * 5/1997 | Warren et al. .............. 345/776 |
| 5,659,723 A | 8/1997 | Dimitrios et al. ....... 707/103 R |
| 5,659,751 A | 8/1997 | Heninger .................... 719/332 |
| 5,673,199 A | 9/1997 | Gentry ......................... 703/1 |
| 5,675,801 A | 10/1997 | Lindsey ....................... 717/108 |
| 5,729,746 A | * 3/1998 | Leonard ....................... 717/101 |
| 5,758,351 A | 5/1998 | Gibson et al. ............ 707/104.1 |
| 5,787,287 A | * 7/1998 | Bharadwaj ................... 717/144 |
| 5,845,119 A | * 12/1998 | Kozuka et al. ............... 717/107 |
| 5,864,862 A | 1/1999 | Kriens et al. ............ 707/103 R |
| 5,872,973 A | * 2/1999 | Mitchell et al. ............. 709/332 |
| 5,907,846 A | 5/1999 | Berner et al. ........... 707/103 R |
| 5,953,524 A | * 9/1999 | Meng et al. ................ 717/108 |
| 5,991,535 A | 11/1999 | Fowlow et al. ............. 717/107 |
| 6,029,207 A | 2/2000 | Heninger ..................... 719/331 |

OTHER PUBLICATIONS

Wang et al. Assembling Software with the Reuseable Components in a Library. IEEE. 1998. pp. 176–181.*
Capretz et al. Component–based Software Development. 2001. IEEE. pp. 1834–1837.*
Wang et al. Component Assembly for OO Distributed Systems. IEEE. 1999. pp. 71–78.*

(Continued)

*Primary Examiner*—Wei Y. Zhen
(74) *Attorney, Agent, or Firm*—Fish & Richardson P.C.

(57) ABSTRACT

A design tool for assembling component objects to form an object-based computer system application includes a declarative user input interface mechanism and a design engine. The declarative user input interface mechanism provides an input structure for the input of user declarations specifying operative interactions between component objects. The design engine automatically generates, in response to input user declarations, an application design definition modeling an application infrastructure for managing component object interactions. The design engine automatically generates, in response to input user declarations, a match between an application view field definition and a parameter of an associated component object operations. A runtime tool includes an application engine which is responsive to an application design definition and is operative at runtime automatically to create application view instances from respective application view definitions for managing runtime component object interactions for the applications.

25 Claims, 38 Drawing Sheets

OTHER PUBLICATIONS

Kraig Brockschmidt, "Inside Ole," Second Edition, Microsoft Press, Copyright © 1995 by Kraig Brockschmidt.

"CORBA Services: Common Object Server Specification," Revised Edition, Mar. 31, 1995, OMB Document No. 95-3-31, located at http://www.omg.org/docs/1995/95-03-31.pdf, last accessed on Mar. 8, 1999.

Rational Rose 4.0, Rational Rose Corporation, CA, 1996.

Mittermeir, et al. "Software bases and software archieves", IEEE, pp. 21-28, Jul. 1987.

Floch et al. "Supporting evolution and maintenance by using a flexible automatic code generator", ICSE ACM pp. 211-219, Jan. 1995.

Wu, et al. "StartOSphere: Mobil processing of distributed objects in Java", MOBICOM ACM pp. 121-132, 1998.

Keller, et al. "Design Components; toward software composition at the design level" IEEE pp. 302-311, Jul. 1987.

* cited by examiner

FIG. 15

| EVENT / EFFECT | POSITION ON | POSITION OFF | RESET | CLEAR | EXPAND | CONTRACT |
|---|---|---|---|---|---|---|
| INPUT | X | X | | | | |
| LISTING | DEP | DEP | X* | X | | |
| ADD ROW | DEP | DEP | | | X | |
| DELETE ROW | DEP | DEP | | DEP | | X |
| DETAIL | X | X | | | | |
| UPDATE | DEP | X | | | | |
| UNCLASSIFIED | | | | | | |

X: ALLOWED COMBINATION
DEP: ALLOWED ON DEPENDENT APPLICATION VIEWS
INPUT – ONLY USES INPUT VALUES
UPDATE – INPUT ATTRIBUTE VIEW ANY CONTAIN USER SUPPLIED VALUES
* IDENTIFIES SINGLE DEFAULT LISTING OPERATION

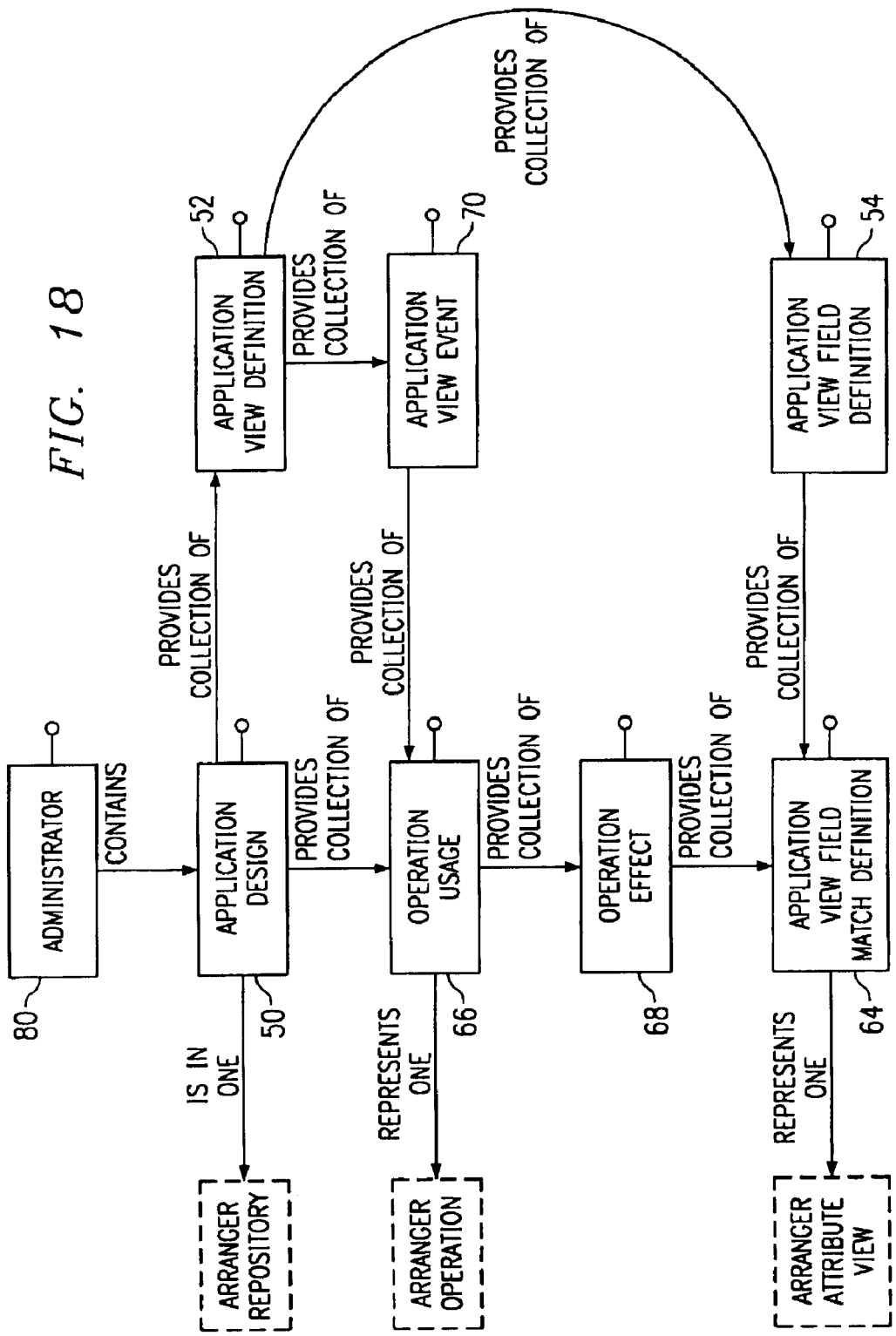

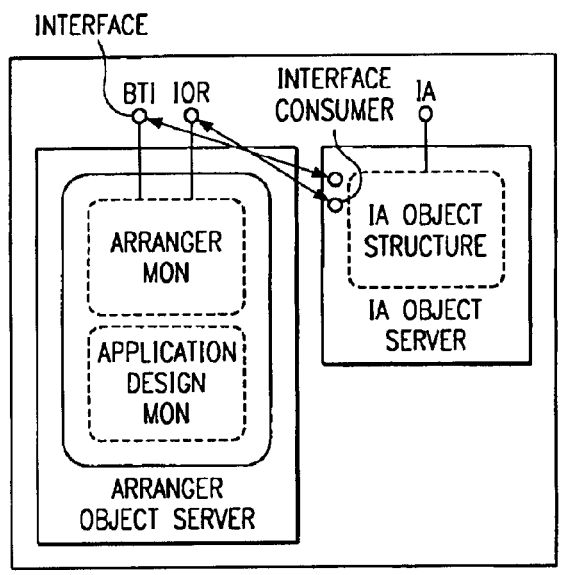
FIG. 39
FIG. 40
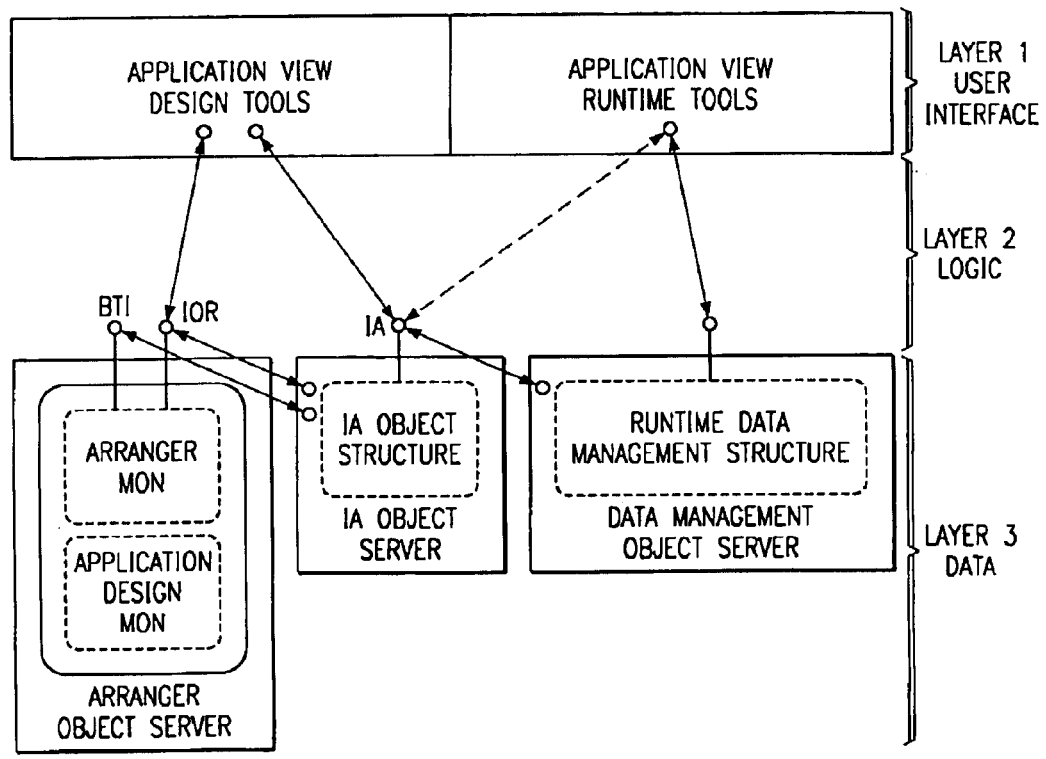

METHOD AND SYSTEM FOR ASSEMBLING AND UTILIZING COMPONENTS IN COMPONENT OBJECT SYSTEMS

CROSS REFERENCE TO RELATED APPLICATION

This application is a continuation of U.S. application Ser. No. 08/845,583, filed Apr. 25, 1997 now U.S. Pat. No. 6,230,309 and entitled "Object-Based Computer Systems".

FIELD OF THE INVENTION

This application relates to object-based computer systems and applications, and in particular to the automatic generation and management of object-based computer system applications.

BACKGROUND OF THE INVENTION

Description of the Prior Art

Object-based computing systems, in particular distributed object computing systems, are increasingly being adopted as an effective means of enabling business information systems to respond more rapidly to changes in business needs. This is achieved today by making available programs and subprograms as components in an object-based computing system, and manually configuring those components into applications.

Increasingly powerful desktop computers can provide graphical human-computer interfaces for access to applications modelled on the real world. Business information applications running on the desktop computers typically need to collaborate with programs running on shared 'server' computers. The server computers may be microprocessor-based systems, or alternatively minicomputer or mainframe computer systems.

The advent of object-based computing systems provides a possibility for reusability of components in complex applications like business information applications. Before the use of object-based systems, complex applications were typically based on purpose-built collections of cooperating modules or components which were constructed with little thought to their reusability.

The use of proprietary protocols for messages exchanged between components and the lack of standards for describing the format and meaning of arguments passed between the components typically meant that components were poorly optimised for reuse. The result of the poor optimisation for reuse is that the creation of new applications built of such components takes considerable time due to the necessity to create the "glue" for connecting those components.

There is considerable pressure on application developers to reduce the application development cycle time from the identification of needs to the delivery of a solution. Assembling applications from reusable components offers the potential to reduce this cycle time.

A number of proprietary computing environments and systems allow components to be made available as "black boxes" to the rest of the computing environment. Examples of this are the Object Linking and Embedding (OLE) environment from Microsoft Corporation (OLE is a trademark of Microsoft Corporation), the Distributed System Object Model (DSOM) environment from IBM Corporation, the Common Object Request Broker Architecture (CORBA) specification managed by the Object Management Group (OMG) and the Arranger environment from Texas Instruments Software. Details of the OLE environment can be found in "Inside OLE", 2nd Edition by K Brockschmidt published in 1995 by Microsoft Press ISBN 1-55615-843-2. Details of CORBA can be found in "CORBA Services: Common Object Server Specification", Revised Edition, 31 Mar. 1995, OMG Document Number 95-3-31.

The environmental system provides a standard way to define a component so that other components or applications within the computing environment may be assembled to use the services (or features) of any other component. A component is defined here as an executable module which implements a useful, clearly defined unit of functionality and provides a well defined interface such that the details of its underlying implementation are not visible externally. A component may be used a part of another component, used in the provision of applications, or used directly by the end user of the computing environment.

FIG. 1 of the accompanying drawings shows an example of an application 10 assembled from two components 12 and 14. A first component 12 supplies a list of customers and the second component provides a list of orders for a particular customer. To build this application, the designer needs to find the desired components, represent the desired components in a user interface and provide a way for a chosen customer from the customer component 12 to be supplied to the list order service of the order component 14.

As mentioned above, a mechanism for providing support for the concept of a component in such environments is the use of an object-oriented model. Under this model, objects implement components and the operations of an object implement the services of a component. Thus the process of assembling components is actually achieved through the use of objects and their operations.

The Arranger product mentioned above provided a significant step towards a reduction in application development cycle times by providing an infrastructure for supplying components ready for assembly. However, the process of assembling components into end applications remains a largely manual process. As has been illustrated with reference to FIG. 1, the application designer needs to:

identify the components of interest;

write program code that defines how each component will be used by the application, including describing how information received from one component will be used by another component; and represent information from components to the end user of the application through the use of software routines and the provision of a graphical user interface.

In the object-oriented model, objects provide access to objects via units of software functionality, usually referred to as operations or methods. An operation is generally thought of as having two parts, namely an external definition and an internal implementation.

The internal implementation is specified as algorithms or rules and turned into an executing unit via suitable tools. The algorithm may act on the particular object to which the operation belongs and may also invoke any operation of any other object within the scope of the system, subject to any constraints of the system.

However, to a client which requires access to a component object, the internal implementation is of little interest. Indeed, it is often only physically present in the computing environment as compiled computer code. In contrast, a client which requires access to an operation would have at least some part of the external definition of the operation available. The mechanism varies with the object system, but at some level it is possible to discover how the operation is invoked and what it does.

The external definition of an operation, of a specific object, may also include the object to which it applies, and may also include a number of additional parameters or argument definitions. Typically, the parameters are defined in the formal syntax of the object system. Other defined information may also be available such as non-formal descriptions of the parameters, formal and non-formal descriptions of the operation, formal and non-formal precondition information. FIG. 2 of the accompanying drawings is a schematic representation of this.

Parameters define elements which will either be used (inputs), returned (outputs), or used and returned (inputs and outputs) by the operation. In general, the definition of parameters is limited only by the scope of the system, i.e. a parameter can potentially be any object or data type value within the scope of the system.

For example, suppose an operation to return information about the "Orders a Customer has Placed" is required. This could be defined as an operation called, say "List Orders for Customer", for which the customer is a required input parameter, and for which outputs include a list of orders, a count of the total number of orders and the last order fulfilled. FIG. 3 of the accompanying drawings is a schematic representation of this.

To carry out some user task or function in an application which utilises a component object system, the use of one or more operations is required, often from different objects (components). In most cases, for the task to be achieved, information output by one operation is required as input to another operation to achieve some overall effect. For example, with reference to FIG. 4 of the accompanying drawings, a "List Orders for Customer" operation 20 might also be used in conjunction with a "List Customers" operation 22, a "Customer Details" operation 24, an "Add New Order for Customer" operation 26, and a "Total Invoice for Customer" operation 28.

Given such a set of operations, application designers typically write computer algorithms (the 'glue' between operations) to carry out the flows or information or information mappings as part of the process of assembling a new component or application. In addition, the designer must ensure that required input information is available in the right format for an operation to run successfully. For example, a "List Orders for Customer" operation 20 might require a single "Customer ID" as an integer data type, but a "List Customers" operation 22 may supply a list of values as string data types. FIG. 4 illustrates this glue as flow lines having arrow heads between operations. When the application is run, information is passed along the flow lines in accordance with the defined algorithms.

Apart from ensuring an accurate mapping of information between relevant operations, the designer also needs to provide a user interface for the end user to have an understanding of and to be able to interact with the component objects being used by the application.

In addition to writing computer algorithms to pass information between the operations, the designer will normally use some internal, intermediate representation of the information encompassed within the scope of that set of operations. Frequently, the designer will use language or environment features such as variables, arrays or collections to organise these intermediate representations. Part or all of these representations are typically translated to the human-computer interface to provide the user with an understanding of the state of the objects and to allow the user to interact with the objects. FIG. 5 of the accompanying drawings illustrates this as arrowhead lines between the operations identified in FIG. 4 and a user interface 30. For example, the designer may define algorithms to present the list of customers returned by the "List Customers" operation 22 in the computer user interface and translate the user interface representation of the chosen customer into the input parameters of the "List Orders for Customer" operation 20. The outputs of this operation will in turn be presented in the computer user interface.

When considering user interface representations, the designer must also comprehend and provide a mechanism for managing the interaction of related information from operations. For example, in an application which shows a list of customers and a list of orders for a customer, if the end user changes, the selected customer of the application should refresh the list of orders by running a suitable operation.

In general, therefore, the designer must provide a mechanism which:

clears related information when specified operations are run (eg, clearing the customer details displayed in the user interface if another customer is selected);

reset related information (by running other operation(s)) when specified operations are run (for example running the "List Orders" operation if another customer is selected);

get further information about a particular object by running another operation (for example running the "Customer Details" operation whenever a customer is selected); and update information about a particular object by running another operation (eg, running the "Update Customer" operation whenever a customer value is changed).

It will be appreciated from the above that the development of new applications, even using components which are ready for assembly, is a complex task requiring significant software development times by skilled engineers.

Accordingly, an aim of the invention is to provide a mechanism which will enable application development times to be further reduced. In particular, an aim of the invention is to facilitate the generation of applications from component objects.

SUMMARY OF THE INVENTION

In accordance with an aspect of the invention, there is provided a design tool for assembling component objects to form an object-based computer system application, the design tool comprising: a declarative user input interface mechanism configured to be operable to provide an input structure for inputting user declarations specifying operative interactions between component objects; and a design engine configured to be operable automatically to generate, in response to input user declarations, an application design definition modelling an application infrastructure for managing component object interactions.

The use of a declarative user input interface mechanism and a design engine enables a user readily to describe an intended application by means of declarative statements and automatically to generate an application design definition from those declarations, which application design definition then models the application infrastructure for managing component object interactions. This removes the need for a designer to write specific program code to link components. The use of declarative statements facilitates the automation of the application assembly process, facilitates application verification and maintenance.

Preferably, the design engine is configured to be operable automatically to generate, in response to input user declarations, at least one application view definition for managing component object interactions, and to cause the application design definition to reference at least one application view definition. In this manner, a plurality of application definitions, each representing an application view, can be associated with an application design.

Preferably, an application view definition comprises one or more fields, the design engine being configured automatically to generate, in response to input user declarations, at least one application view field definition for detailing a field of the at least one application view definition. The application definition can, in this manner, be implemented as a table in a database.

Preferably, the design engine is configured automatically to generate, in response to user input declarations, at least one operation usage definition to specify an effect a component object operation has on one or more of the application view definitions. Preferably also, the design engine is configured automatically to generate, in response to input user declarations, an event definition of an operation usage triggered by an application view definition event. More preferably, the design engine is configured automatically to generate, in response to input user declarations, a match between the application view field definition and a parameter of an associated component object operation. These mechanisms facilitate the many-to-many linkages which are needed between objects to control information flow between those objects.

In accordance with another aspect of the invention, there is provided a runtime tool comprising an application engine responsive to an application design definition modelling an application infrastructure for managing component object interactions, wherein the application engine is configured to be operable at runtime automatically to create application view instances from respective application view definitions for managing runtime component object interactions for the application. The runtime tool is thereby able to interpret the application design definition in order to generate application view instances for managing runtime component object interactions.

Preferably, the application engine is configured to be operable at runtime to provide automated management of data values provided to operation, and data values provided by operations when the operations are invoked by an application view instance.

More preferably, the application engine is configured to reference the application view definitions to provide one or more of the following functions:

(a) automatically to create application views when requested;

(b) automatically to map input parameter values to an operation, for a given operation usage, from one or more application views when a user requests an operation usage to be triggered;

(c) automatically to map output parameter values from an operation to one or more application views for an operation usage, when the operation usage has been completed;

(d) to manage effects of operation usages on application views and trigger any associated application view events;

(e) to manage effects of application view events on application views and trigger any associated operations;

(f) to determine what operation usage(s) can be run on the basis of input parameter satisfaction.

In accordance with another aspect of the invention, there is provided a user interface configuration tool for automatically configuring a user interface based on an application design definition modelling an application infrastructure for managing component object interactions, the tool being configured to be operable to cause an application engine to interact with the application design definition for creating application view instances from respective application view definitions and for managing application data, the tool also being configured to be operable to display values held in the application view instances and to permit operations to be invoked.

In accordance with a further aspect of the invention, there is provided a method of assembling component objects to form an object-based computer system application in a computer system, the method comprising:

i) generating a declarative user input interface mechanism providing an input structure for inputting user declarations specifying operative interactions between component objects; and ii) automatically generating, in response to input user declarations, an application design definition modelling an application infrastructure for managing component object interactions.

The invention further provides a method of automated management of object interactions in a computer system, comprising:

responding at runtime to an application design definition, which models an application infrastructure for managing component object interactions automatically to create application view instances from respective application view definitions for managing runtime component object interactions for the application.

In accordance with yet a further aspect of the invention there is provided a method of automatically configuring a user interface based on an application design definition modelling an application infrastructure for managing component object interactions, the method comprising:

causing an application engine to create application view instances from respective application view definitions of the application design definition;

displaying values held in the application view instances; and permitting operations to be invoked.

In another aspect the invention provides a design tool program on a data storage medium the design tool program being for assembling component objects to form an object-based computer system application and comprising: a declarative user input interface mechanism configured to be operable to provide an input structure for inputting user declarations specifying operative interactions between component objects; and a design engine configured to be operable automatically to generate, in response to input user declarations, an application design definition modelling an application infrastructure for managing component object interactions.

In a further aspect the invention provides a runtime tool program on a data storage medium, the runtime tool program comprising an application engine responsive to an application design definition modelling an application infrastructure for managing component object interactions, wherein the application engine is configured to be operable at runtime automatically to create application view instances from respective application view definitions for managing runtime component object interactions for the application.

In yet a further aspect the invention provides an object-based computer system comprising a design tool program, the design tool program being for assembling component objects to form an object-based computer system application and comprising: a declarative user input interface mechanism configured to be operable to provide an input structure for inputting user declarations specifying operative interactions between component objects; and a design engine configured to be operable automatically to generate, in response to input user declarations, an application design definition modelling an application infrastructure for managing component object interactions.

In yet a further aspect the invention provides an object-based computer system comprising: an object-based computer system application; an application design definition modelling an application infrastructure for managing component object interactions, the application design definition having been generated by a design engine in response to input user declarations; and an application engine responsive to the application design definition and operable at runtime automatically to create application view instances from respective application view definitions for managing runtime component object interactions for the application.

BRIEF DESCRIPTION OF THE DRAWINGS

Exemplary embodiments of the invention are described hereinafter, by way of example only, with reference to the accompanying drawings, in which:

FIG. 15 is a table representing Event Type versus Operation Effects;

FIG. 18 is a schematic block diagram of a Object System for Application View Design;

FIG. 39 represents an extended MON to hold Application View Design information;

FIG. 40 is a schematic diagram representing the architecture of an Integration Assist mechanism (IA) Object Server;

DESCRIPTION OF THE PREFERRED EMBODIMENTS

Figure 6:
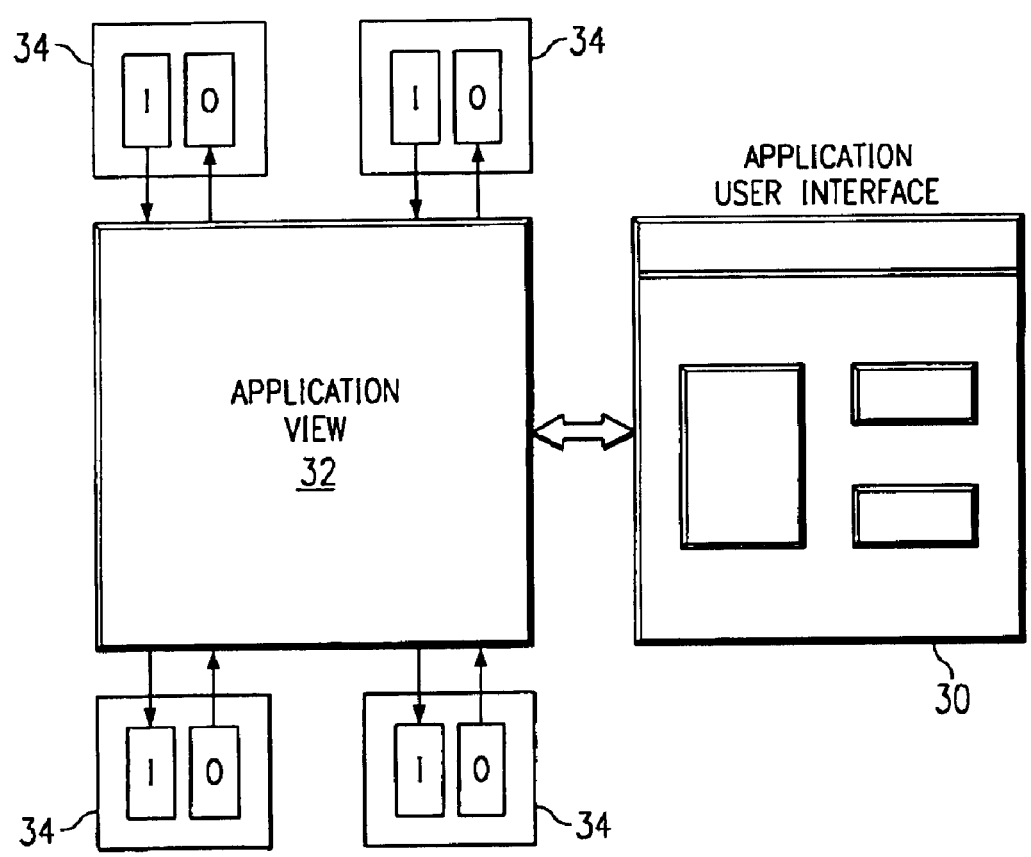
FIG. 6 is a schematic representation of the interaction of operations and a user interface via an application view in accordance with an embodiment of the invention.

Embodiments of the invention as described hereinafter provide methods and systems for declaratively specifying relationships between parameters of different operations of the same or different objects, the organisation of an intermediate representation of the parameters of operations for the purpose of user interface display in an application and the effects operations have on related information, and how operations are triggered in response to certain user interface events. These characteristics are defined by means of structure termed described herein as an Application View Definition. An individual instance (in the object sense) of an Application Definition (note "instance" loosely means a copy based on a template) is referred to as an Application Instance or Application View. These terms are also used interchangeably herein. FIG. 6 is a schematic illustration of the interaction of operations and a user interface by means of an Application View 32. The term "Data Region", which appears in the drawings, is also used loosely to refer to an Application View Definition and an Application View Instance in a particular embodiment of the invention.

Application View Definitions have a number of characteristics. In particular, an Application View Definition provides a way of specifying an intermediate representation of information for use with user interfaces. Application View Definitions generated in accordance with the invention are typically specified so as to provide a one-to-one mapping to the user interface elements of an application. They detail how operation parameters should flow between each other, via Application Views. They detail how the running of operations effects related Application Views, and how the Application Views should respond to user interface events. They detail when it is possible to run an operation which utilises information from Application Views.

An embodiment of the invention provides a mechanism for the automated creation of Application Views from their respective Application View Definitions and the automated management of the actual data values provided by operations when they are invoked. This mechanism is termed the Application (View) Engine, or Run-time Engine. In an embodiment of the invention, the Application Engine can be deployed as part of an end application.

An embodiment of the Application Engine can perform one or more of the following functions by referencing the Application View Definitions:
  automatically create Application Views when requested;
  automatically map input parameter values to an Operation from Application Views;
  automatically map output parameter values from an Operation to Application Views;
  manage the effect of Operations on Application Views and trigger associated Application View events;
  manage the effect of events on Application Views and trigger associated Operations; and
  determine what operations can be run on the basis of input parameter satisfaction.

In an embodiment of the invention, the specification of an Application View Definition can be provided as a structural layer independent from the user interface elements. It can then be reused with other user interface element arrangements, whilst preserving the mapping of information flows between operations. This means that specifications can be shared between applications which conform to the same underlying object computing model.

Since Application View Definitions provide for a declarative mapping of operation parameters, Application View Definitions are easy to maintain and can be subject to automated testing and verification methods. An embodiment of the invention can be used as a method (perhaps with CASE tool support) during the analysis and design of computer systems. The method would involve:
  the ability to allow users to express their visual data requirements of application requirements as Application View Definitions;
  a method for translating a user interface into appropriate Application View Definitions (or vice versa);
  the ability to specify the definition of operations which would work within Application View Definitions to provide actual data values.

In the following, there follows a description of examples of Application View Designs as generated in accordance with embodiments of the invention.

Figure 7A:
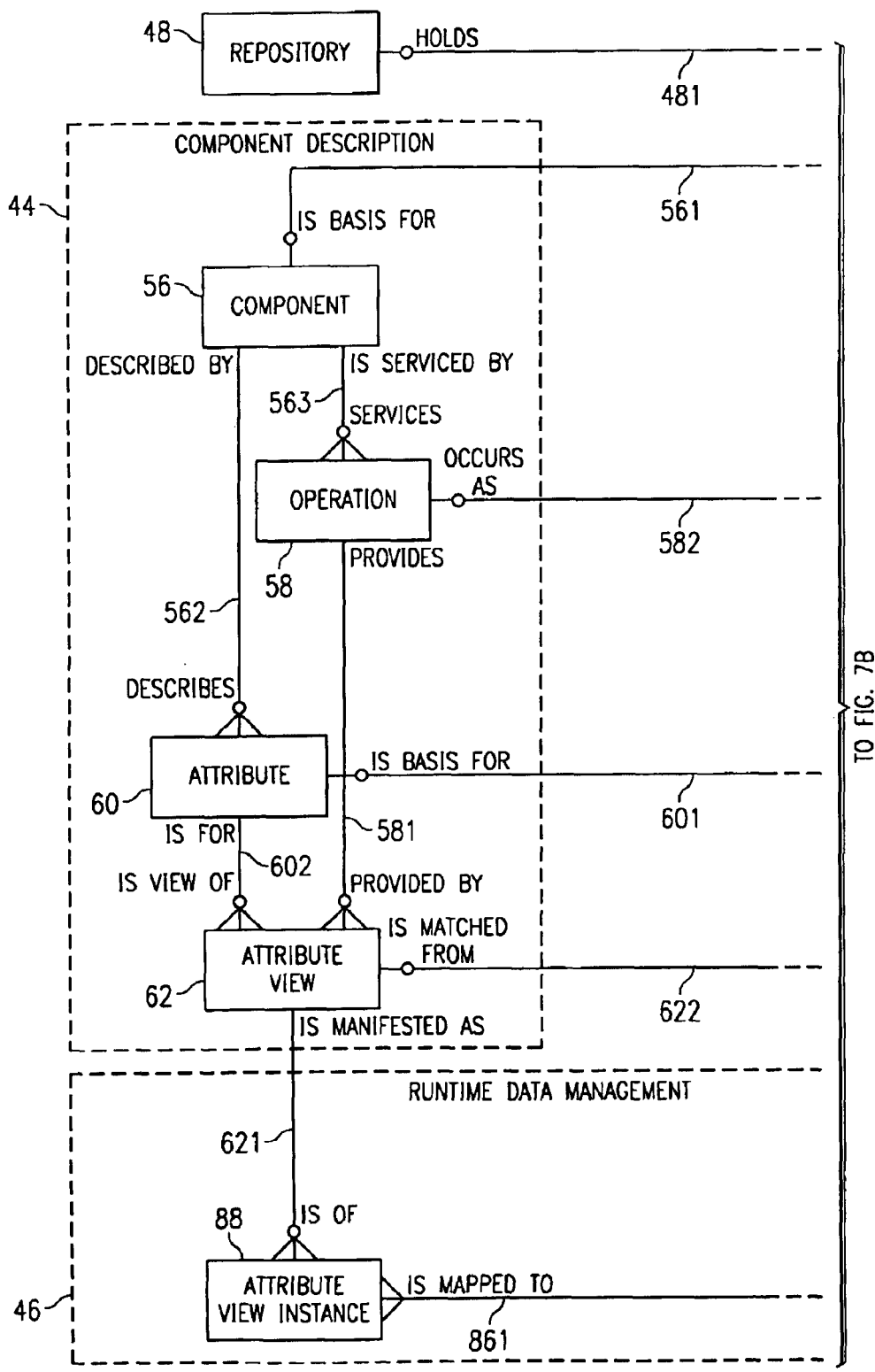
FIGS. 7A–7C are general example of schematic block diagrams of the Application Design concept embodied in the invention.
Figure 7B:
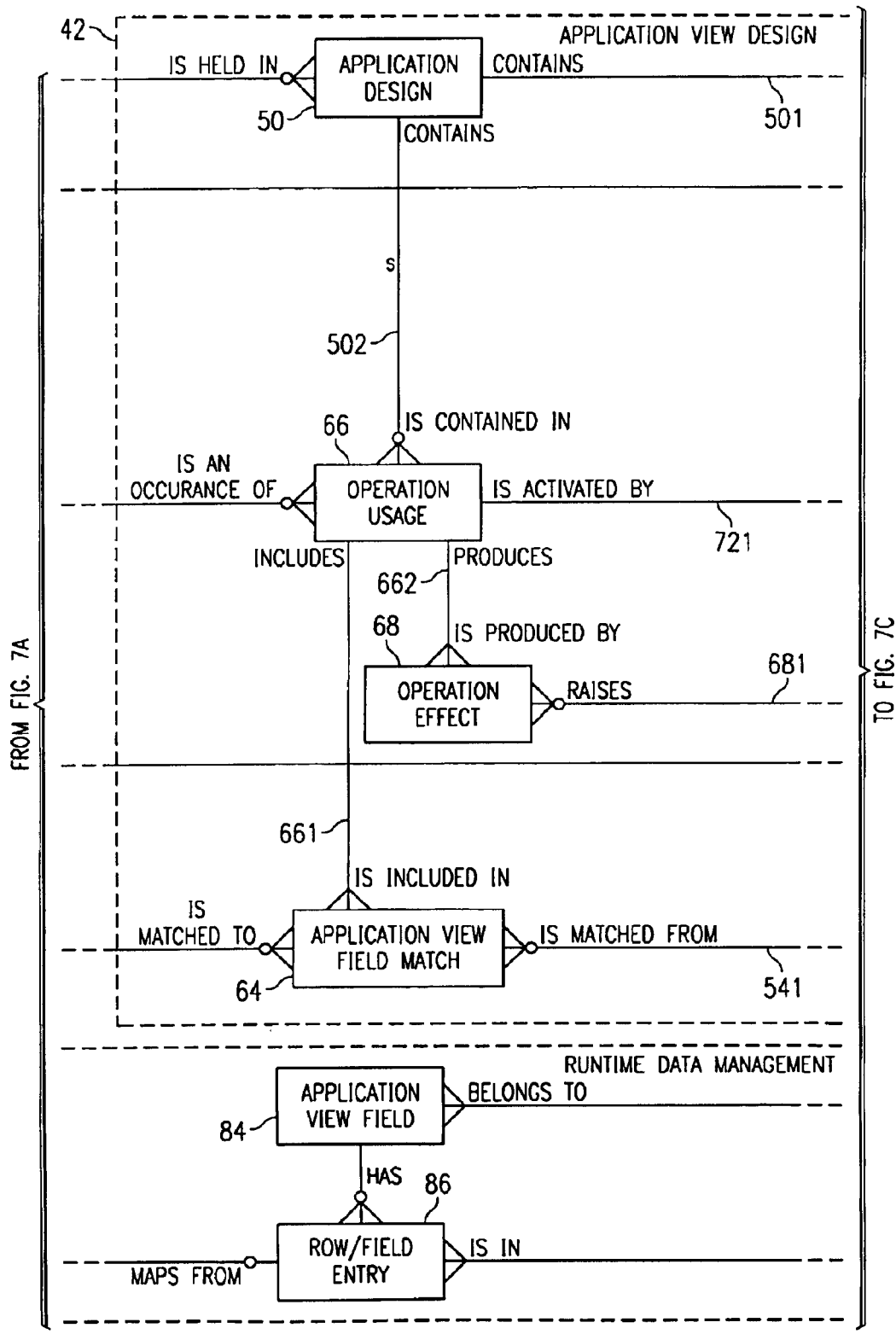
Figure 7C:
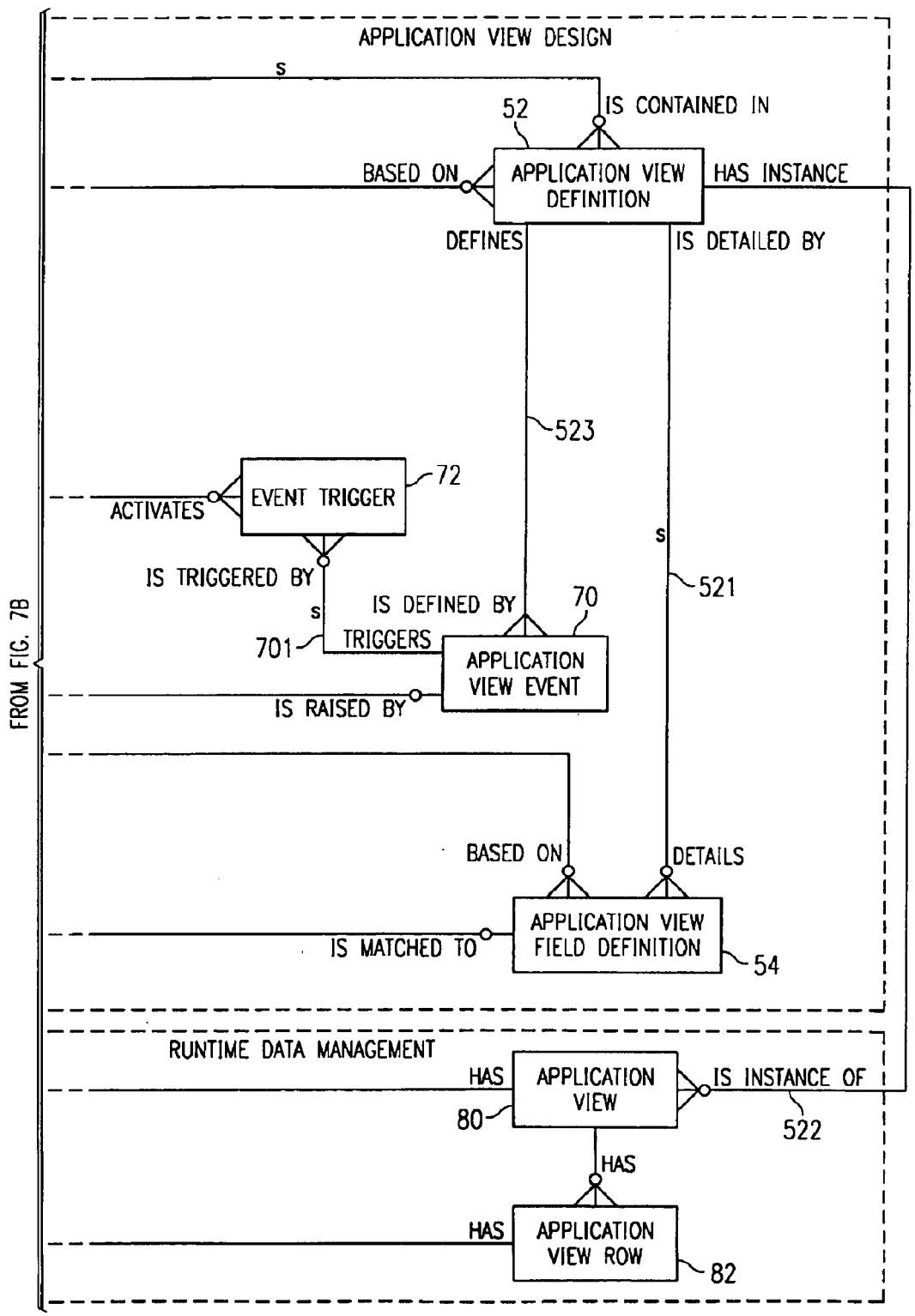

FIG. 7 is a schematic block diagram of a general example of an Application Design model 40 in accordance with the invention. It will be understood that the general representation of FIG. 7 is merely one possible example and many changes, modifications and/or additions could be made in other embodiments of the invention.

In FIG. 7, each block represents an entity type. The relationship between entity types is depicted by relationship lines in accordance with standard notation. Each entity type can be thought of as having a common set of properties, namely:
  name—the full name given to a specific object (this can be thought of as a unique identifier for the object—each object will require a value for this property);
  description—a human-readable description of a specific object.

There are three basic sections to the model 40 shown in FIG. 7. The Application View Design area 42 covers the entity types used to hold the definition of Application Views. The Component Description 44 covers the features of components exploited by Application Views. The Runtime Data Management area 46 describes the objects which hold actual instances of Application Views. The Application View Design 42 and Component Description 44 areas capture the information which describes the composition of Application Views, and their relationship to a description of specific components.

The Repository 48 is used as a starting point or "root object" for the Application Views. There can in principle be many Application Designs (each made up of potentially many Application Views). Consequently, it is advantageous to think of the collection of Application Designs being available from some artefact, such as the Repository 48. The Repository 48 is said optionally to hold {481} zero, one or more Application Designs. The Repository object can be manifested in a computer system by persistent storage capable of holding one or more Application Designs.

An Application Design 50 holds design information pertinent to one application. This object conceptually provides the root object for a description of all elements which describe the composition and workings of the user interface components within an application which are visible to, or working on behalf of, some user.

Any Application Design is expected to contain {501} zero, one or more Application View Definitions 52 and to contain {502} zero, one or more Operation Usages 66. As Application View Definitions 52 may be presented to the user, it is useful to hold them in a user-specified sequence (symbol s).

Figure 8:
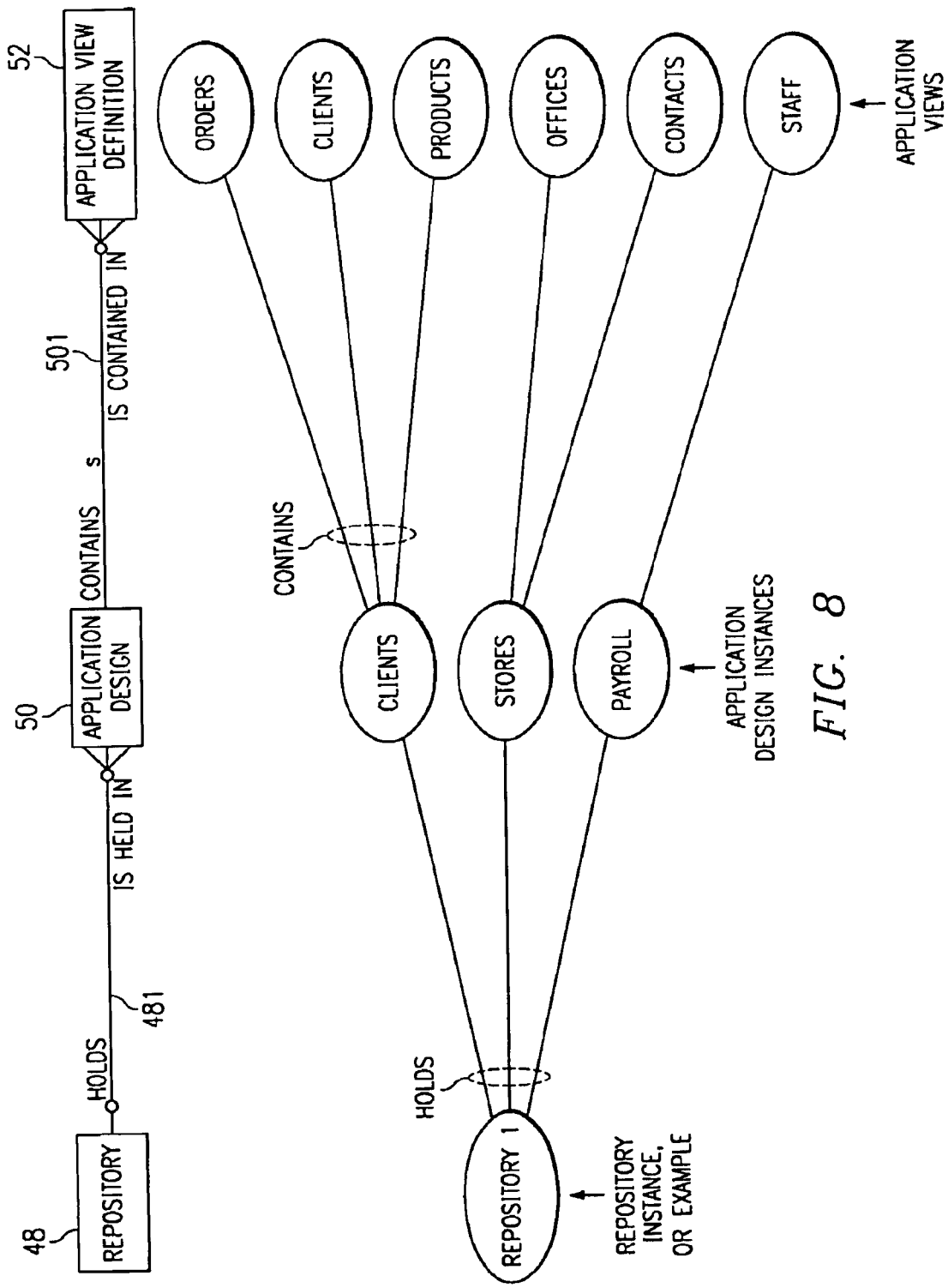
FIG. 8 illustrates a Application Definition detail of FIG. 7.

FIG. 8 is an entity model fragment and corresponding instance diagram for an Application Design.

An Application View Definition 52 is contained in {501} or utilised by one or more specific Application Designs 50. FIG. 7 shows one Application View Definition 52 for ease of representation purposes only.

Typically, an Application Design 50 will contain many Application View Definitions 52, with each one being used for a different purpose. Each Application View Definition 52 is detailed by {521} one or more Application View Field Definitions 52. This can be compared to a database table being described by a series of columns. Further, an Application View Definition 52 may be based on {561} a specific Component 56. FIG. 7 assumes that there is only one Component 56 for ease of representation, although in fact an Application View Definition may be based on a plurality of Components 56.

An individual instance of an Application View Definition 52 is referred to as an Application View 80. The model allows there to be many instances {522} of a specific Application View Definition 52, but typically there will only be one. An Application View 80 inherits the properties of its Application View Definition 52. An Application View 80 can be created from its corresponding definition at any time. However, it is useful to think of an Application View 80 being created from the corresponding Application View Definition 52 by the Application Engine at runtime.

An Application View Definition 52 can have the following properties:

Max Rows—the expected maximum number of rows in any occurrence of the Application View Definition;

Used Rows—the number of rows currently populated with information;

Current Row—the current row in an Application View (the value of this changes as the user selects one row or another, with the first row being default current row and at runtime this value being maintained by the Application Engine);

Definitions

Static Dependent Application View—an Application View Y is dependent on an Application View X if any of the populating operations which provide output values to the Application View Y take input values from the Application View X;

Last Populating Operation—the last populating operation which ran to provide (output) values for an Application View;

Dependent Application View—at runtime, a Dependent Application View is determined by the Last Populating Operation, where an Application View is dependent on all Application Views which supplied input to its Last Populating Operation;

Rules

1. An Application View is related to another Application View if one or more of the operations which provide values to the Application View take values from another Application View;

2. In the general case where such operations require single value inputs, the current row of the related Application View(s) is used to supply values;

3. Operations of Dependent Application Views which take inputs from the parent cannot be run if there is no current row in a parent Application View which can satisfy required input;

4. Events on the parent Application View may have an effect on the Dependent Application Views.

An Application View Field Definition 54 details {521} a specific Application View Definition 52. In principle, the same Application View Field Definition 54 could provide details for many Application View Definitions 52, but FIG. 7 illustrates only one Application Field Definition 54 associated with the Application View Definition 52 for ease of representation.

Figure 9:
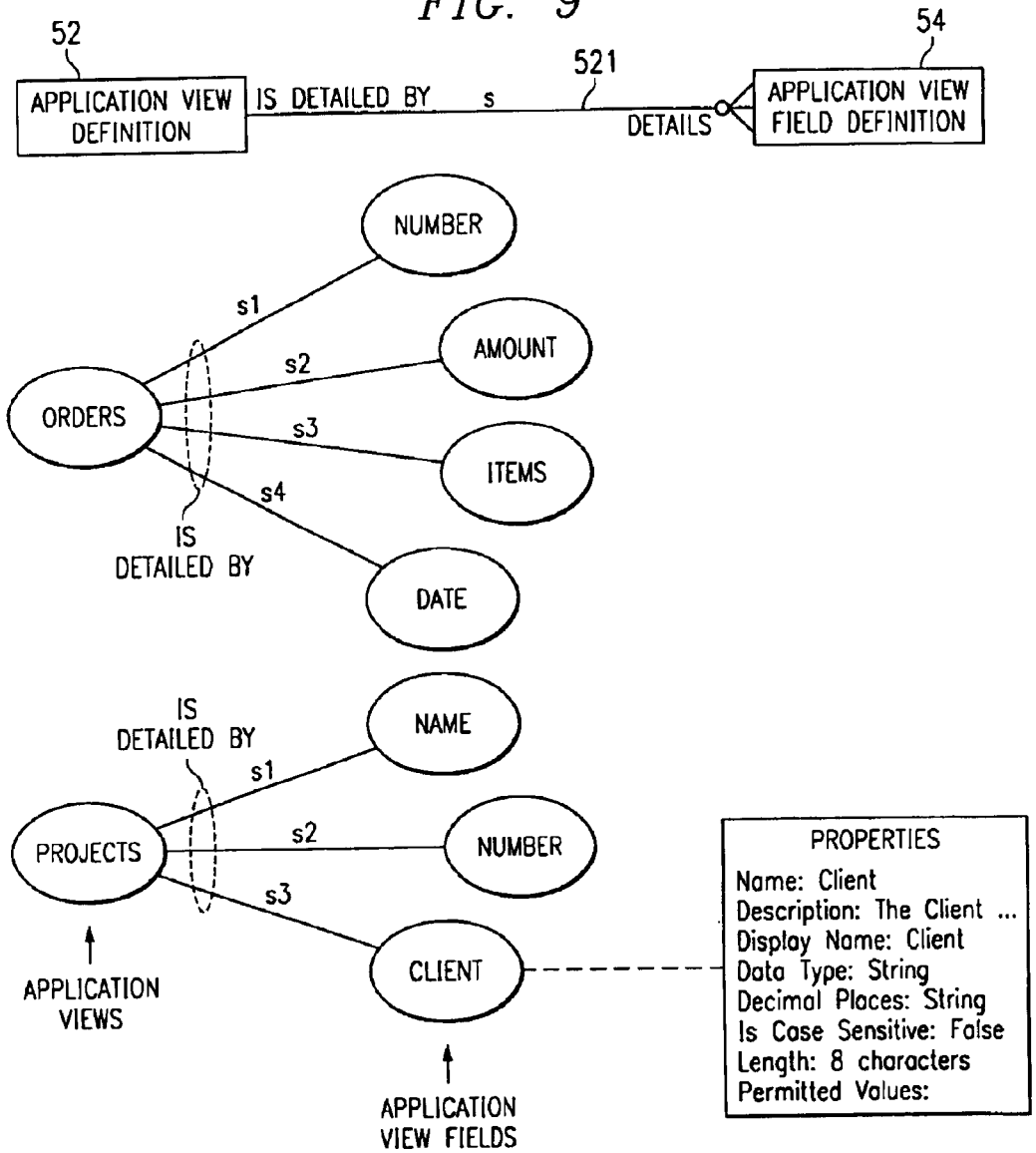
FIG. 9 illustrates an Application View detail of FIG. 7.

FIG. 9 represents the composition of an Application View. An individual instance of an Application View Field Definition 54 is referred to as an Application View Field 84.

The purpose of an Application View Field Definition 54 is to describe the nature of values which may occur in an Application View Field 84. Each element of the description is held as a property (or other related entity type). The nature of the elements being described is dependent upon the particular implementation, but the following properties are typical of those which are used to describe general characteristics:

Display Name—a user representation of the name for a field;

Data Type—the data type of the given field;

Decimal Places—the number of decimal places for the given fields;

Default Value—the default value for the given field;

Description—the description of a given field;

Is Case Sensitive—set if the given field is case sensitive;

Length—returns the maximum length of this field;

Permitted Values—a permitted value is set for this field, if the field has permitted values.

The Application View Field Definition 54 may be based on {601} an Attribute 60. In that case, the value of its properties will reflect that of the Attribute or at least obey a set of transformation rules which allow values to coexist. For example, the length property value may be smaller than that of the Attribute 60 in which case any Application View Field Value could be copied into an instance of an Attribute 60 without transformation. However, reversing the action and copying from an Attribute instance into an Application View Field 54 would require transformation rules to reduce the length of any value.

A Component 56 is an artefact which provides the user with a set of services to carry out some task. The state of any Component 56 may be reflected in properties associated with the Component 56, although these properties themselves may be accessed by services, depending on a particular implementation.

Where objects implement Components 56, the Operations 58 of an object implement the services of a Component 56, and its properties are expressed as Attributes 60.

Figure 10:
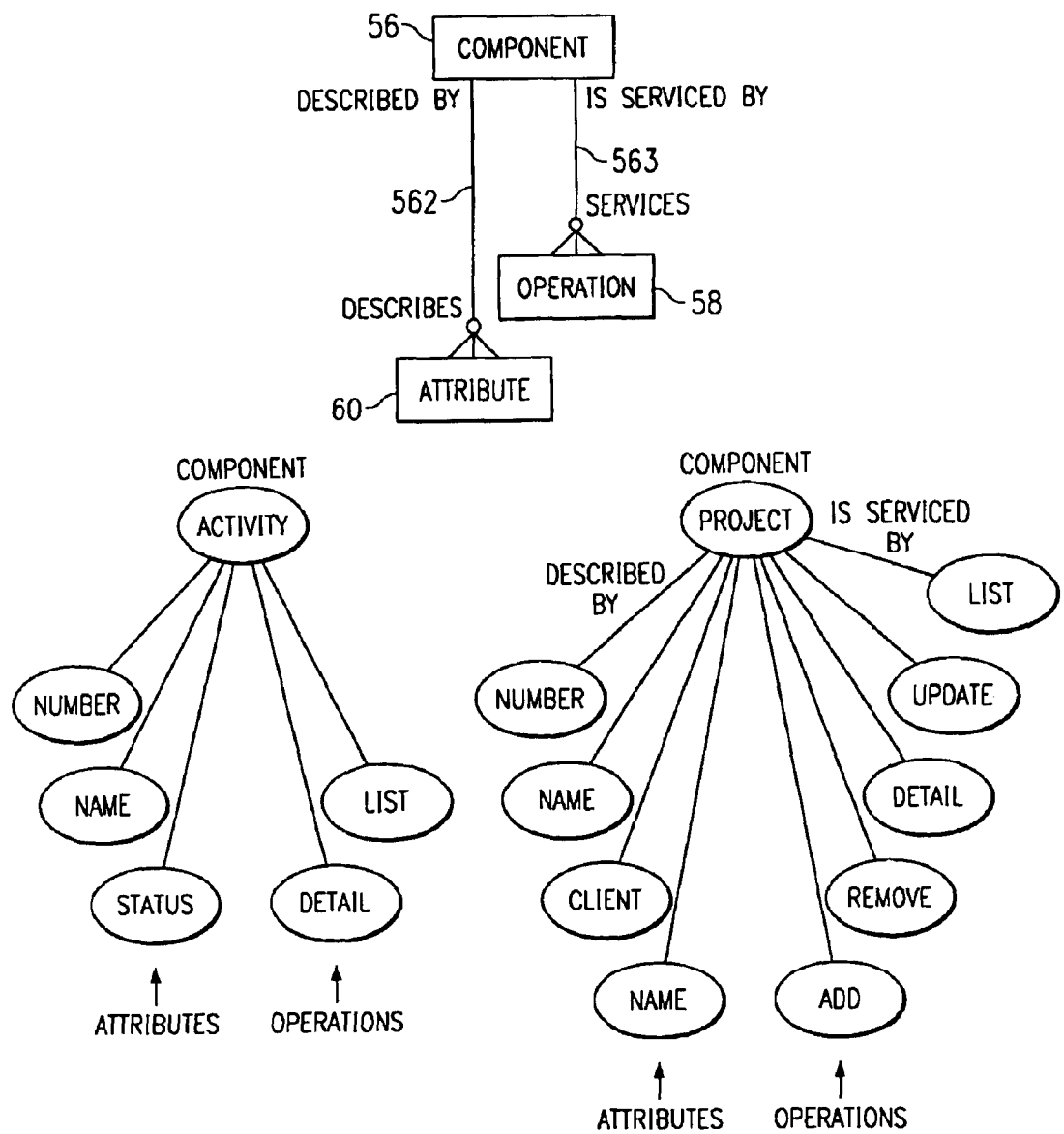
FIG. 10 illustrates a Component detail of FIG. 7.

An Operation 58 is a unit of functionality associated with {563}, and operating on, a specific Component 56. In software, Operations 58 are manifested as computer code, and associated with an object by underlying mechanisms of the operating system or environment. FIG. 10 is a schematic representation representing the relationship of a Component 56 to Attributes 60 and Operations 58.

An Operation 58 may also provide {581} or use a number of additional parameters or Attribute Views 62. These are used to supply values to and/or from the Operation 58.

One or more Attributes 60 describe {562} a Component 56. Each element of the description is held as a property (or other related entity type). The nature of the elements being described is dependent on the particular implementation, but the following properties are typical of those for describing general characteristics:

Display Name—a user representation of the name for an attribute;

Data Type—the data type of the given attribute;

Decimal Places—the number of decimal places for the given attribute;

Default Value—the default value for the given attribute;

Description—the description of the given attribute;

Is Case Sensitive—set if the given field is case sensitive;

Length—returns the maximum length of this attribute;

Permitted Values—the permitted value is set for this attribute if the attribute has permitted values;

Optional—this indicates whether a value for this attribute is always required or not.

An Attribute View 62 holds the definition of information to be passed to/from an Operation 58. In general, each Operation 58 may provide {581} zero, one or more Attribute Views 62. Attribute Views 62 have a number of properties to describe the information to be passed. This includes those of the Attribute 60 itself and also properties to capture:

IsRequired—whether the Attribute View is required by the Operation;

IsRepeating—whether the given Attribute View has a set of values or a single value;

MaxRepeats—the maximum number of repetitions for this Attribute View;

NumberOfValues—the number of values currently present for the given Attribute View;

AttributeName—the name of the corresponding Attribute for this Attribute View;

Input/Output—the direction of information flow for the Attribute, this being input to the Operation, output from the Operation, or both.

Figure 11:
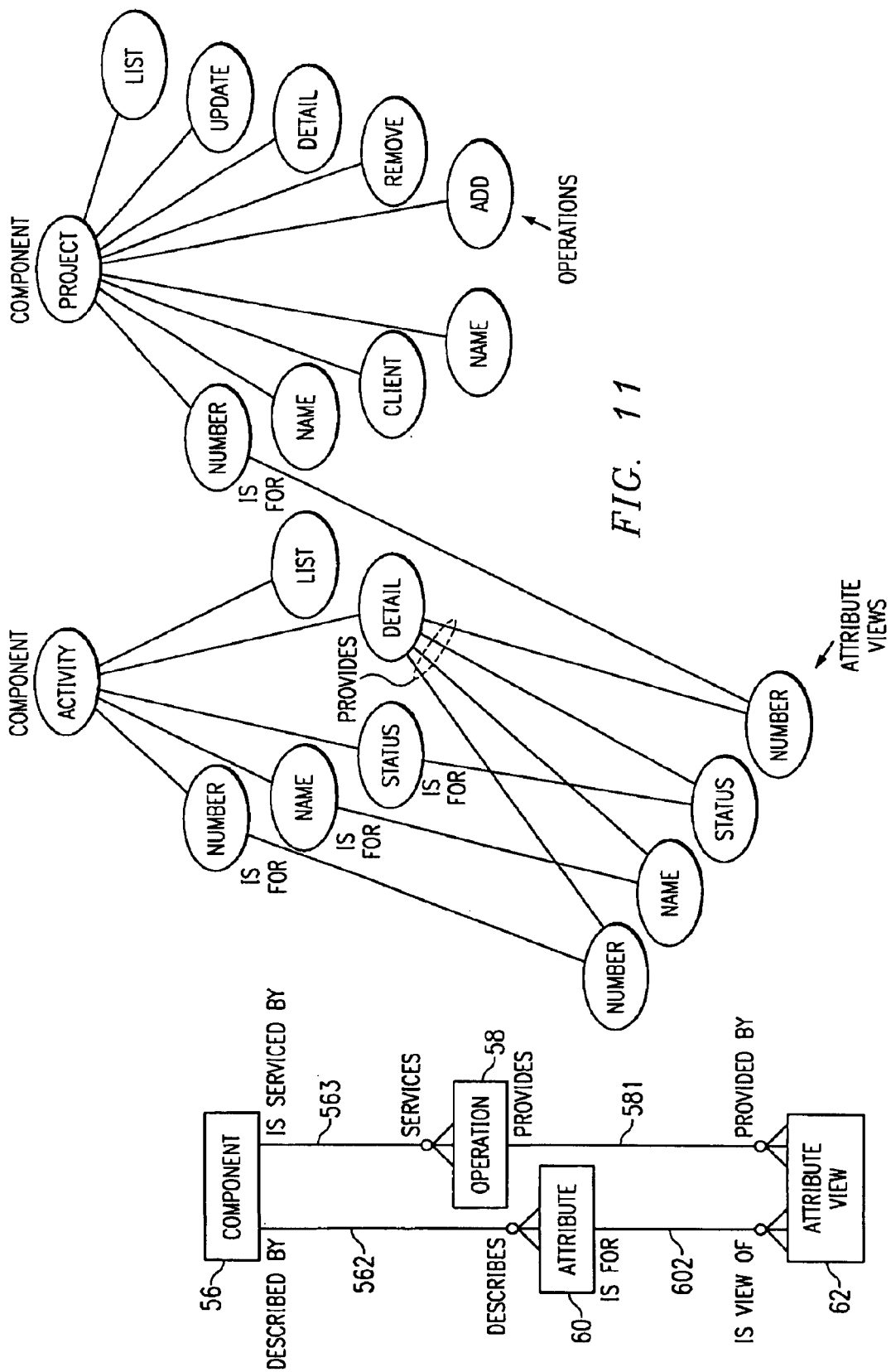
FIG. 11 illustrates Attribute Views for an Operation Activity Detail of FIG. 7.

Other properties are likely to be needed depending on specific implementation needs. FIG. 11 is a schematic representation showing Attribute Views 62 for the Operation 58 activity detail. It is to be noted that one number relates {602} to an Attribute 60 of an activity, whilst the other number relates {602} to an Attribute 60 of a project.

The properties of an Attribute View 62 reflect that of the Attribute 60 the Attribute View is representing. Thus, an Attribute View 62 is thought of as being a view of {602} an Attribute 60 which in turn describes a Component 56, but not necessarily the one which the Operation 58 services.

At runtime, whenever an Operation 58 is run, a set of Attribute Views 62 for an Operation 58 are manifested as {621} Attribute View Instances.

An Application View Field Match object 64 defines the flow of information between Application View Field Definitions 54 and Attribute Views 62. Any Operation Usage 66 includes {661} a set of Application View Field Matches 64 for that particular Operation Usage 66.

An individual Application View Field Match object 64 is matched from {541} a particular Application View Field Definition and is matched to {622} a specific attribute view.

Figure 12:
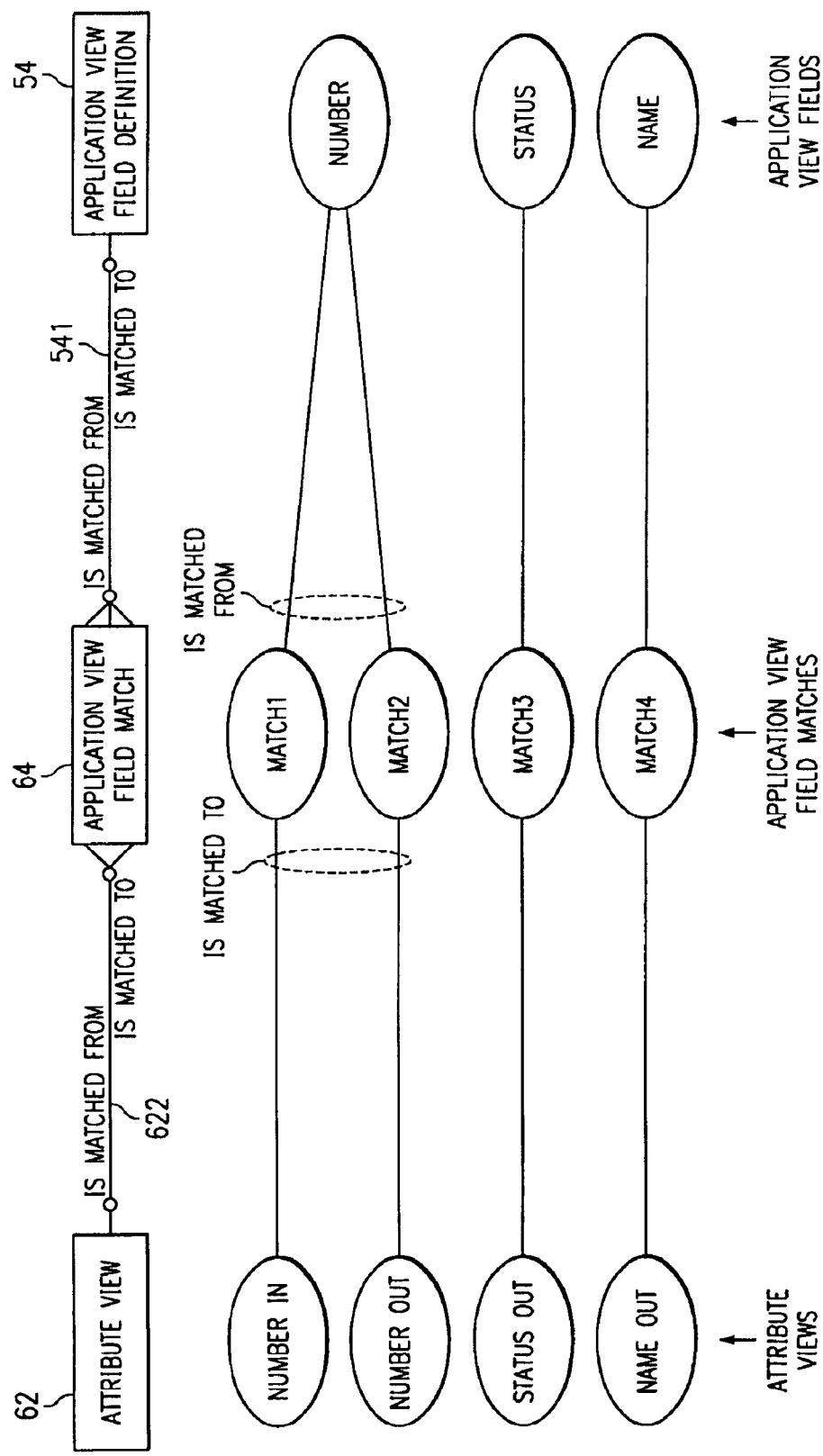
FIG. 12 represents an Application View Field Match detail of FIG. 7.

FIG. 12 is a schematic representation of the matching of Attribute Views 62 to Application View Fields. An Application View Field Match 64 provides a number of definitions:

Mapping (Operations to Application Views)—when an Operation is run, the Application Engine will use this information to move information between Attribute View Instances 88 and Application View Fields 84. This process is referred to as Mapping;

Mapping Rules—the collection of Application View Field Matches 64 for a particular Operation Usage 66 are said to be the mapping rules for an Operation Usage 66;

Transformation Rule—each Application View Field Match 64 may be provided a data display interpretation expression (e.g. translating "M" into "Male", "F" into "Female") for a specific Field Match from an Attribute View to a Field Definition. This is used at runtime to convert a value between a Attribute View Instance 88 and a Row Field Entry 86 and vice versa.

An Overwrite Property of the Application View Field Match 64 is applicable only to each Application View Field Match against Attribute Views of an input type and indicates whether any value supplied from an external source should be taken in preference to any current value held in an Application View Field 84 when values are mapped into an Operation's input Attribute Views 62 immediately prior to running the Operation 58. The default is not to allow overwrite except for Operation Usages 66 with an Operation Effect 68 of type Update or Add Row.

Figure 13:
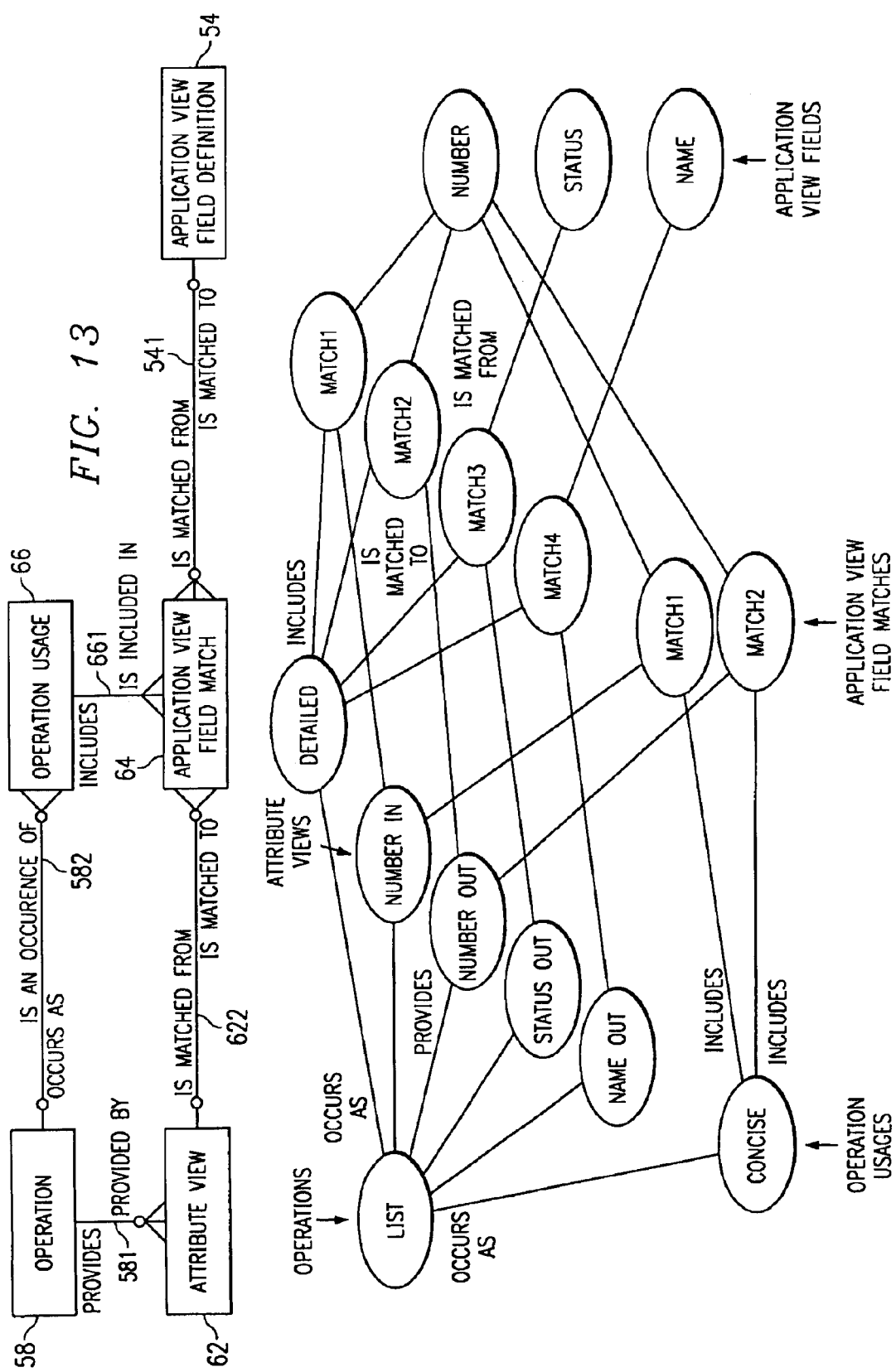
FIG. 13 illustrates an Operation Usage detail of FIG. 7.

The Operation Usage object resolves the inherent many-to-many relationship between the Operation object 58 and the Application View Definition object 52 since a specific Operation 58 may be used by many Application View Definitions 52 and a specific Application View Definition 52 may make use of many Operations 58. FIG. 13 is a schematic representation of one Operation 58 with two Operation Usages 66 providing different Application View Field Matches 64. An individual Operation Usage 66 includes {661} a set of Application View Field Matches 64. The same Operation 58 may occur more than once as an Operation Usage 66 with each current Operation Usage 66 having a different set of Application View Field Matches 64. Each Operation Usage 66 will produce {662} some effect (Operation Effect object 68) on the Application View Definition 52.

An Operation Usage 66 provides a number of rules including:

1. an Operation Usage 66 may get input values from more than one Application View 80;
2. an Operation Usage 66 may supply data from its outputs to more than one Application View 80;
3. Repeating Attribute Views 62 of an Operation's output can be used to populate an Application View 80;
4. all data matched from the Attribute Views 62 of one Operation Usage 66 to an Application View 80 must have the same cardinality (i.e. it is not possible to mix Repeating Attribute Views 62 and non-Repeating Attribute Views 62);
5. A non-populating Operation Effect 68 may clear the current row, or merge into the current row;
6. an Operation Usage 66 which has a populating effect on an Application View 80 always triggers a Clear Event on the Application View 80.

Operation Usages 66 can have different effects on different Application View Definitions 52. There are several causes for these effects:

the running of an Operation 58 may in itself cause some effect;

the particular Operation Usage 66 itself may cause some effect;

the Application View Field Matches 64 for a particular Operation Usage 58 may cause some effect.

A particular classification scheme is provided for the type of effect produced. Each effect type is represented by a different Operation Effect object 68. A constraint imposed for simplicity is that each Operation Usage 66 may produce more than one Operation Effect 68; but only one per Operation Usage 66 and Application View Definition 52 pairing (i.e. an Operation Usage 66 has only one Operation Effect 68 on a specific Application View Definition 52). Generally, when an Operation Effect 68 is produced from the running of an Operation Usage's Operation 58, the Operation Effect 68 will raise {681} an Application View Event 70. The Event 70 is defined by {523} the Application View Definition 52 and typically causes some change in state of the Application View 80 (e.g., Reset or Clear). The set of Effect types described above is not exhaustive, and other effects could be added or a different scheme devised.

Figure 14A:
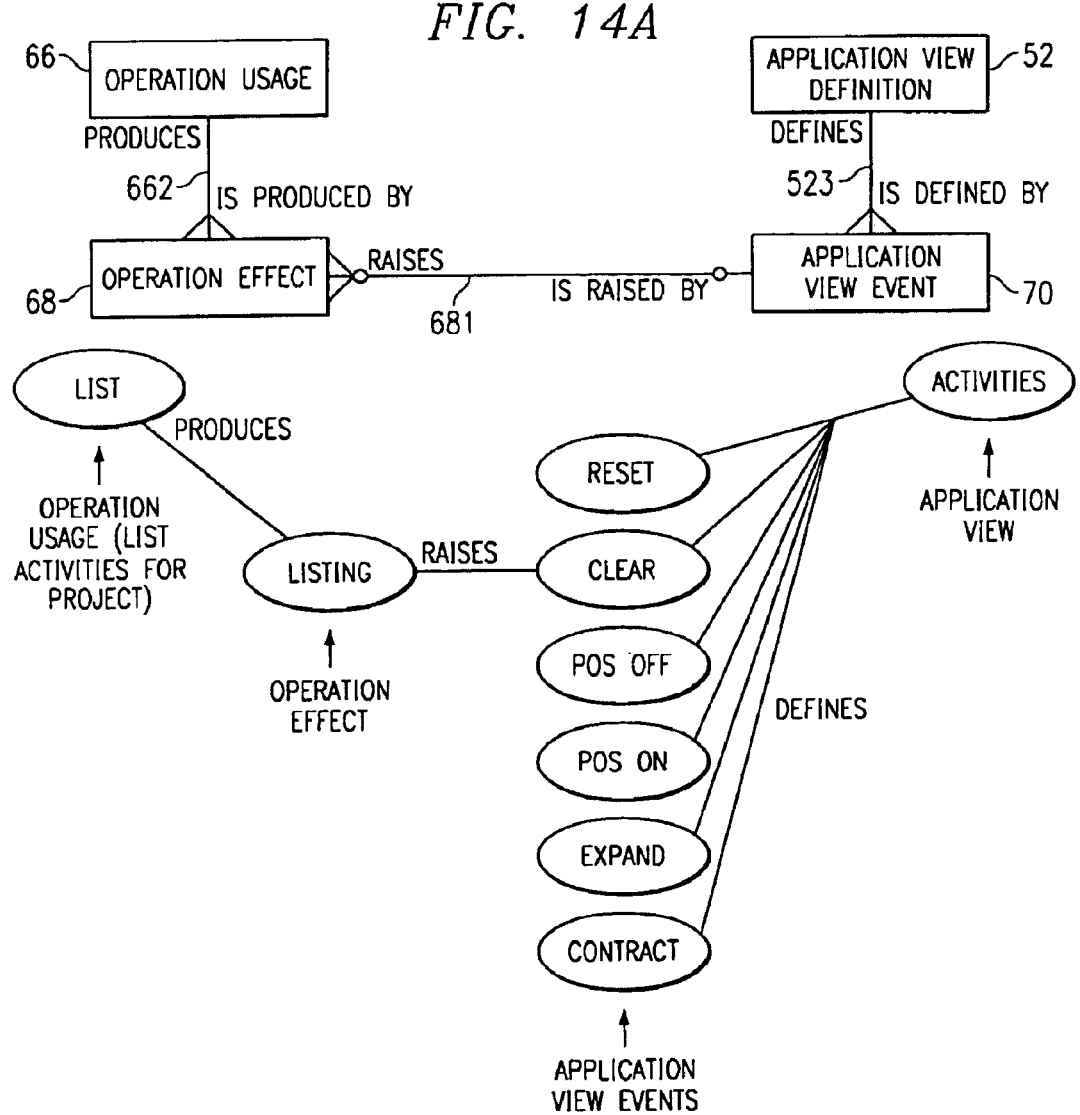
FIG. 14A illustrates an Operation Usage with a Listing Effect.

A Listing Operation Effect 68 is one which causes Application View Fields 84 to be cleared of current values and replaced with new values from the Attribute Views 62 of the Operation 58. Typically, an Operation Usage 66 having Application View Field Matches 64 return a list or set of values for each Application View Field Definition 54 is classified as causing a Listing Operation Effect. However, any Operation Usage 66 could be said to cause this effect. FIG. 14A is a schematic representation of an Operation Usage 66 with a Listing Effect 68 for which it raises {681} a Clear Event 70 on an Application View 80. When a Listing Operation Effect 68 is produced, it raises {681} a Clear-type Application View Event 70. This Event 70 clears all values from the Application View 80 prior to any new values being mapped into it.

A Detail Operation Effect 68 is one which causes information about the current row in the Application View 80 to be refreshed or expanded. Application View Field Matches 64 which return values from the Operation 58 are mapped into the current row.

Figure 14B:
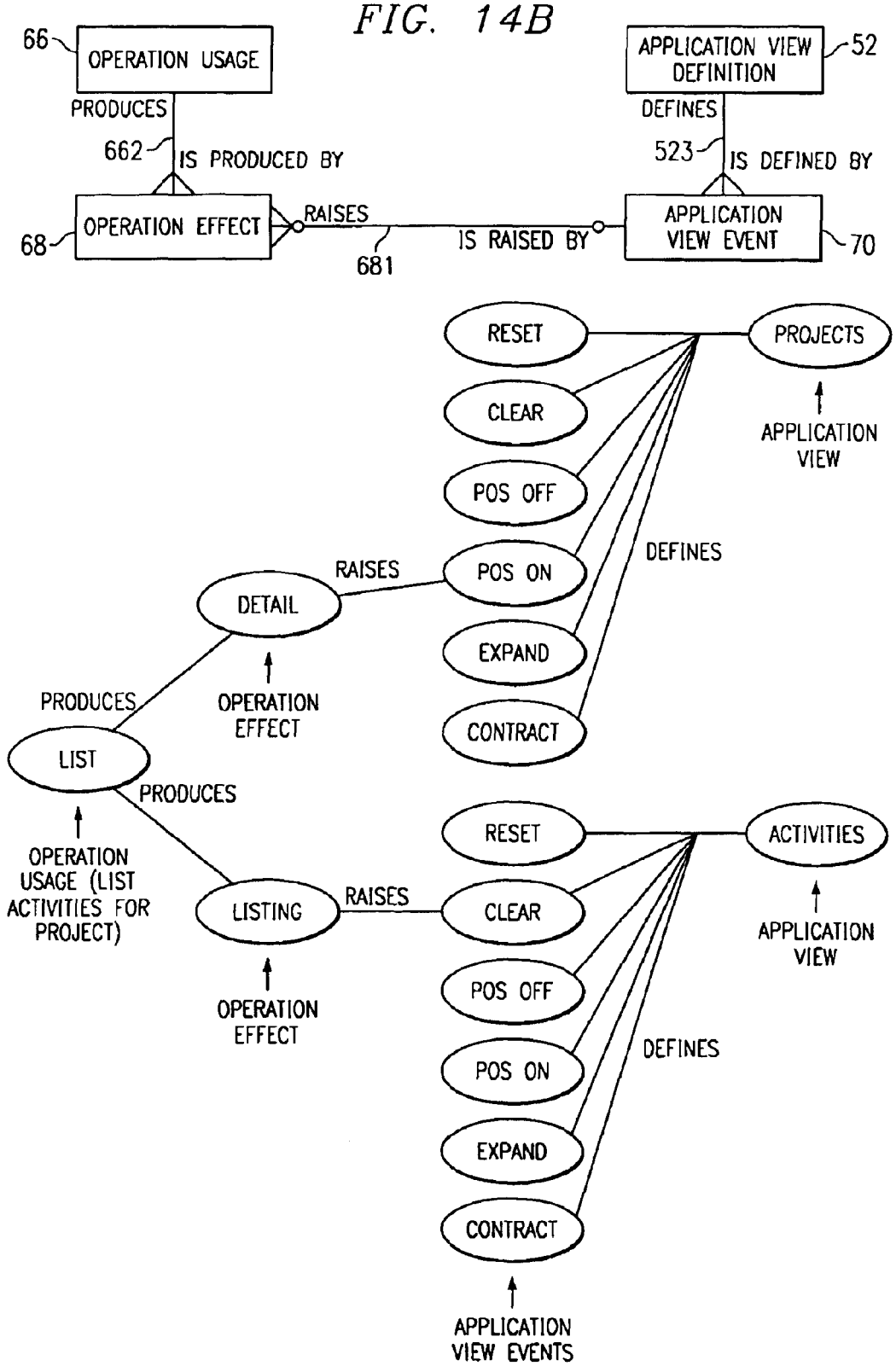
FIG. 14B illustrates another Operation Usage, this time having a Listing Effect on one Application View and a Detail Effect on another Application View.

When a Detail Operation Effect 68 is produced, it may optionally raise a "Position On" type Application View Event 70. FIG. 14B is a schematic representation of an Operation Usage 66 having a Listing Effect 68 on one Application View 80 and a Detail Effect 68 on another Application View 80.

An Update Operation Effect 68 is one which causes values in the current row of an Application View 80 to be updated. Application View Field Matches 64 which represent input values are provided with any new values and Application View Field Matches which return values from the operation are mapped into the current row. An Add Row Operation Effect 68 is one which causes the used row property of the Application View 80 to be increased by one and values returned from Application View Field Matches 64 to be mapped into that new row. Conceptually, there is no difference whether the new values are added at the end of the Application View 80 below the current row or above the current row. However, facilities supplied by an implementation would need to distinguish these cases. When an Add Row Operation Effect 68 is produced, it raises an "Expand" type Application View Event 70.

A Delete Row Operation Effect 68 is one which causes the used row property of the Application View 80 to be decreased by one and values in the current row to be removed. Any values returned via Application View Field Matches 64 into the Application View are ignored. When a Delete Row Operation Effect 68 is produced, it raises a "Contract" type Application View Event 70.

For any Operation Usage 66, Application View Definition pairing which does not cause any other effect, the Operation Effect 68 is of an Unclassified type.

A Clearing Operation Effect 68 runs a Clear Event 70 on the specified Application View 80.

Similarly, a Resetting Operation Effect 68 runs a Reset Event on the specified Application View 80.

In general, internal or external stimuli to an Object may cause certain Events on that Object to occur. A non-exhaustive set of events for the Application View Object has been illustrated. Externally, the Application View Events 70 are raised by {681} Operation Effects 68. Internally, Application View Events 70 are signalled by the Application Engine (at runtime). When an Application View Event 70 occurs, it triggers {701} any Operation Usages 66 that are activated by {721} Event Triggers 72. For example, the "Position On" Event 70 might trigger an Operation Usage 66 to fetch more details about the subject of the current row. The Event 70 can trigger zero, one or more Operation Usages 66.

FIG. 15 is a table representing Event Type versus Operation Effects, where X is an allowed combination, DEP is allowed on dependent Application Views, Input uses only input values and Update relates to an Input Attribute View that may contain user supplied values. The asterisk identifies a single default listing operation. In this example each event type is represented by a different Application View Event Object.

In the following, various Application View Event Types are described with an indication of the rules which relate to those event types.

1. Clear—A clear event is handled (by the system) by clearing all the current data from the Application View.
   Rules
   1. When an Application View is cleared, dependent Application View are sent a Clear event first, (bottom up first).
   2. Of Operation Effect objects, the populating type always clears the current Application View. The delete type always causes a clear of any dependent Application View.
   3. If a Position Off event has an associated operation, then the Position Off event is fired before clearing the Application View.
   4. An external mechanism may cause a Clear of the Application View.
2. Reset—Reset is an event which runs an associated Listing operation(s) (if any) but does not set the current row.
   Rules
   1. Of the Operation Effect objects, the Listing, Add Row and Delete Row type may cause a Reset (instead of Expand or Contract events).
   2. When an Application View is reset, dependent Application Views are not reset; (the parent Application View will not have currency).
   3. An external mechanism may cause a Reset of the Application View.
3. Position On—The Position On event is raised by the system in response to a change of current row; i.e. the user has changed the current row and the system is 'positioning on' another row. It is not caused by any Operation Effect objects. It is not directly callable by an external mechanism.
   Rules
   1. It can optionally run Detail type Operation Effect operations.
   2. It may cause a reset or reset & position event on dependent Application Views.
4. Position Off—The Position Off event is raised by the system in response to a change of current row, or by a clear event. It is not caused by an Operation Effect objects. It is not directly callable by an external mechanism.
   Rules
   1. It can optionally run an Update type Operation Effect operation.
   2. It can optionally clear Application Views. The default is to clear dependent Application Views.
   3. The Position Off event handler need only be run if values in the current row have changed since the last operation which effected the current row was run.
5. Reset & Position—Reset & Position is an event which runs an associated populating operations, sets the current row to the default row. The setting of current row causes the Position On event to the fired (but not the Position Off since there is not 'present' row to move from).

Rules
1. Of the Operation Effect objects, the Listing, Add Row and Delete Row type may cause a Reset & Position. On an Add Row, the position should be that of the row for the new occurrence.
2. When an Application View is Reset & Position, dependent Application Views are not sent the Reset & Position event.
3. An external mechanism may cause a Reset & Position of the Application View.

6. Expand—The expand event supplies a mechanism to deal with an increase in the number of rows in the Application View by one. (An extension of this approach would expand the number of rows by a specific number). The expand event is run after Application View Field Match input values have come either from the current row, or a designated empty row within the Application View, and the operation run. The Application View Field Match output values are mapped into the new row.

Rules
1. The event would either add a new row to the base of the Application View if there is no current row, or insert a new row after the current row.
2. The new row becomes the current row.
3. The Position Off Operation Event is not run, but the Position On Operation Event is.

7. Contract—The contract event supplies a mechanism to deal with a decrease in the number of rows in the Application View by one. (An extension of this approach would decrease the number of rows by a specific number).

Rules
1. The current row is removed from the Application View.
2. Application View Field Match output values for this Application View are not mapped.
3. The current row is set to the next row, if there is a next row, otherwise it is set to nothing.
4. The Position On event is fired on the new row.

Figure 16:
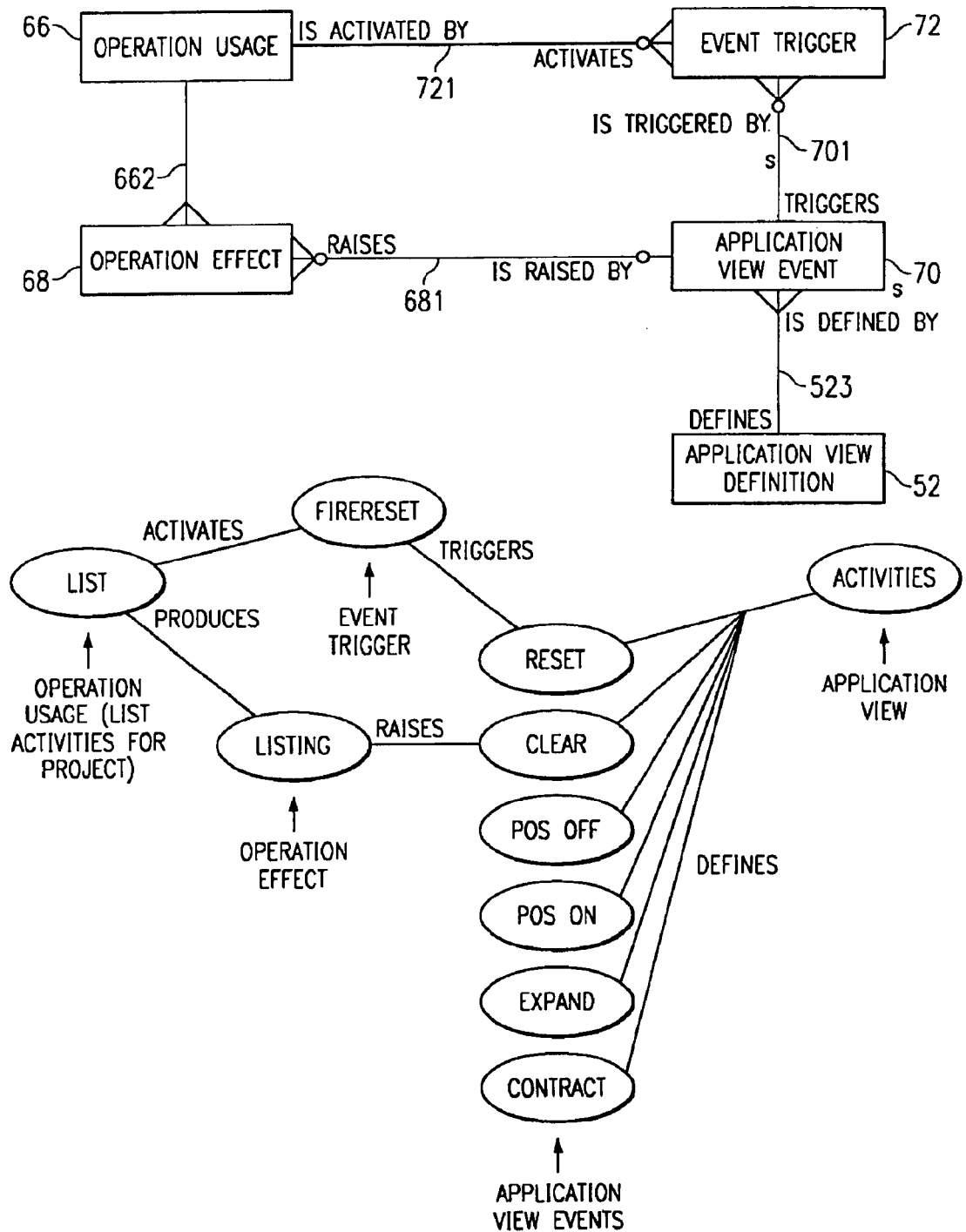
FIG. 16 illustrates a Reset Event which triggers an Operation Usage.

The Event Trigger Object 72 resolves the inherent many-to-many relationship between Application View Events 70 and Operation Usages 66. Any Application View Event 70 may trigger many Operation Usages 66 and an Operation Usage 66 may activate many Application View Events 70. Accordingly, any Application View Event 70 may trigger {701} a defined sequence of Event Triggers 72. FIG. 16 represents a Reset Event 70 which triggers an Operation Usage 66. It should be noted that the same Operation Usage 66 has a Listing Effect 68 which raises a Clear Event 70.

There has, therefore, now been described the Application View Design and Component Description areas of a general model for Application Views of FIG. 7, the Application View Design and Component Description areas being modeled during the design stage of an application.

There will now be described the Runtime Data Management area of FIG. 7.

The area describing Runtime Data Management models the objects used to hold actual Application Views 80 during execution of the system. In the implementation, this information is stored either in memory, for the life of the application, or in a database to provide persistence.

The object entitled Application View 80 is the object which holds the data for an Application View Definition 52 based on the structure defined by the Application View Definition 52 and its Application View Field Definitions 54. The Application View Row object 82 holds specific data for an instance of information, matching the Rows of the Application View Definition 52. The Application View Field object 84 holds the data for a Field information, based on the Application View Field Definition 52. The Row/Field Entry object 86 relates to a specific element in a row, such as a value for some field. This object maps 861 to Attribute View Instances 88 according to the mapping rules described in the Application View Field Match 64. An Attribute View Instance object 88 is the manifestation 621 of a Attribute View 62 at execution time. This is the actual object described by the Attribute View, with values for its properties based on values made available at execution time. The values flow between an Attribute View Instance and an Attribute Field based on the mapping rules described in the Application View Field Match 64.

Figure 17A:
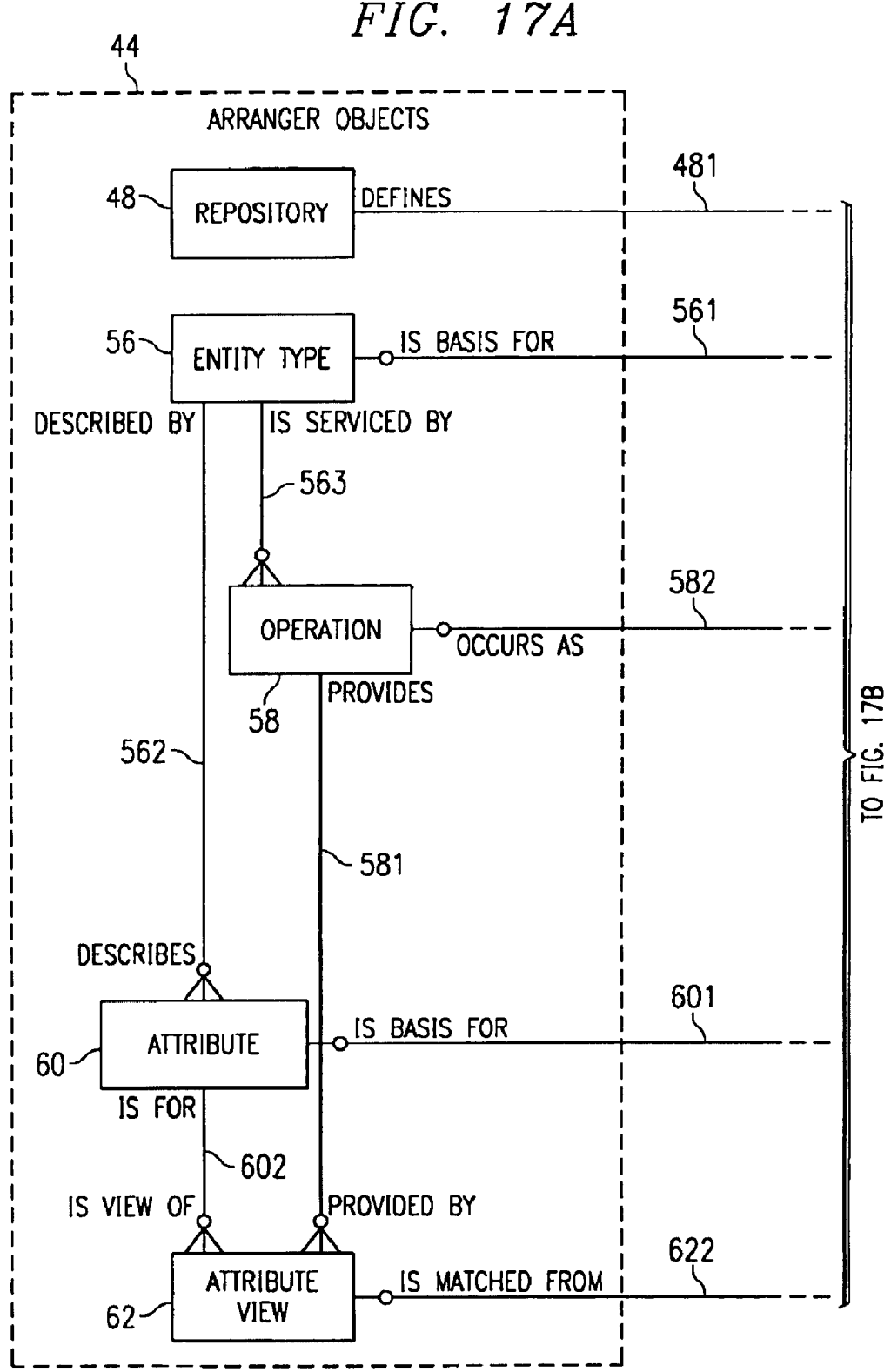
FIGS. 17A–17C are schematic block diagrams of a particular embodiment corresponding generally to FIG. 7.
Figure 17B:
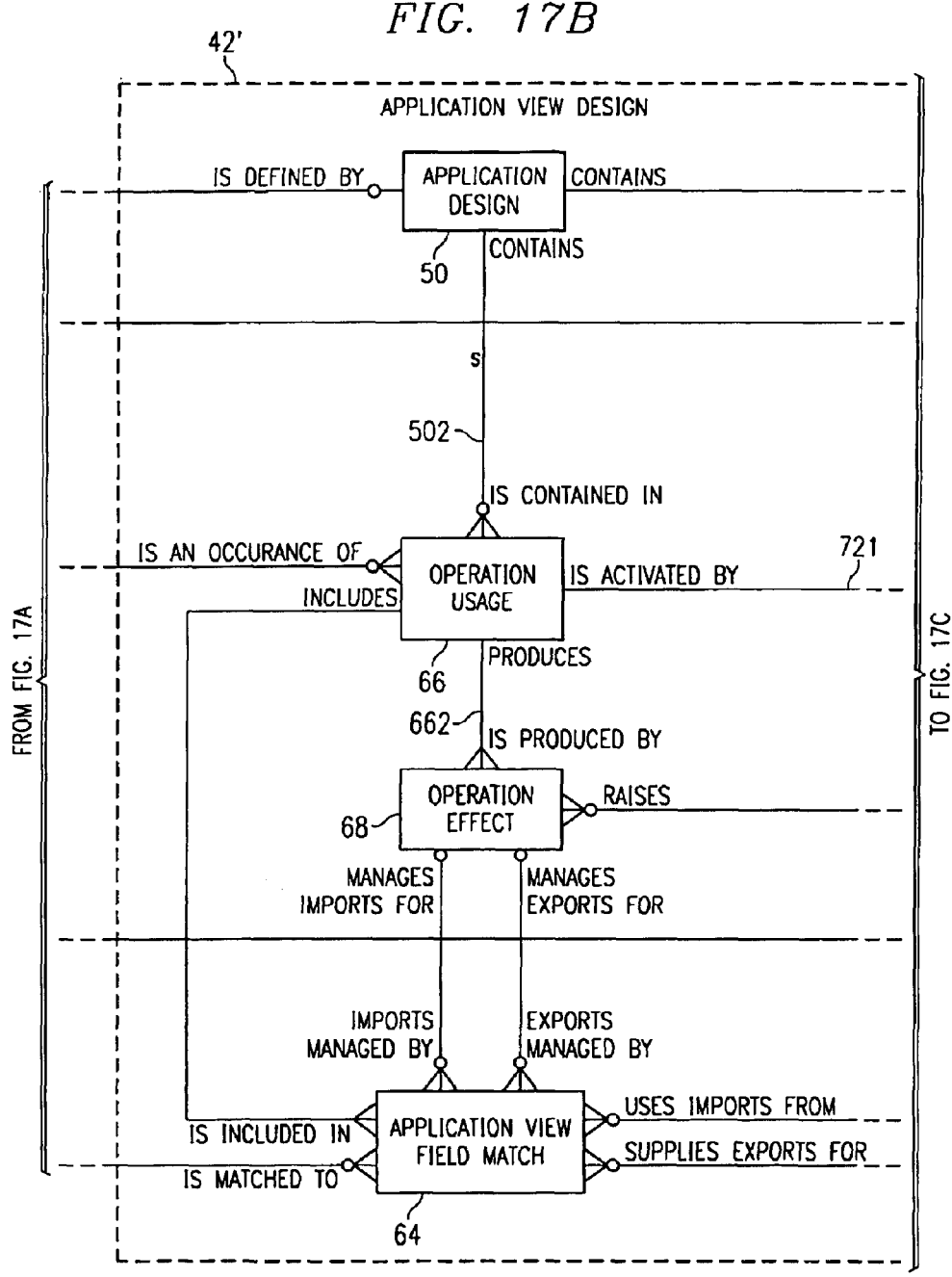
Figure 17C:
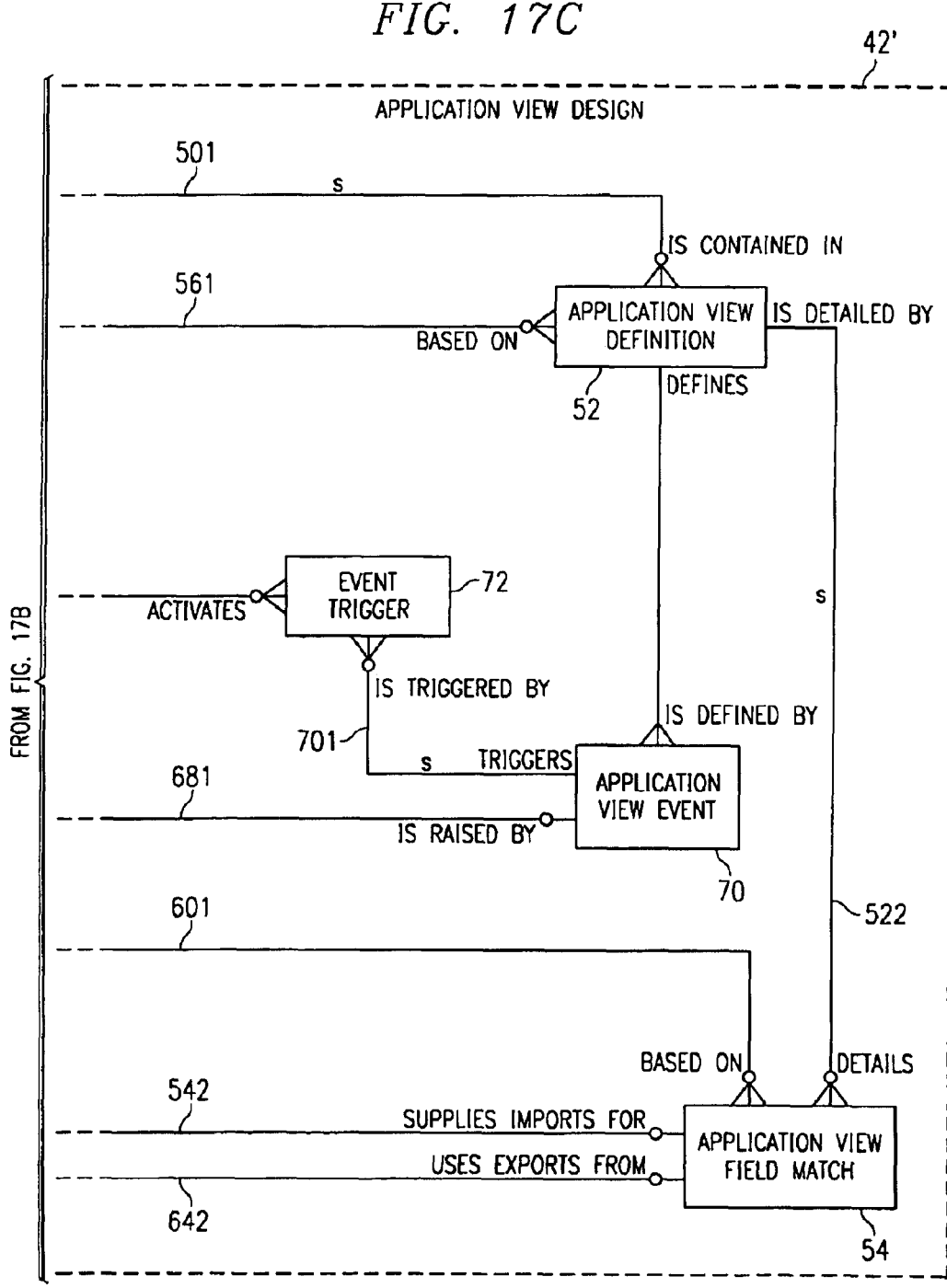

FIG. 17 is an example of a specific implementation of the model illustrated in FIG. 7. The specific implementation of FIG. 17 has much in common with the general example of FIG. 7. The Runtime Data Management area 46 is in fact identical for the FIG. 17 implementation and FIG. 7 example, and it has therefore not been reproduced in FIG. 17. The majority of changes (described below) with respect to FIG. 7 are for reasons of efficiency of implementation. The particular implementation described with respect to FIG. 17 was designed to integrate with Texas Instrument's Arranger environment.

The Component Description area 44 is replaced by an Arranger Objects area 44. The component description objects overlap with the Arranger objects.

The Repository entity type 48 is used as a starting point or "root object" for the Application Definitions. It is part of the Arranger model and has the same properties as for the example of FIG. 7.

In the implementation of FIG. 17, a maximum of one Application Design 50 is defined by {481} the Repository 48, rather than the many of the example of FIG. 7. The Application Design 50 object of FIG. 17 has the same properties and relationships as the Application Design object 50 of FIG. 7.

The Application View Definition object 52 of FIG. 17 differs from the Application View Definition Object 52 of FIG. 7 in that it implements the following properties:

Represents—this property holds a pointer to the Entity Type object 56 when the Application View Definition "is based on" {561} an Entity Type 56. The property is used to implement the relationship is based on rather than using the standard relationship mechanism of the Arranger product. This is done to keep the Arranger product as de-coupled as possible.

Max Rows, Used Rows, Current Row are not implemented as properties in the implementation of FIG. 17. Max Rows is maintained instead on the Application View Field Match object 54. Used Rows is maintained by the Application Engine in in-memory storage for each Application View during the running of the system. Current Row is maintained by the Application Engine in in-memory storage for each Application View 80 during the running of the system.

The Application View Field Definition differs from the Application View Field Definition Object 54 of FIG. 7 in that it implements the following properties:

Represents—This property holds a pointer to the Attribute object when the Application View Field Definition 54 is based on {601} an Attribute 60. The property is used to implement the relationship is based on rather than using the standard relationship mechanism of Arranger. (This is done to keep the two models as de-coupled as possible).

Display Name—A user representation of the name for a field.

Data Type, Decimal Places, Default Value, Is Case Sensitive, Length, Permitted Values are not implemented as properties on the object, but instead the same properties on the corresponding Attribute are used.

The relationship 'is matched to' between Application View Field Definition 54 and Application View Field Match 64 has been replaced by two relationships 'supplies import for' {542} and 'uses exports from' {642}. These two relationships perform the same function, but maintain a separation of field matches used for inputs (imports) and those used for outputs (exports). This provides the Application Engine with a quicker lookup mechanism.

In this implementation, Arranger's Entity Type object 56 is substituted for the Component 56 in the example of FIG. 7. In the Arranger product, some Entity Types are categorised as Business Object Types.

The properties of Entity Types that Application Views make use of are:

Display Name—a user representation of the name of the entity type;

Horizon Name—the unique name of this object in the Arranger system;

Type—the type of Entity Type that the Entity Type represents.

The relationships that Application views make use of are:

the equivalent of the 'described by' relationship {562} to locate Attributes of an Entity Type;

the equivalent of the 'is serviced by' relationship {563} to locate Operations of an Entity Type of category Business Object Type.

The Operation entity type 58 is a standard feature of the Arranger product. No new relationships or properties need to be defined here. In the Arranger product, only Entity Types of the category Business Object Types are serviced by Operations 56. No properties (apart from the operation name) are used directly by the system. However the running of an operation is delegated entirely to the Arranger system, so that in this respect the standard properties are used.

The Attribute is a standard object of the Arranger product. No new relationships or properties have been added for Application Views.

The properties that Application Views make use of are:

Display Name—a user representation of the name of the entity type;

Horizon Name—the unique name of this object in the Arranger system.

The relationships that Application views make use of are:

the equivalent of the 'is for' relationship {602} to locate the Attribute of an Attribute View;

the equivalent of the 'describes' relationship {562} to locate the Entity Type of an Attribute.

The properties of the Attribute are not used directly, but are instead supplied by the Arranger product via the Attribute View object 62.

The Attribute View is a standard object of the Arranger product. No new relationships or properties need to be added here. The Arranger product organises Attribute Views into two separate sets; one for inputs (called import views) and one for outputs (called export views). In addition, there is an organisation within a view set to allow grouping of contextually related items. Attribute Views may optionally be placed in a Group View. In an import or export set, there can be many Group Views. Typically a Group View will be used to identify a set of Attribute Views which supply a number of values (called a Repeating Group View in Arranger terminology).

The properties that Application Views make use of are:

Display Name—a user representation of the name for an attribute;

Data Type—documents the data type of the given attribute;

Decimal Places—the number of decimal places for the given attribute;

Default Value—default value for the given attribute;

Description—the description of the given attribute;

Is Case Sensitive—if the given field is case sensitive;

Lengths—returns the maximum length of this attribute;

Permitted Values—the permitted value set for this attribute, if the attribute has permitted values;

Optional—indicates whether a value for this attribute is always required or not;

IsRequired—whether the attribute view is required by the Operation;

IsRepeating—whether the given attribute view has a set of values or a single value;

MaxRepeats—the maximum number of repetitions for this attribute view;

NumberOfValues—the number of values currently present for the given attribute view;

Name—the full name consists of the attribute view's QualifierName concatenated with its AttributeName. It is unique within the scope of an Information View;

AttributeName—the name of the corresponding attribute for this attribute view;

QualifierName—a string token uniquely identifying a set of one or more Attribute Views in an Information View;

GroupName—the name of a sub-group of attribute views, containing the given attribute view, or an empty string if the attribute view is not part of a group.

The Application View Field Match also implements the following properties:

MaxRepetition—integer indicating maximum possible repetition of the Attribute View.

A Transformation Rule is not implemented as part of the Application View Definition. The user is provided instead with a programmatic exit to allow them to define their own rules as needed.

The Operation Usage 66 implements the following properties:

Represents—this property holds a pointer to the Operation object 58. The property is used to implement the relationship is an occurrence of rather than using the standard relationship mechanism of Arranger. (This is done to keep the two models as decoupled as possible);

OpName—The corresponding Operation name;

BOTName—The Business Object Type name for the Operation.

For Implementation Rules, only one Repeating Group View of an operation usage can be mapped into any one Application View.

The Operation Effect 68 also implements the following properties:

Category—identifies one of [Instance/Listing/AddRow/ DeleteRow/Detail/Update/Unused/Unclassified]

The Category property indicates the Effect that the Operation Effect object represents.

There are the following differences in the classification scheme:

An Instance Effect represents the Input Operation Effect.

An Unused Effect provides a new category to represent the state of any Attribute View before a match has been specified for it. Any Attribute Views which are not matched are associated with an Operation Effect having this classification.

Clearing and Resetting Effects are not implemented in this embodiment of the invention. In this implementation, some constraints are placed on the classification of operations; for example only an operation which has an export repeating Group View of cardinality >1 can be classified as a listing operation.

The Application View Event 70 also implements the following properties:

Category—identifies one of [PosOn/PosOff/Reset/Clear/Expand/Contract]

ClearDependants—Boolean flag for Clear event; should dependants also be cleared.

The Category property indicates the Event type that the Application View Event object represents. The Reset and Position Event is not implemented as a value. The same net effect as a Reset and Position Event is achieved in software for an Application View since the default behaviour of Reset is to set the current row counter to the first row in the table (and thus trigger the Position On event).

In the generalised embodiment all dependent tables are cleared if Application View is cleared (via a clear event). The ClearDependants property allows this default behaviour to be changed.

There is no restriction as to the Effect type of Operation Usage(s) that an event can trigger. Relaxing the rules allows the user to have any operation usage run when an event occurs.

The Event Trigger object is as for the general embodiment of FIG. 7.

The Runtime Data Management is implemented with runtime data management information held either as in memory objects, or as tables in a database. The mechanism used depends on design considerations for the target environment. For example, on specific implementation for Visual Basic 4.0, the information is stored in an Access database since Access databases have a high degree of interoperability with Visual Basic.

In the particular implementation;
a database table is used to represent an Application View;
a database column is used to represent an Application View Field;
a database row is used to represent values returned from Attribute Views;
a database Row/Field entry is used to represent single value from an Attribute View instance;
the manifestation of an Attribute View Instance at execution time is provided by Arranger;
the creation and upkeep of the runtime data, and the interaction with Arranger is handled by the Application Engine.

Figure 19:
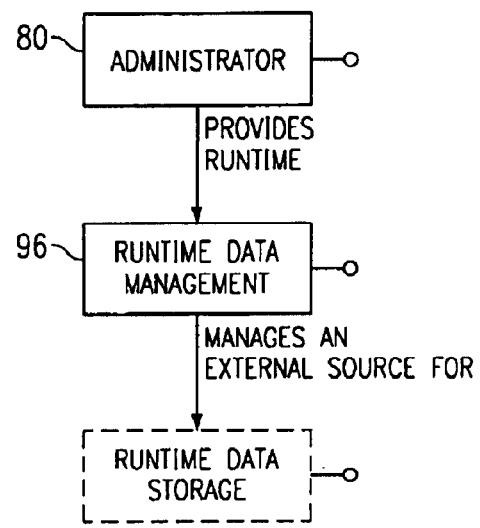
FIG. 19 is a Object System for Runtime Data Management.

FIG. 18 is an alternative schematic representation of the Application View Design of FIG. 17. FIG. 19 is a schematic representation of the runtime objects for runtime data management. In a preferred embodiment which uses Microsoft Corporation's OLE component technology, an Object Server, termed herein the Integration Assistant Object Server, or the Integration Assistant Mechanism Object Server (IA Object Server) provides all these services to support the design and runtime aspects of Application Views. Thus, there are two broad types of service supported, those to create and maintain Application View Definitions (Application View Design Information) at design time, and those to manage Application Views during the process of executing operations (Runtime Data Management) used at runtime. The Object Server provides the services illustrated as OLE Automation Objects. Thus FIG. 18 shows the OLE object structure manifested by the IA Object Server for the manipulation of Application View Design information. These objects, together with the methods and properties are available as an OLE Automation Interface which is herein referred to as the Integration Assistant Interface (IA). FIG. 19 shows the OLE object structure manifested by the IA Object Server for runtime data management.

The following section describes the methods and properties of each object in the IA Object Server.

The Administrator object 80 is the root object of the IA Object Server. It provides access to the objects which describe Application Views and offers administrative services to maintain the state of the Object Server.

The Administrator has the property:

RuntimeImplementation—returns or sets the type of runtime Implementation, for example Visual Basic;

The Administrator provides the following functions:

CreateAppDesign (ApplicationName)—creates a new Application Design Object of a given ApplicationName (once per Meta-object Network (MON));

AppDesign—returns the Application Design Object (if any);

ApplicationViews—returns the collection of Application View instances currently in the MON, if any;

Runtime—returns the runtime object; and

Initialise (ArrangerBusinessTask)—this is called first after an IA Object Server is brought into memory for initialising other IA Object Server objects.

The Application Design object 50 has the property of:

Name—returns or sets the name of the Application Design object.

The Application Design object 50 provides the following functions:

CreateAppView (theName, Represents)—creates a new Application View Definition object for the Application Design taking two parameters, a unique name (theName) for the Application View Definition and a pointer to, or name of an Arranger Business Object Type the Application View Definition is to represent. The Represents parameter establishes a 'based on' relationship from the Application View Definition object to the appropriate Entity Type. When an object is created, a set of Application View event objects is created for and associated with the Application View Definition, one for each supported event type);

AppView(AppViewName)—returns a specific Application View Definition object with the name (AppViewName), if one exists;

AppViews—returns the collection of Application View Definitions in the MON;

CreateOpUsage(opUsageName, BT_OP)—creates an Operation Usage object with a unique name (opUsageName), where BT_OP identifies the Arranger Operation object which OperationUsage is an occurrence of, and creates an Operation Effect object of type 'unused', and a set of Application View Field Matches for each of the Attribute Views of the Operation;

Delete—deletes the Application Design object and all Application View Definitions and Operation Usages related to it.

The Application View Definition object 52 has properties of:

Name—returns or sets the name of the Application View Definition object;

Description—returns or sets a description of the Application View Definition object.

MaxRepetition—the maximum number of row elements in the application View Definition computed from looking at the MaxRepetition of each Application View Field Match which effects the Application View Definition;

Represents—returns an identifying string token for the Arranger Business Object type this Application View Definition is based on (if any).

The Application View Definition object 84 provides the following functions:

CreateField (theName, Represents)—creates an Application View Field Definition object for the Application View Definition taking two parameters, a unique name (theName) for the Application View Field Definition and a pointer to, or name of an Arranger Attribute View Definition the Application View Definition may represent (The Represents parameter establishes a 'based on' relationship from the Application View Field Definition object to the appropriate Attribute);

Field(fieldName)—returns a specific Application View Definition object with the name (fieldName), if one exists;

Fields—returns the collection of Application View Field Definitions for the parent Application View;

Event(eventName)—returns a specific Application View Event object with the name (eventName);

Events—returns the collection of Application View Events for this particular Application View Definition;

Delete—deletes the Application View Definition object and all Application View Events, Event Triggers, Application View Field Definitions and Application View Field Matches associated with it.

The Application View Field Definition object 54 has properties of:

Name—returns or sets the name of the Application View Field Definition object;

Represents—returns an identifying string token for the Arranger Attribute this Application View Field Definition is based on (if any).

The Application View Field Definition object 54 provides the following functions:

SuppliesImportsFor—returns the collection of Application View Field Matches which are matched to Attribute Views of type import;

SuppliesExportsFor—returns the collection of Application View Field Matches which are matched to Attribute Views of type export;

Delete—deletes the Application View Field Definition object and all Application View Field Matches associated with it.

The Application View Field Match object 64 has properties of:

Name—returns or sets the name of the Application View Field Match object;

AttributeView—sets or returns the Arranger Attribute View for this Application View Field Match object;

Represents—returns an identifying string token for the Arranger Attribute this Application View Field Definition is based on (if any);

MaxRepetition—the maximum number of row elements Application View Field Match could return, or use, from its associated Attribute View;

Overwrite—sets or returns a flag to indicate whether the current value held in the runtime Application View Field should be overwritten by user supplied values prior to running the associated operation.

The Application View Field Match object 64 provides the following functions:

ExportManagedBy—returns a specific Operation Effect object (if any) which manages this Application View Field Match;

ImportManagedBy—returns a specific Operation Effect object (if any) which manages this Application View Field Match;

ExportsTo—when this match object represents an export AttributeView, this function returns a collection of Field objects that should receive the value(s);

ImportsFrom—when this match object represents an import AttributeView, this function returns a Field object from which to get the appropriate values;

Delete—deletes the Application View Field Match Definition object and all Application View Field Matches associated with it.

The Operation Usage object 66 has properties of:

Name—returns or sets the unique name of the Operation Usage object;

DisplayName—returns or sets a name (which need not be unique) used for display purposes for this Operation Usage object;

OpName—returns or sets the name of the Arranger Operation object associated with this Operation Usage;

Operation—returns or sets the Arranger Operation object associated with this Operation Usage;

Represents—returns an identifying string token for the underlying Arranger operation;

BOTName—sets or returns the name of the Arranger Business Object Type which is serviced by the Arranger Operation Associated with this Operation Usage.

The Operation Usage object 66 provides the following functions:

CreateEffect(effectName, CategoryName)—creates an Operation Effect object for the Operation Usage taking two parameters, a unique name (effectName) for Operation Effect and the category (type) of effect the object will represent (CategoryName);

Effect(effectName)—returns a specific Operation Effect object (if any) with the name (effectName);

Effects—returns a collection of Operation Effects for the Operation Usage;

Match(MatchName)—returns a specific Application View Field Match object (if any) with the name (MatchName);

TransferMatch(MatchName, TargetEffect, TargetField)—transfers the association of a particular Application View Field Match (MatchName) object to an particular Application View Field Definition (Target Field) for a particular Operation Effect (TargetEffect), this generally being used to transfer an Application View Field Match object from its initial Operation Effect to some other Operation Effect (e.g., Listing) against a particular Application View Field Definition;

Delete—deletes the Operation Usage object and all Operation Effects, Event Triggers and Application View Field Matches associated with it.

The Operation Effect object 68 has properties of:

Name—returns or sets the unique name of the Operation Effect object;

Category—returns or sets a category (or type) for this Operation Effect object;

MaxRepetition—the maximum number of row elements for this Operation Effect object computed from the MaxRepetition of each Application View Field Match the Operation Effect manages.

The Operation Effect object 68 provides the following functions:

ImportMatches—returns the collection of Application View Field Matches which are for Attribute Views of type import, managed by the Operation Effect;

ExportMatches—returns the collection of Application View Field Matches which are for Attribute Views of type export, managed by the Operation Effect;

ExportMatch(AttrViewName)—returns a specific Application View Field Match object for Attribute Views of Type export, (if any), with the name (AttrViewName);

The Application View Event object 70 has properties of:

Name—returns or sets the unique name of this Application View Event object;

Category—returns or sets a category (or type) for this Application View Event object;

ClearDependents—returns or sets a boolean flag associated with an Application View Event of type Clear and flags whether dependent Application Views should also be cleared.

The Application View Event object 70 provides the following functions:

Triggers—returns the collection of Operation Usages which are triggered by this Application View Event (if any);

RaisedBy—returns the collection of Operation Effects which raise this Application View.

As mentioned above, a preferred embodiment of the invention is implemented using Microsoft Corporation's OLE component technology. The IA Object Server is designed to be a replaceable component. Any other component which offers equivalent OLE objects, methods and properties can be substituted. The significance of this is that it allows object servers which have interactions with systems other than Arranger to be provided.

The Arranger product itself is also implemented using Microsoft OLE technology to implement a network of objects which hold information defining business objects, their operations and parameters often referred to as Meta Data. This navigable network of objects collectively referred to as a Meta-object Network or MON.

The network of OLE objects of the Arranger product implements can be persistently stored in a file (or other objects), and used by the Arranger tools as needed. The Arranger MON was extended in order to capture objects in the Application View Design area 42.

The Arranger Object Server provides two OLE interfaces to the MON, called the Business Task Interface (BTI) and the Open Repository Interface (ORI). These interfaces provide access to the objects via a set of OLE methods and properties. These methods and properties are represented in FIG. 39.

The Metadata for the Arranger product was extended for an embodiment of the invention to hold all objects and relationships represented in FIG. 17. This has the effect of providing persistent storage of the Application View Definitions via Arranger standard mechanisms and making them available via Arranger's OLE automation interfaces. The IA Object Server allows Arranger's OLE automation interfaces internally to create and maintain objects in the MON in line with the object structures it presents externally via the IA interface. This architecture allows changes to be made to the structure and functionality offered by the IA Interface during development without disturbing the Arranger product, but has the benefit of storage and management of the Metadata associated with the Application Views within an existing mechanism. Alternatives to this would be to store the data associated with Application View Design information separately or to implement the IA Interface as part of the Arranger Object Server.

The various objects shown in FIG. 18 are operative at the design stage to act, in effect, as a database of information relating to an Application Design. This information is gathered via an Application Design Tool, which presents a user interface to the user to allow them to manipulate the concepts of Application Design to the IA Object server. The Application Design Tool provides various window menus to a user to assist the user in the performing these tasks by means of declaratory statements for defining the Application View.

The architecture of tools for manipulating Application Views is illustrated in FIG. 40. Tools have access to the IA interface and the interfaces of Arranger. Tools which manipulate Application Views at runtime require access to the specific Runtime Data Management System being used. The IA tools implement the logical services and user interface layers of a three-layer architecture. The three-layer architecture includes a data layer, which supports the management data or objects pertinent to the system, a logic layer which supports all the services of the system which use the data layer (and within them all the rules associated with the use of the data) and a user interface layer which permits user interaction and representation of the objects pertinent to the system.

Figure 20:
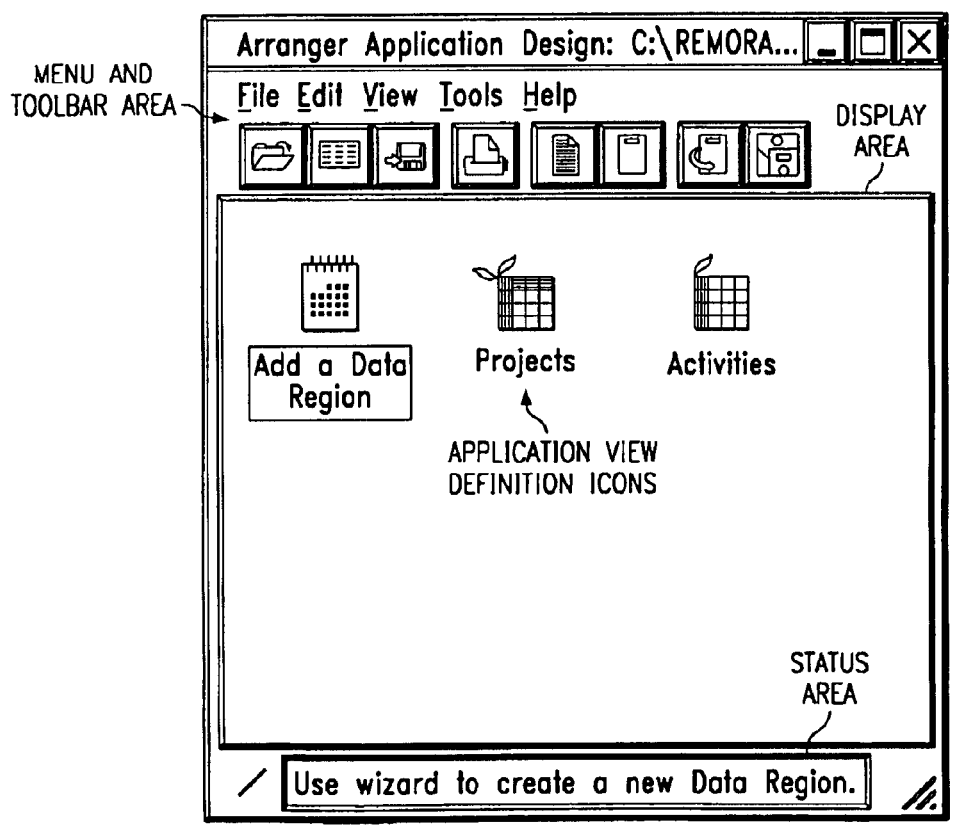
FIG. 20 illustrates a main window of an Application Design Tool.

FIG. 20 is an example of a main window for a design tool user interface. The display area shows an icon for each Application View Definition. The choice of icon is dependent upon the types of Operation Effect objects associated with the Application View Definition. Note that in the Drawings, the User Interface Application View Definitions are referred to as Data Regions.

In the following, various menu options presented to the user are described.

Figure 21:
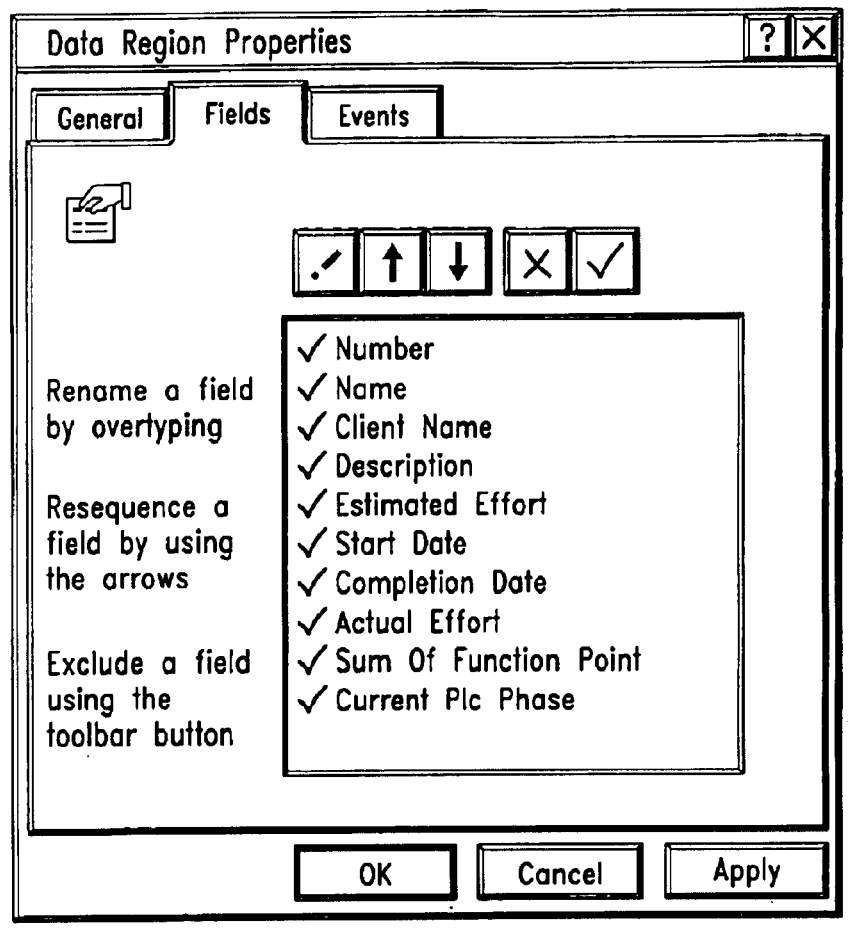
FIG. 21 illustrates a window showing Application View Definition properties.

The main window provides a user with a file menu including options as indicated below:

Open—allows the user to open a task, in response to which an Object Server class object is opened;

Save—allows the user to save an open task;

Save As—allows a user to open a task under a different file name;

Move Up—moves a selected Application View Definition up in a default display sequence;

Move Down—moves a selected Application View Definition down in the default display sequence;

Delete—allows the user to delete a selected Application View Definition;

Rename—allows the user to rename a selected Application View Definition object;

Properties—provides a window (FIG. 21) showing properties of the Application View Definition;

Close—allows the user to close a currently open task;

Exit—allows the user to exit the system.

The Object Server also provides standard operating system edit and view menus.

The Object Server further provides a Tools menu. Under the tools menu there are provided:

Wizard—access to a 'Application View Wizard', or 'Design Assist Mechanism' (DA Mechanism) to facilitate the input of declarations for creating a new Application View Definition. The DA Mechanism takes the user through a series of steps to create one or more Application View Definitions;

Custom—provides the user with the ability to create Application View Definition Objects;

Show Region Operations—provides another window which displays a current set of Operation Usages which have one or more Application View Field Match Definitions which map to Application View Field Definitions of the selected Application View Definition;

Add New Operation—provides the user with access to the Application View Wizard in a mode which allows the addition of further Operation Usages which have some effect on a specific Application View;

Show All Operations—shows another window which displays the current set of Operation Usages for a current Application Design Object;

Launch Test Tool—provides the user with access to a test tool which allows a user to see and test resulting Application Views and Operation Usages in a default style;

Install Shortcut—documents a way for a user to easily start the test tool with a current task as a parameter.

help—provides access to a help menu.

Figure 22:
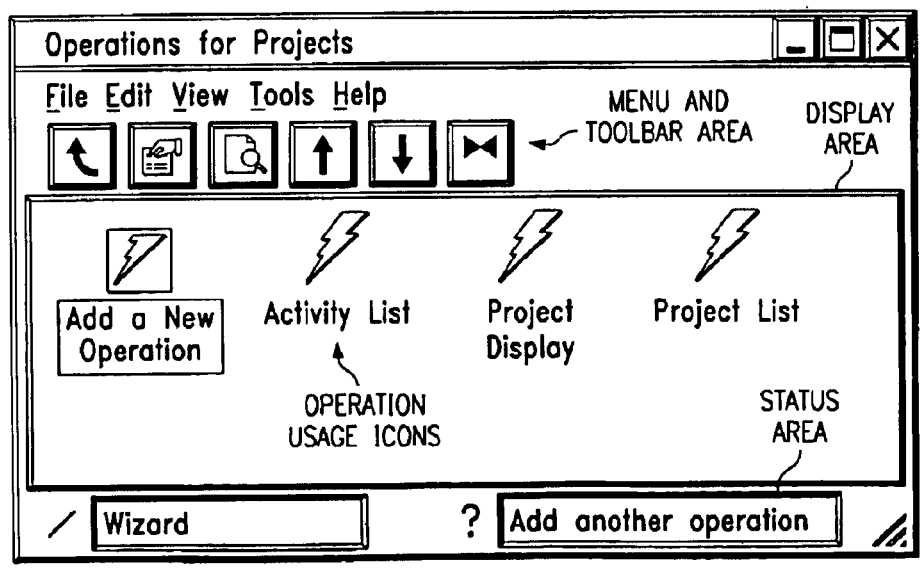
FIG. 22 is a window for Operation Usages.

The Operation Usage window 22 shows operation usages within the Application Design, or for a particular Application View Definition, depending on menu choice from the main window. This window's menu (see FIG. 22) is provided with a structure and mode of user interaction similar to those of the main window.

There is an Operation File Menu providing options as indicated below:

Move Up—moves a selected Operation Usage up in a default display sequence;

Move Down—moves a selected Operation Usage down in the default display sequence;

Delete—allows the user to delete a selected Operation Usage Definition;

Rename—allows the user to rename a selected Operation Usage Definition object;

Properties—provides a window (FIG. 21) showing properties of the Operation Usage Definition;

Close—allows the user to close the Operation Window.

There are Operations Edit and View Menus, an Operations Tools Menu and an Operations Help Menu.

Figure 23:
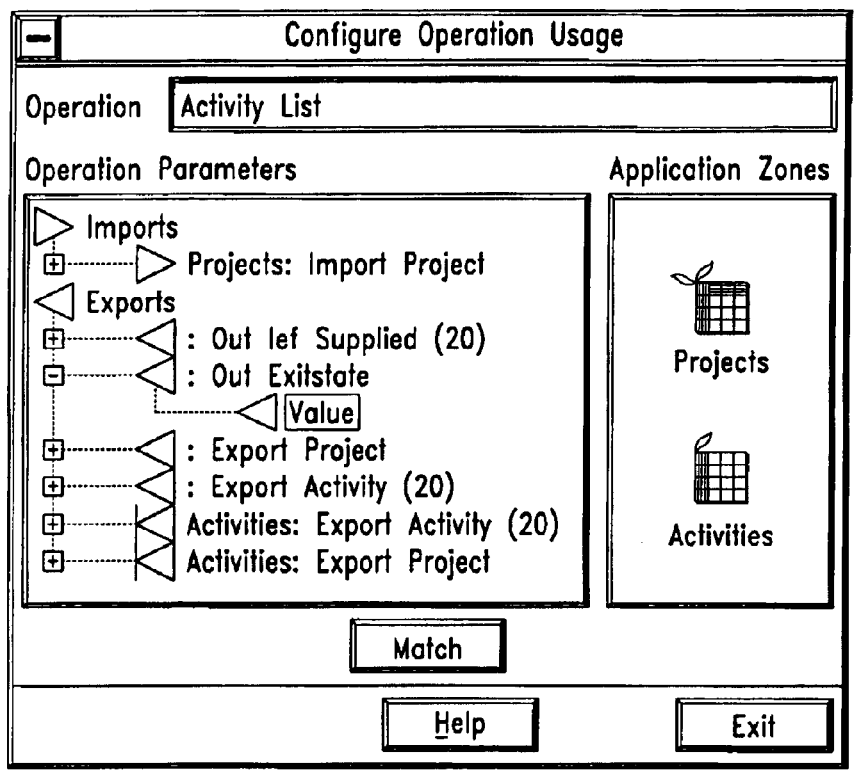
FIG. 23 is a window for Match Editing.

A Match Editor Window (FIG. 23) is provided which allows users to create, maintain, or just visualise the Application View Field Match objects for a given Operation Usage to Application View Field Definitions. Using drag and drop gestures with a mouse, it is possible to provide a number of different functions:

1. Match an Attribute View to an Application View Field Definition;
2. Unmatch an Attribute View from an Application View Field Definition;
3. Match an Attribute View to an Application View Definition;
4. Match a Qualifier set to an Application View Definition;
5. Unmatch a Qualifier set from Application View Definitions;
6. Classify the Operation Effect type for an Operation Usage/Application View Definition pairing;
7. Change and Overwrite Policy.

The DA Mechanism (Application View Wizard) referred to above provides a process-driven facility for users to build and augment Application View Definitions. It does this by providing a highly directed, process driven User Interface that represents Application View Design information. The process of building Application View Definitions is divided into a number of discrete steps. It provides the user with suggestions and defaults, derived by rules and heuristics, for the values of parameters required at each step of the process. It also provides the ability to construct and aid construction of Application View Definitions (and attendant objects) or to augment existing ones. It also provides the ability to interact with other aspects of the overall system.

The rules and heuristics of the DA Mechanism are based on common patterns and practices used by developers in the construction of Arranger components, prior to the use of those components in constructing Application View Definitions. The implementation of the DA Mechanism, therefore, is specialised to embody those rules and heuristics. If these working practices were changed, or other information made available, the rules and heuristics would necessarily change to reflect that. If a DA Mechanism were built for another component object system, the overall structure of the approach (steps) might be similar, but Arranger concepts would clearly have no meaning.

Figure 24:
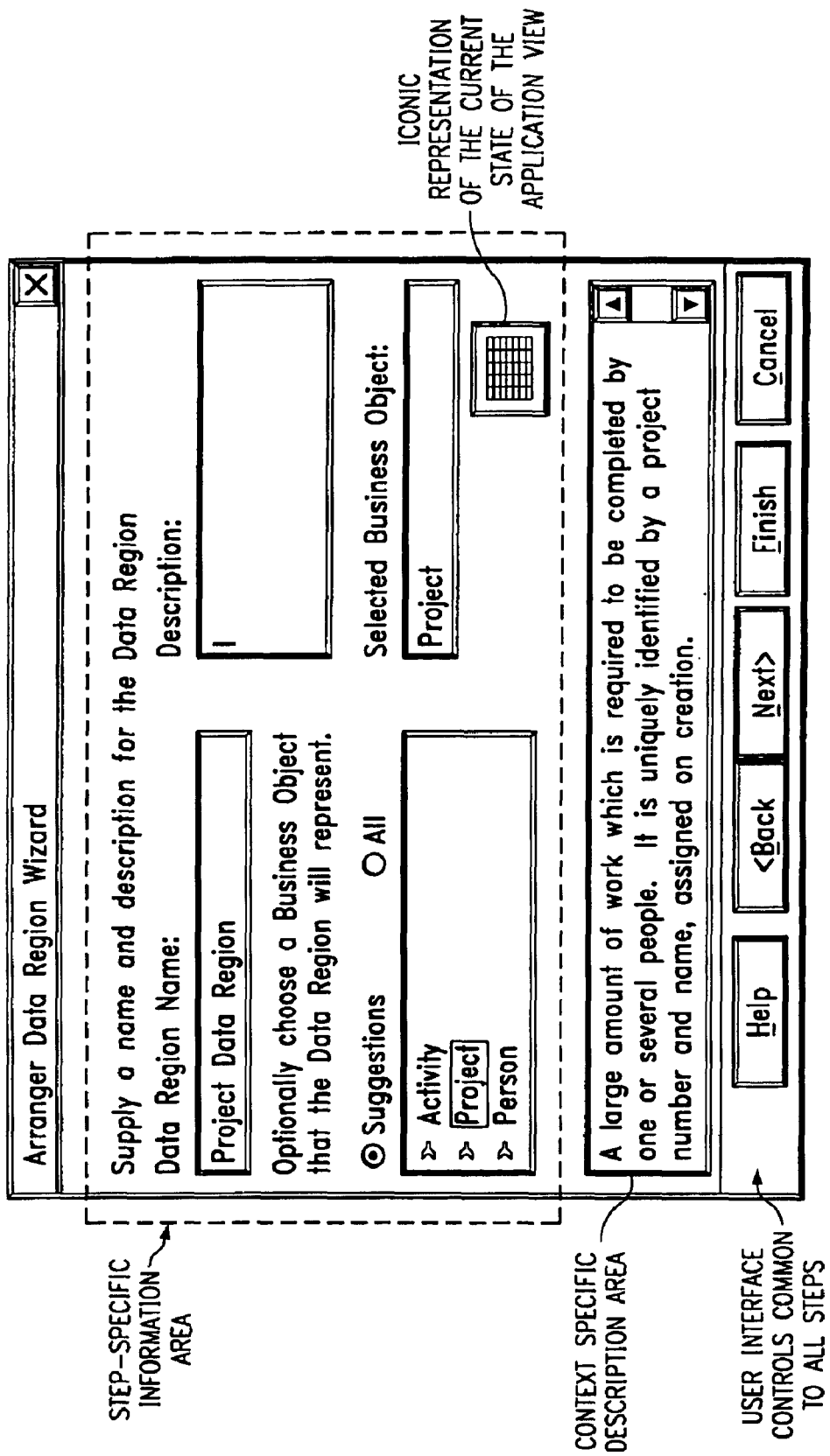
FIG. 24 is a window for a first Application Design Step.

The DA Mechanism is architectured as an object server, with a user interface, as illustrates in FIG. 24. The DA Mechanism itself is self-contained, except for its use of the IA Object Server to be described in more detail below.

Step-specific information is shown in the majority of the window area of the graphical interface of the DA Mechanism. The choice of iconic representation for an Application View Definition is dependent on the types of Operation Effect objects associated with it. The description area is used to show the description associated with the user selected items.

A set of push-buttons provide the user with control over the movement between steps (Next, Back), the ability to abort a session (Cancel), the ability to have the DA Mechanism complete the process using defaults and suggestions as given responses (Finish), and access to an online help system (Help). The DA Mechanism dynamically evaluates user input to the values required by the current Step and enables or disables user access to the push buttons Next, Back and Finish depending on the state of the system. Typically, the user is not able to press the Next push button until all the values required by a Step are solicited from the user.

The DA Mechanism is initialised in one of two modes by a calling program. It is either invoked in an "Add New Mode" or in an "Edit Mode". The Add New Mode is used when the calling program wants the DA Mechanism to start with a new Application View Definition and Edit Mode when it wants the DA Mechanism to start with an existing Application View Definition. In both cases, all manipulation of Application View Design information is done via an instance of the IA Object Server which is handed to the DA Mechanism when it is invoked via a method on its OLE interface.

In the following, functional elements of the seven steps of the DA Mechanism are described which effect in part or as a whole Application Views. It does not describe functionality that is present to support the User Interface or its manipulation.

Step 1—Identifying the Application View Definition.

The user interface in Step 1 is illustrated in FIG. 24. The primary purpose of this step is to solicit a name for a new Application View Definition, to solicit an optional description for the Application View Definition and/or to allow the user to select a Business Object Type (i.e., a component) which this Application View Definition may (optionally) be based on. To assist in this task, the Wizard provides the following functions:

1. it lists all Business Object Types on user request which are stored in the MON and lists the contained Business Object Types;
2. it suggests Business Object Types from the MON and analyses its current state using rules and heuristics to suggest zero, one or more Business Object Types which according to the rules and heuristics could form the basis of an Application View Definition. The following rules are used to provide user suggestions for Business Object Types. Business Object Types are suggested which are not the object of a based-on relationship to an Application View Definition which has been defined and either have a candidate listing operation (an operation which has an export Repeating Group View of cardinality greater than 1 which contains an Attribute View of at least one of the Attributes of the Business Object Type) which has no requirement to import Attribute Views, or have a candidate listing operation which has one or more required import Attribute Views but for which there is an Application View Definition which could supply those values from some existing Application View Field Definition;
3. it generates Application View Definition names where a user has selected a Business Object Type and has not supplied a name for the Application View Definition. The name of the Business Object Type is used together with a suffix to provide a unique default name for the Application View Definition. The user may subsequently change this name;
4. it checks Application View Definition Name uniqueness whenever a user supplies a name and/or Application Definition.

On completing Step 1, the DA Mechanism creates the Application View Definition 52 for the name supplied and if a Business Object Type was chosen, the based-on relationship is established to the Business Object Type between it and the Application View Definition. The DA Mechanism also adds the description for any Application View Definition supplied by the user.

Step 2—Choose a Listing Operation.

Figure 25:
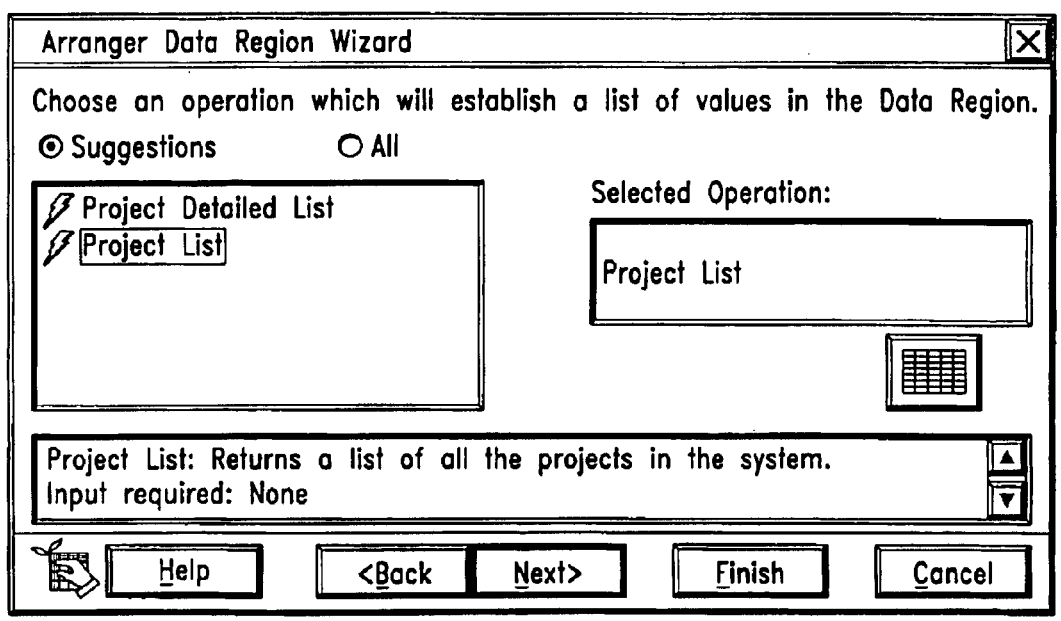
FIG. 25 is a window for a second Application Design Step.

The user interface to Step 2 is illustrated in FIG. 25. The primary purpose of this step is to solicit the name of an Operation of a type Listing which will act on the Application View Definition. A Listing Operation may be thought of as one which supplies values to one or more (typically many) rows in an Application View. When using Arranger, this is any operation which has an export Repeating Group View of cardinality greater than 1. In the Information View structure of an Operation, there may be more than one Repeating Group View. Operations which have this characteristic are said to offer multiple Listing Views. If an Operation offers multiple Listing Views, then these alternatives are distinguished for the user. The DA Mechanism assists functionality in this step by:

1. listing all Operations of type Listing by examining (on user request) the MON and listing all the Listing Operations;
2. suggesting Operation Usages of type Listing by examining (by default) the MON and analysing its current state using rules and heuristics to suggest zero, one or more Listing operations.

The following rules and heuristics are used to provide user suggestions for Listing operations:

when the Application View Definition has no "based on" relationship to a Business Object Type, suggest operations which service Object Types associated with Application View Definitions which:
have one or more Repeating Group View of cardinality greater than 1 which contain a view of less than one of the Attributes of the Business Object Type or
which have no required import Attribute Views but for which there is some existing Application View Definition which could supply those values;
when the Application View Definition has no "based on" relationship to a Business Object Type, suggest operations which belong to a Business Object Type which is the basis for an Application View Definition that:
have one or more export Repeating Group Views;
are not a Listing operation associated with an Application View Definition "based on" a Business Object Type;
have no required import Attribute Views or required import Attribute Views which can be satisfied by existing Application View Definitions;
within the Repeating Group Views is not composed exclusively of Attributes of the Business Object Type of the Application View Definition "based on" a Business Object Type (excluding Attributes of the type Workset).

On completion of the user input to Step 2, the DA Mechanism carries out the following operations including:
creating Operation Usage of type Listing for the selected operation; and
matching the Operation Usage to the Application View Definition.

For an Application View Definition 'based on' a Business Object Type, the heuristics here are, for each export Attribute View of the chosen Repeating Group View of the Operation Usage:

1. If an Application View Field Definition exists which represents the same Attribute as the Attribute View, then transfer the Application View Field Match object from the unused Operation Effect object to a Listing Effect object and associate the Application View Field Definition to the Attribute View via the Application View Field Match object.
2. If an Application View Field Definition does not exist for an Attribute View of an Attribute of the Business Object Type then to create a new Application View Field Definition in the Application View Definition and transfer the match object as before.

For Application View Definition with no 'based on' a Business Object Type, the heuristics here are, for each export Attribute View of the chosen Repeating Group View of the Operation Usage:

1. If an Application View Field Definition exists which represents the same Attribute as the Attribute View, then transfer the Application View Field Match object from the unused Operation Effect object to a Listing Effect object and associate the Application View Field Definition to the Attribute View via the Application View Field Match object.
2. If an Application View Field Definition does not exist for an Attribute View, but the Attribute View is of the same Entity Type as that of the current Application View Field Definition, then create a new Application View Field Definition in the Application View Definition and transfer the match object as before.

Step 3—Choose Auxiliary Operations.

Figure 26:
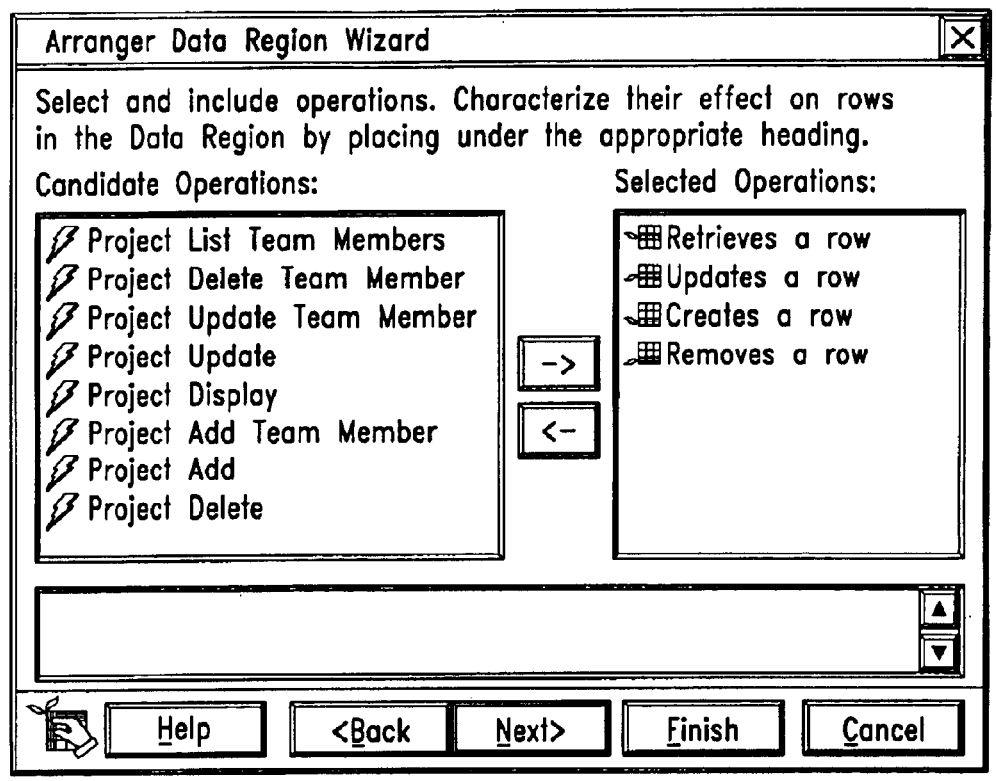
FIG. 26 is a window for a third Application Design Step.

The user interface to Step 3 is illustrated in FIG. 26. The primary purpose of this Step is to allow the user to select other Operations of interest which have some effect on the current Application View Definition.

An Operation can be said to have some effect on an Application View Definition if one of its Attribute Views is an Attribute of a current Application View Field Definition, or one of its Attribute Views is the same Object Type as the Application View Definition is based on, or one of its Attribute Views is of the same Entity Type as that of a current Application View Field Definition. The DA Mechanism provides functionality to help these tasks by listing Operation Usages that may have some effect. The DA Mechanism identifies candidate Auxiliary Operations by examining (by default) the MON and analysing its current state by using rules and heuristics to suggest zero, one or more Auxiliary Operations.

For an Application View Definition with associated Object Type, Operations of the Object Type associated with the Application View Definition are suggested which have one or more non-repeating Attribute Views which are of Attributes of the Object Type and do not already have one or more occurrences of Operation Usages already matched to this Application View Definition.

For Application View Definitions without associated Object Types, Operations are suggested which do not already have one or more occurrences of Operation Usages already matched to the Application View Definition and have one or more non-Repeating Attribute Views whose Attributes are currently represented as Application View Field Definitions in the Application View Definition and/or have one or more non-Repeating Attribute Views which are of the same Entity Type as that of a current Application View Field Definition.

The user may provide a classification of the Operation Effect Type for each candidate Operation selected by placing an operation under the appropriate heading. In the user interface 26, "Retrieves a row" represents a Detail effect type operation, "Updates a row" represents a Update effect type operation, "Creates a row" represents a Add Row effect type operation and, "Deletes a row" represents a Delete Row effect type operation.

On completion of the user input to Step 3, the DA Mechanism carries out the following Operations (assuming the user has selected one or more Auxiliary Operations).

For each selected Operation, the DA Mechanism creates an Operation Usage for the selected Operation. The Operation Usage Type is set to the Type specified by the User. If the type is 'Detail', or 'Update', this Operation is associated as being 'triggered by' the 'Position On' Application View Event. This Operation Usage is appended to the end of any existing sequence of Event Triggers for the Application View Event.

It matches the Operation Usage to the Application View Definition. This is handled differently depending on whether the Application View Definition is based on a Business Object Type.

For an Application View Definition with associated Business Object Type, the matching heuristics are, for each non-Repeating Attribute View of the Operation Usage:

1. If an Attribute View Field Definition exists which represents the same Attribute as the Attribute View, then transfer the Application View Field Match object from the unused Operation Effect to the Listing Effect object and associate the Application View Field Definition to the Attribute View via the Application View Field Match object.

2. If an Application View Field Definition does not exist for an Attribute View of an Attribute of the Business Object Type, then create a new Application View Field Definition in the Attribute View Definition and transfer the match object as before.

3. If the Attribute View is of another Business Object Type, then the Application View Definition is not extended.

4. If the Attribute View is of another Entity Type (which is not a Business Object Type), then the Application View Definition is extended and matched as before if:

5. a relationship of 1:1 cardinality exists between the 'based on' Business Object Type and the Entity Type, or 6. the Attribute View represents an attribute of the type 'Workset'.

For an Application View Definition without associated Business Object Type, the matching heuristics are substantially the same as for an Application View Definition with associated Business Object Type, with the exception of heuristic 2, which is replaced by:

2. If an Application View Field Definition does not exist for an Attribute View, but the Attribute View is of the same Entity Type as that of a current Application View Field Definition, then create a new Application View Field Definition in the Attribute View Definition and transfer the match object as before.

Step 4—Resolve Required Import Attribute Views.

Figure 27:
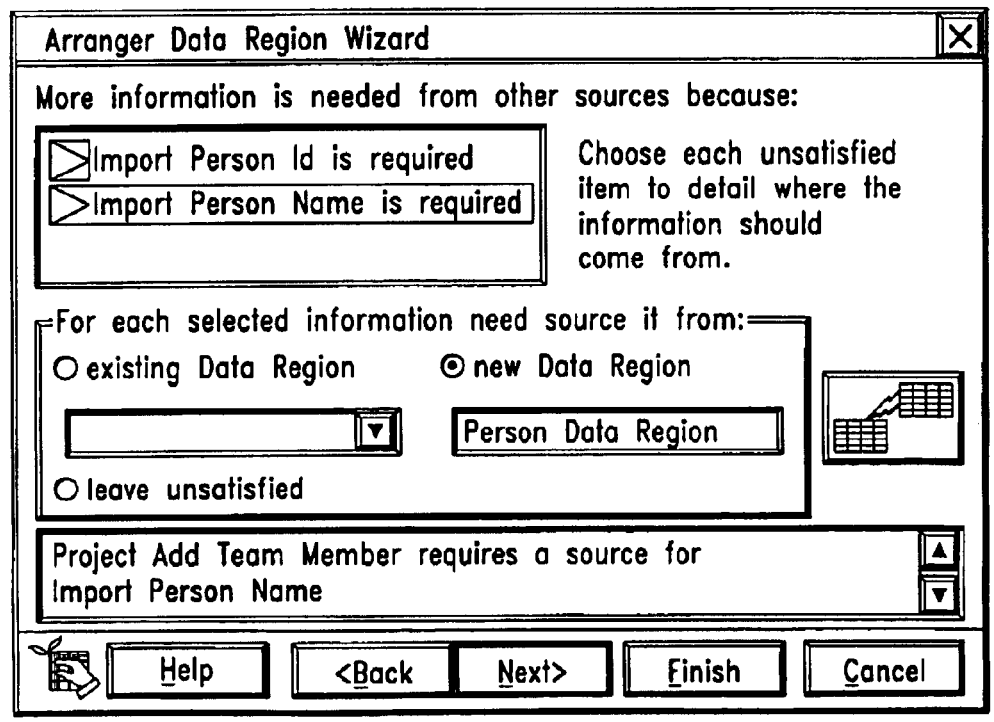
FIG. 27 is a window for a fourth Application Design Step.

The user interface for Step 4 is illustrated in FIG. 27. The primary purpose of this Step is to allow the user to resolve the source of required import Attribute Views of Operation Usages for which the DA Mechanism has not yet resolved a match. For each required import Attribute View, the user may choose whether the system should create a new Application View Definition (with appropriate current Application View Field Definition) and match the Attribution Field to that Application View Field Definition, use an existing Application View Definition (with appropriate an Application View Field Definition) and match the Attribution View to that Application View Field Definition, and/or ignore the need for a match for the Attribute View.

The DA Mechanism provides support for these tasks by the following functionality:

1. The DA Mechanism will examine (by default) the MON to look for the existence of a relationship from any required Attribute View, or to an Application View Field Definition via an Application View Field Match;

2. It will suggest a resolution for unmatched Attribute Views using appropriate heuristics, namely:

If an Application View Field Definition exists for the same Attribute as the Attribute View, then suggest that this is used for resolution.

If more than one Application View Field Definition exists, then suggest alternatives to the user.

If no Application View Field Definition exists for the same Attribute as the Attribute View, then suggest that a new Application View Definition (with appropriate current Application View Field Definition) be used for resolution.

On completion of user input to Step 4, the DA Mechanism carries out selected resolution for each required Attribute View. If the user has marked an Attribute View to be ignored, no changes are made. If more than one Application View Field Definition exists and the user has not elected a preference, then the system uses the first one in the list.

Figure 28:
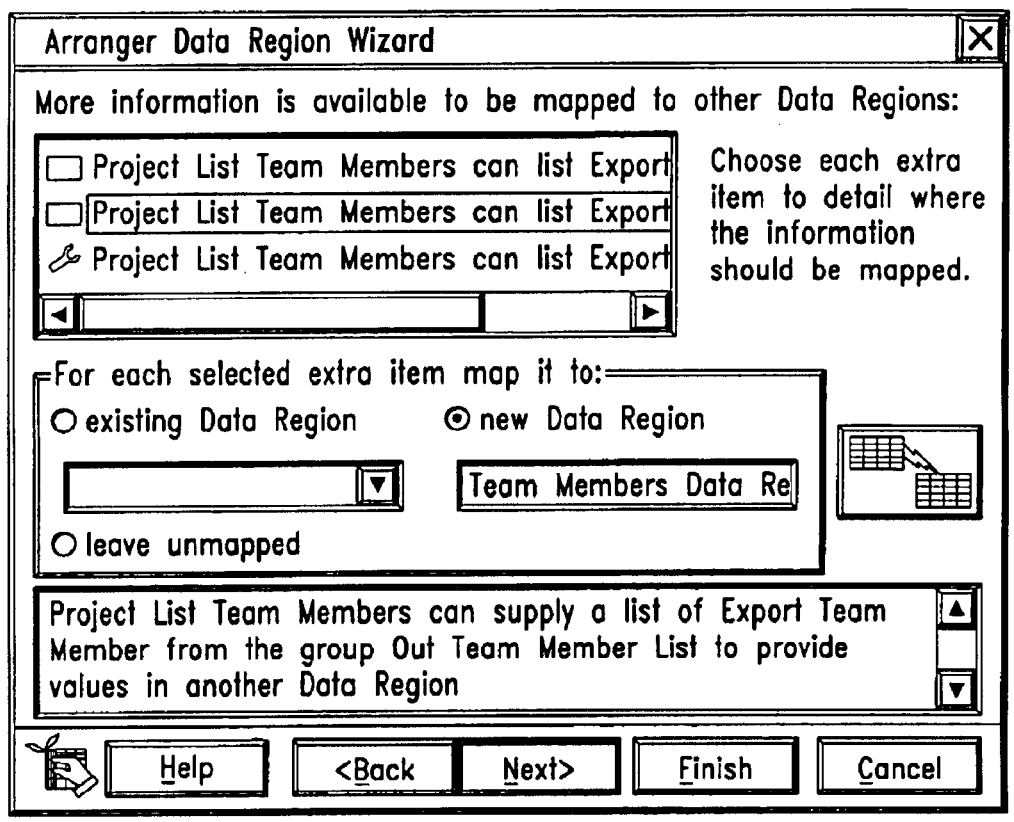
FIG. 28 is a window for a fifth Application Design Step.

Step 5—the user interface to Step 5 is illustrated in FIG. 28. The primary purpose of this Step is:

to surface to the user export Repeating Group Views from the Operation Usages which are currently unmatched, which may be used as the Listing Operations to an additional, or existing, Application View Definition;

for each Repeating Group View the user may choose whether the system should:

create a new Application View Definition (with appropriate current Application View Field Definitions) and match the Repeating Group View to that Application View Field Definition as a Listing Operation;

use an existing Application view Definition (with an appropriate Application View Field Definition) and match the Repeating Group View of that Application View Field Definition;

ignore the Repeating Group View.

The DA Mechanism provides the following functionality to help this task by:

1. examining (by default) the MON to look for any Repeating Group View whose Attribute Views are unmatched to an Application View Field Definition thereby finding all unmatched Repeating Group Views; and
2. suggesting a resolution for unmatched Attribute Views using appropriate rules and heuristics.

The DA mechanism examines (by default) the MON to look for an Repeating Group View whose Attribute Views are unmatched to an Application View Field Definition.

The following Rules are used to suggest a use for each Repeating Group View:

If the Repeating Group View is matched, then suggest that the Repeating Group View is ignored.

If an Attribute View Definition of a Repeating Group View is unmatched, then:

if all Attribute Views are of an Attribute of type 'Workset' suggest that it is ignored;

if an Application View Definition exists which does not have a listing operation, and this Repeating Group View has one or more Attribute Views which represent Attributes of the based on Business Object Type of the Application View Definition suggest that it be used as the Listing Operation to that Application View Definition;

otherwise suggest it be used as the Listing Operation to a new Application View Definition.

On completion of user input to Step 5, the DA Mechanism carries out selective resolution for each Repeating Group View. When the suggestion is other than "ignored", the system will process each Repeating Group View as follows:

when the suggestion is to create a new Application View Definition, if all Attribute Views of the Repeating Group View represent the same Entity Type, and that Entity Type is an Object Type, then the new Application View Definition is based on the Object Type;

the Operation Usage is then processed against the Application View Definition (new or existing) in the same way as Step 2 is processed;

if more than one existing Application View Definition is suggested for a Repeating Group View and the user does not elect a preference, then the system uses the first one in the list.

Step 6—Editing Application View Field Definitions.

Figure 29:
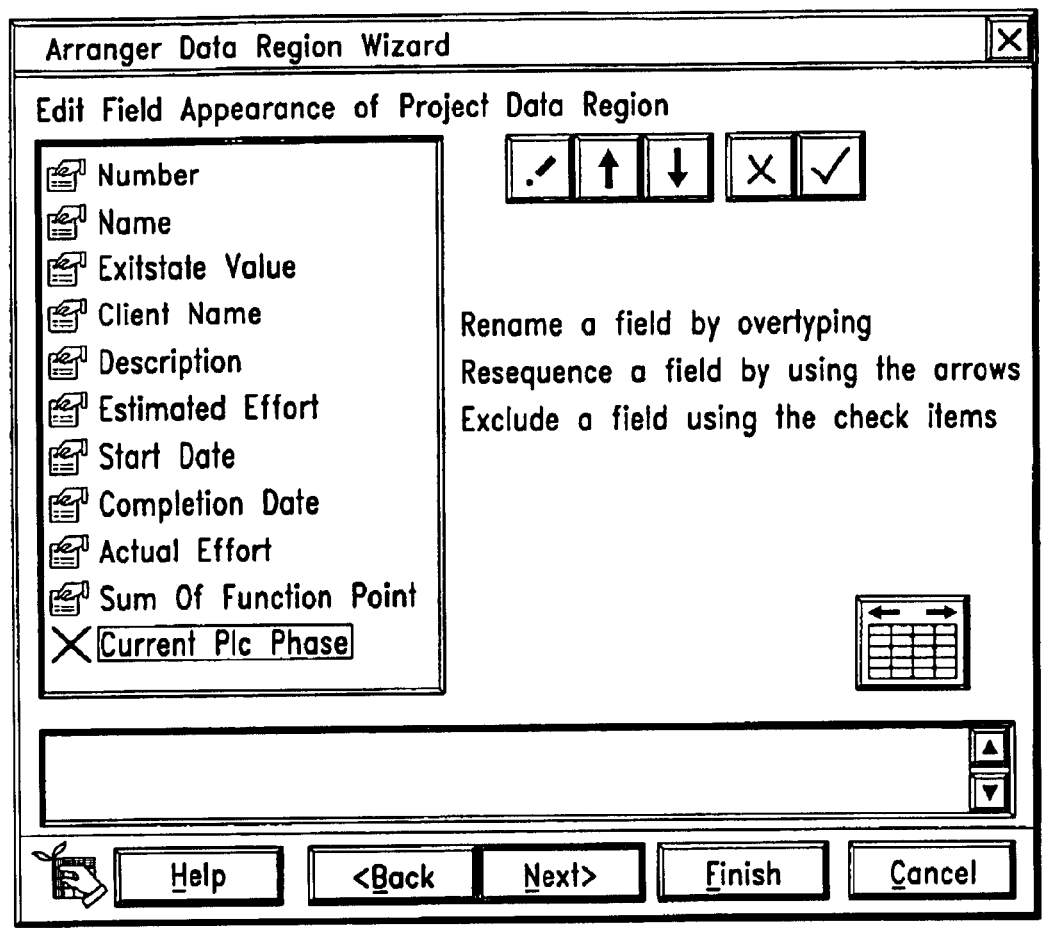
FIG. 29 is a window for a sixth Application Design Step.

The user interface to Step 6 is illustrated in FIG. 29. The primary purpose of this Step is to allow the user to edit various aspects of the Application View Field Definitions of the current Application View Definition. The user may:

change the name of any Application View Field Definition;

change the sequence of the Application View Field Definitions and the Application View Definitions;

remove unwanted Application View Field Definitions.

The DA Mechanism ensures that:

the new name of any Application View Field Definition is unique within the scope of the name of any Application View Definition; and any Application View Field Definition the user wishes to remove is not a field which supplies values for a required import Attribute View (in which case removal is disabled).

On completion of user input to Step 6, the DA Mechanism ensures that the Application Design reflects the selected edit changes.

Step 7—Completion.

Figure 30:
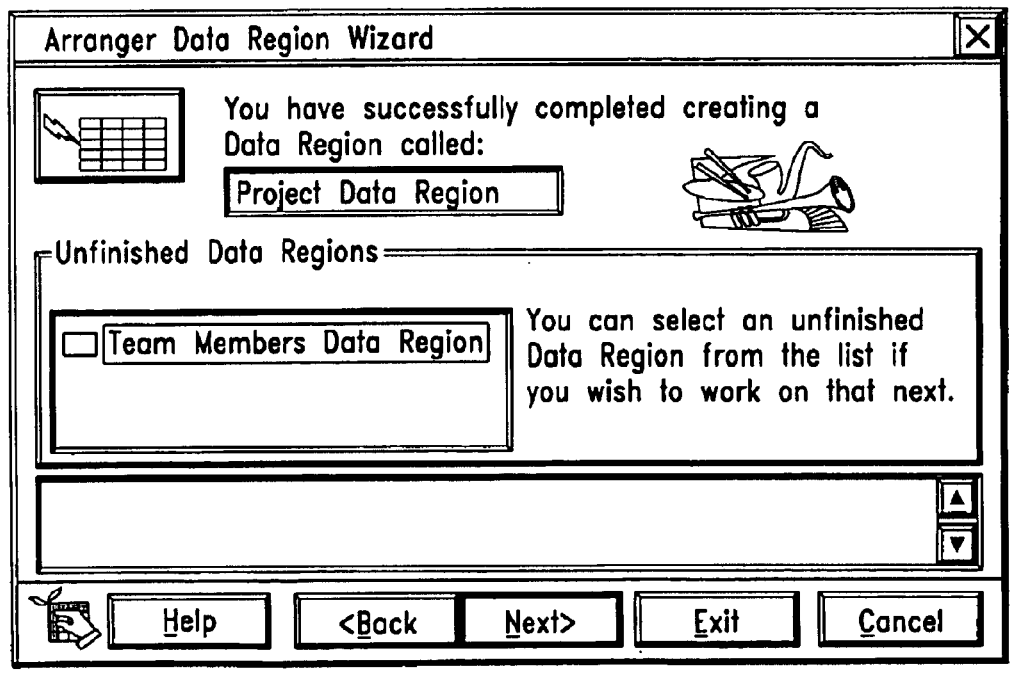
FIG. 30 is a window for a seventh Application Design Step.

The user interface to Step 7 is illustrated in FIG. 30. The primary purpose of this Step is to allow the user to select other unfinished Application View Definitions (those created by Step 4 or 5 to be taken through the DA Mechanism process). If no other Application View Definitions were created, the system merely allows the user to exit the system. If no other Application View Definition was selected, the DA Mechanism terminates its current session and returns the associated IA Object Server to the calling program. If an Application View Definition is selected, the DA Mechanism is invoked again, this time in the "Edit" mode. The DA Mechanism can be invoked to augment the Operations of an existing Application View Definition, from itself in a recursive fashion, or by calling programs. In the edit mode, the DA Mechanism uses a set of heuristics to assess the state of the Application View Definition and to choose an appropriate Starting Step. Apart from the evaluation of the Starting Step, the DA Mechanism proceeds as per the process outlined above. The heuristics used to determine a Starting Step are as follows:

if the Application View Definition has no based on Object Type, and there are no Operation Usages which have some effect on the Application View Definition, then the DA Mechanism will start from Step 1;

if the Application View Definition has no Listing Operation and no Auxiliary Operations, then the DA Mechanism will start from Step 2;

if the Application View Definition has a Listing Operation or has Auxiliary Operations, then the DA Mechanism will start from Step 3.

There has therefore been described the generation of the Application View Definitions using the Application Design Tool and DA Mechanism, both of which use the underlying services of the IA Object Server. The operation of the Application (Runtime) engine, which corresponds to the Runtime Data Management Object 96 of FIG. 19 and automatically creates and manages Application View instances from their respective Application View Definitions will now be described.

Figure 31:
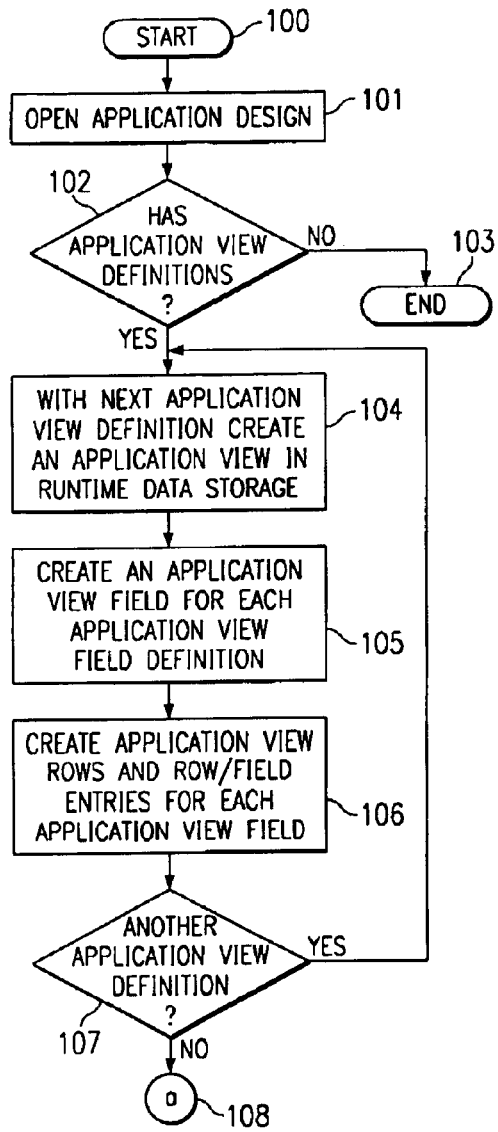
FIG. 31 is a flow diagram showing the initiation of a run-time Application Engine.

FIG. 31 is a flow diagram illustrating the initialisation of the Application Engine. The aim of this process is to create the Runtime Data Management Objects for the corresponding Application View Definitions in a specific Application Design.

After initiation (Step 100), in Step 101, the Application Design object is made available to the Application Engine.

In Step 102, a test is made whether the Application Design contains at least one Application View Definition. If not, the process terminates (Step 103).

Otherwise, in Step 104, an instance of the Application View Definition object is created in Runtime data storage and the properties of the Application View are set to reflect that of the Application View Definition.

In step 105, for each Application View Field Definition which details the Application View Definition, an instance of the Application View Field Definition object is created in Runtime Data storage and the properties of the Application View Field are set to reflect that of the Application View Field Definition.

In step 106, with reference to the Application View MaxRows property, space is created or reserved (if required by the underlying computer system) for that number of Application View Rows. For each Application View Row and Application View Field pairing creating or reserving space for the Row/Field entry.

In step 107, if there are more Application View Definitions the process is repeated, otherwise control passed to step 108.

Figure 32:
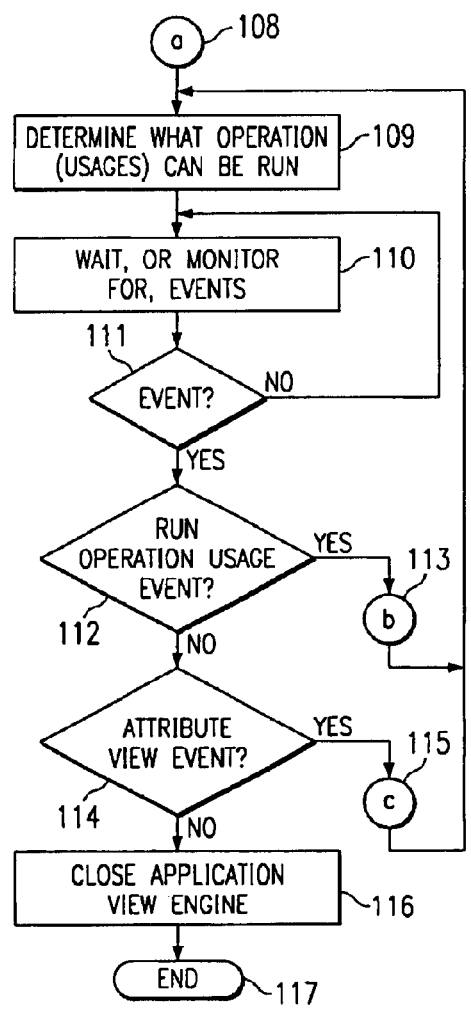
FIG. 32 is a flow diagram describing an Event Monitoring process.

Once the Application Engine is initialised, it is then ready to respond to process Operation Usages and external events which cause Application View Events to be triggered. When an Event is detected, the process to handle that Event is invoked. The requests can be processed synchronously or asynchronously. FIG. 32 illustrates event processing as a synchronous process.

From Step 108, a determination is made in Step 109 on first entering the event monitoring process and after each Event has been processed as to what Operation Usages could be run on the basis of input Attribute View value satisfaction. Any external object representing the operation usage is informed of its status. In the preferred implementation of the invention this information is used to enable and disable use of elements of the user interface (push buttons) which represent each operation usage.

After waiting for an Event (Step 110) and on detecting an event (Step 111) the type of event is determined. If the event signals the running of an Operation Usage (Step 112) then an Operation Usages (Step 113) can be run, after which the process is repeated from Step 109. Alternatively, if the event type signals an Attribute View Event (Step 114) and Attribute View Event (Step 115) can be run, after which the process is repeated from Step 109.

Finally, if the event type is a Close event then the Application Engine closes (Step 116), and the process terminates (Step 117).

Figure 33:
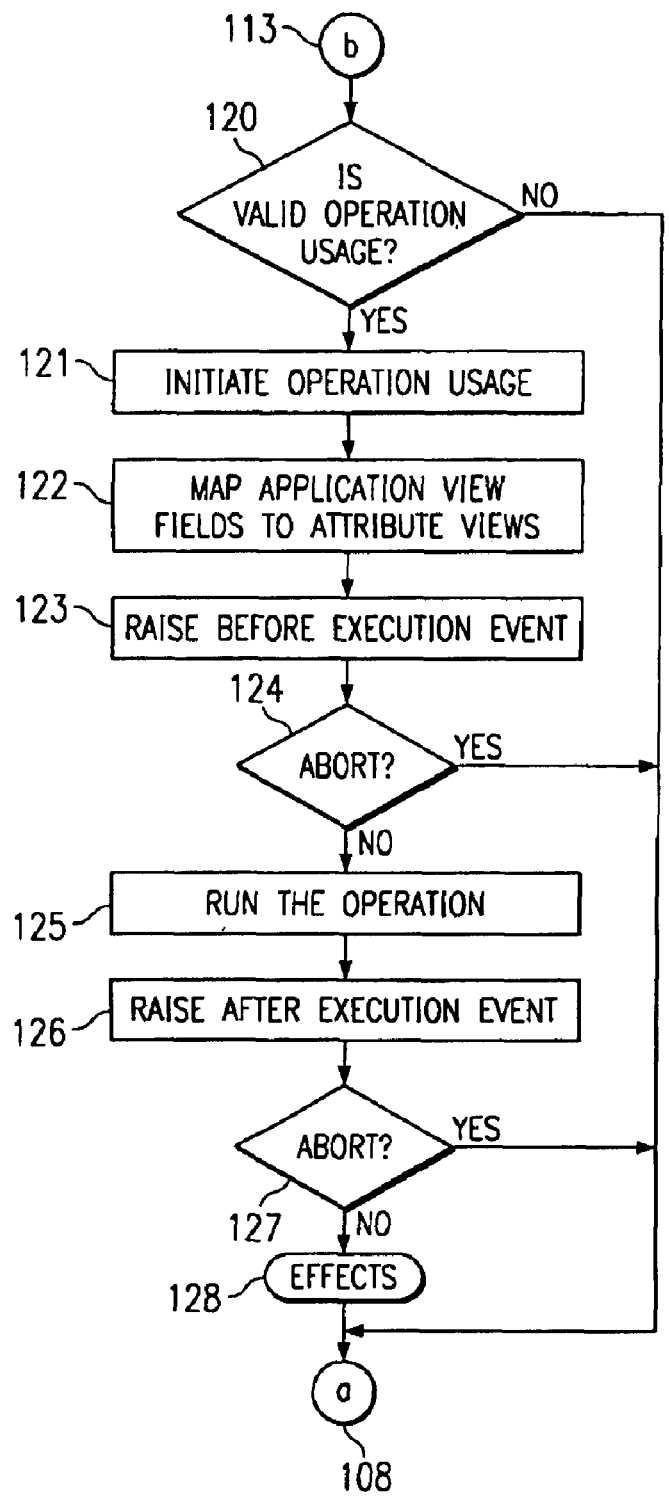
FIG. 33 is a flow diagram describing a Run Operation Usage Event process.

FIG. 33 is a flow diagram describing the process of invoking an Operation Usage within the Application Engine. The aim of this process is:
1. automatically to map input Attribute View values to the operation from Application View Fields;
2. automatically to map output Attribute View values from the operation to Application View Fields;
3. to manage the effects of Operations on Application Views and trigger associated Application View Events.

In step 120, for any required import Attribute Views, the matched Application Views are checked to see that they have values. This is invalid if unsatisfied and then control returns to 108.

In step 121, the Operation and Attribute Views to be mapped are identified.

In step 122, the Application View Field Match objects are used to evaluate the Application View Field values to copy Attribute Views. If the Overwrite property of an Application View Field Match object is true, user supplied values (if any) are given preference to existing Application View Field values. If the user supplies a new value for an Application View Field, but the Application View Field is not matched via an Application View Field Match object Overwrite property of true, the new value is ignored. The system may override that value (returning the Application View Field's value), warn the user of the potential loss of information or suggest an Operation, (if any) which would take the new value.

In step 123, an Event is invoked for the user to interact with the process. The user is allowed to carry out transformation rules on an Import Information View.

If the process is not aborted in Step 124, then the Component (in the preferred implementation this equates to an Arranger Business Object Type) is requested to run the Operation in Step 125. If the process is not aborted in Step 127 (for example if the Operation fails to run correctly due to a networking error) the Operation Effect objects associated with this Operation Usage are processed in Step 128 and control passes back to Step 108.

Figure 34:
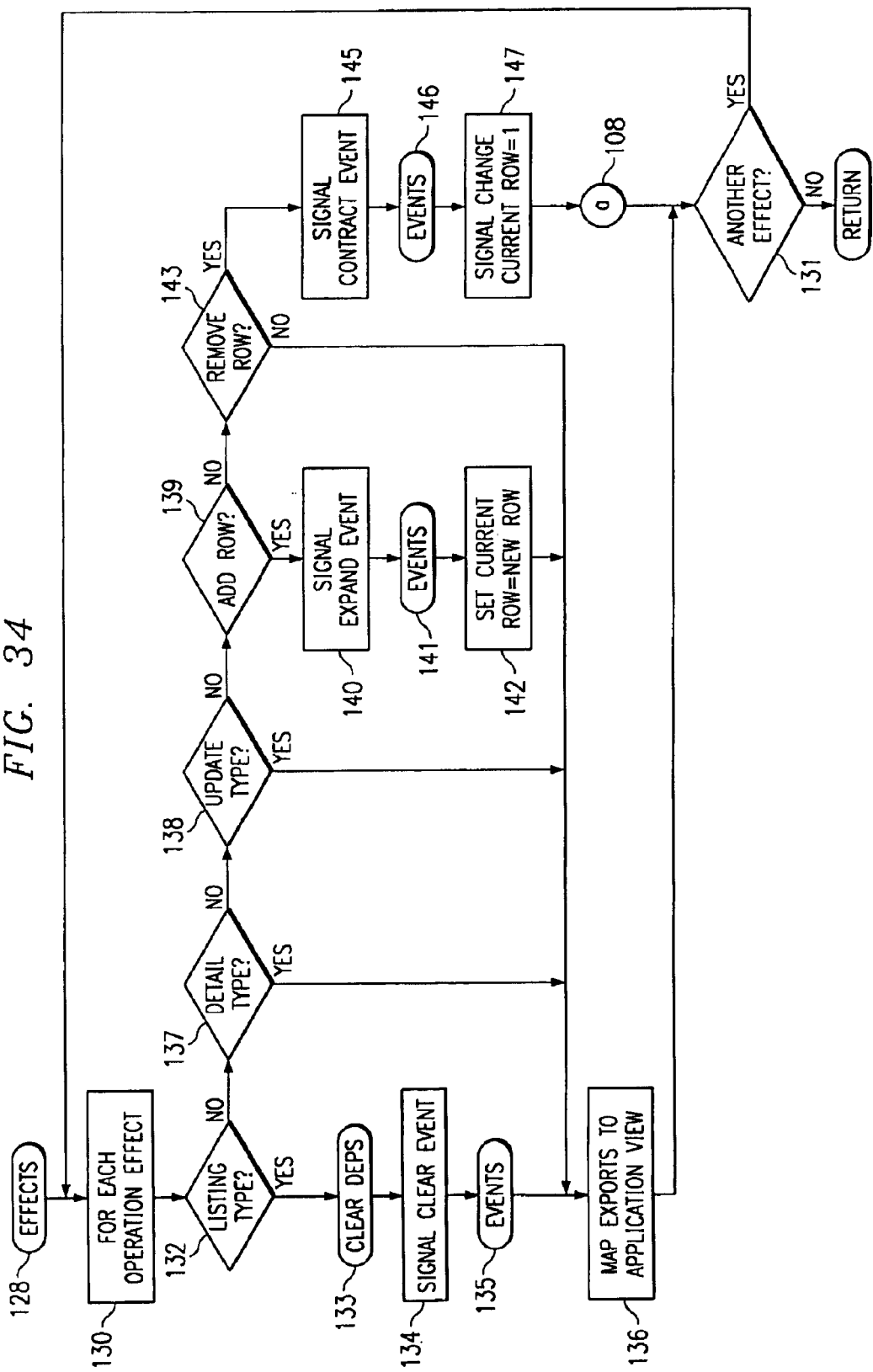
FIG. 34 is a flow diagram describing the processing of Operation Effects for an Operation Usage.
Figure 35:
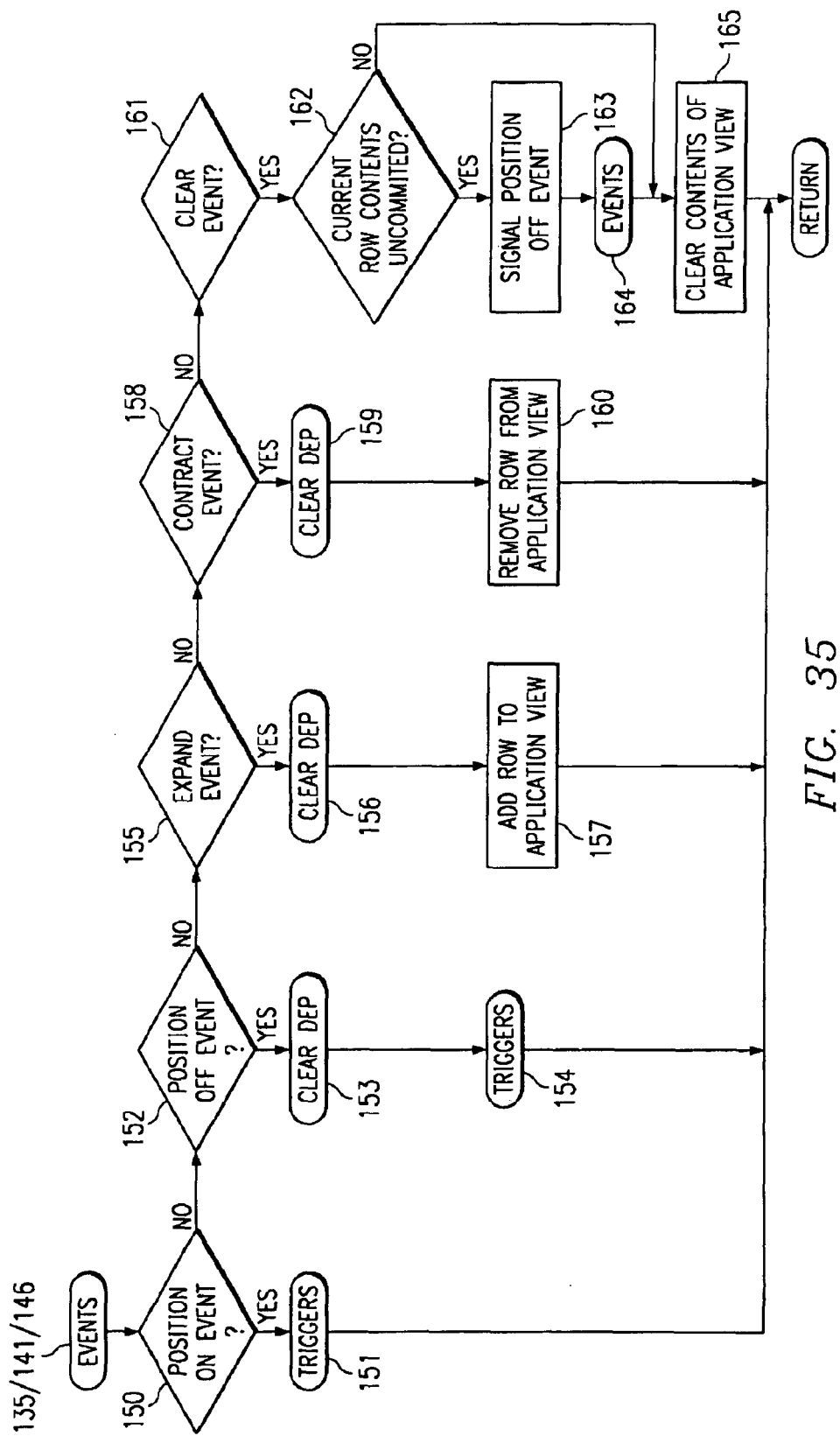
FIG. 35 is a flow diagram for Application View Event processing.

FIG. 34 expands the Step 128 for processing Operation Effects as part of the process of invoking and Operation Usage.

In Step 130, for each Operation Effect, for the Operation Usage in question, processing is performed on the basis of the Effect Type. It starts with the Operation Effect for this Operation Usage/Application View Definition pairing.

For a Listing type (Step 132) the process steps include:
  in Step 133 a Clear Dependents module is processed;
  in Step 134 the Events module is called to process an Event of type Clear;
  the Events module (Step 135).

For a Detail type (Step 137) or Update type (Step 138) no special processing is required.

For an Add Row type (Step 132) the process steps include:
  in Step 140 the Events module is called to process an Event of the type Expand;
  the Events module (Step 141);
  in Step 142 the current row is set to that of the new row (This does not use the Change Row Event to do this, since it is unnecessary to trigger the Position Off and Position On Events. It is an option (not shown) to signal a Position On Event after setting the current row).

For a Remove Row type (Step 143), process steps include:
  the Events module is called (Step 145) to process an event of type Contract;
  the Events module (Step 146);
  in Step 147 a Change Row Event is signalled to a system (The new row is by default the first row, but could be any row in the remaining table).

In Step 136, the Application View Field Match objects are used to evaluate the Application View Field values to copy from the Attribute Views. In the case of a Remove Row Effect, any values which would have been mapped into the current row of the Application View are now not mapped (since the row has been removed). In an implementation, these values might be saved elsewhere, for other purposes (user confirmation for example).

Application View Events are processed by the system in accordance with FIGS. 32, 33 and 34. Each Event type is processed in a different way.

For a Position On Event (Step 150) the evaluation of its associated triggers is performed (Step 151) before returning to the caller (there are no effects on the Application Views unless caused by the triggers).

For a Position Off Event (Step 152) any dependent Application Views are cleared (Step 153) before the evaluation of its associated triggers is performed (Step 151) and subsequently returning to the caller.

For an Expand Event (Step 155), any dependent Application Views are cleared (Step 156) before the Application View is expanded (Step 157) to hold another row.

For a Contract Event (Step 158) any dependent Application Views are cleared (Step 159) before the Application View is contracted (Step 160) by removing a row.

For a Clear Event (Step 161), if the current row has data values which have been altered and then have not been used to import to an Update type Operation Usage, then the contents of the current row are uncommitted (Step 162). In this case, the Position Off Event is signalled Steps 163, 164). Finally, the Application View contents are cleared of all values (Step 165).

Figure 36:
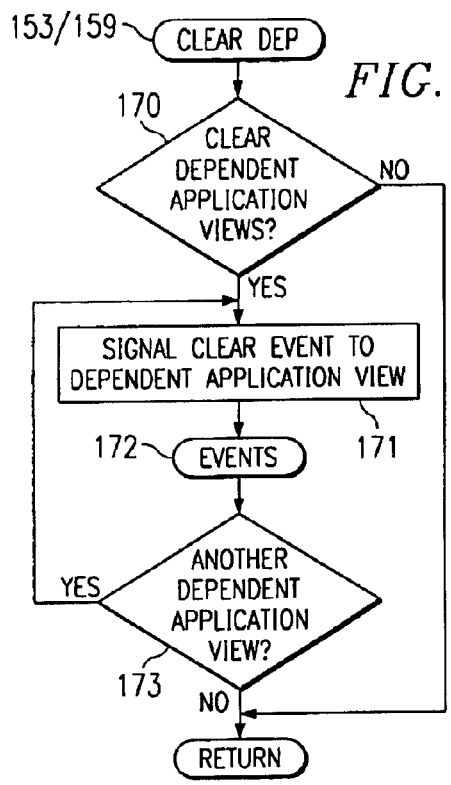
FIG. 36 is a flow diagram for Clearing Dependent Application Views.

FIG. 36 illustrates the process of clearing dependent Application Views. The system determines (Steps 170, 173) whether there are dependent Application Views which need to be cleared in the context of the current Operation Usage or Application View Event. Each dependent Application View is sent a Clear Event Signal (steps 172, 173).

Figure 37:
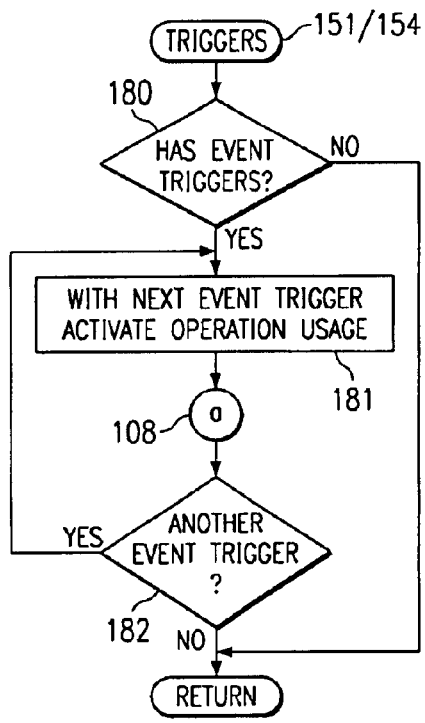
FIG. 37 is a flow diagram for Processing the Event Triggers of an Application View Event.

FIG. 37 illustrates how the Event Triggers associated with the Position On and Position Off Events are processed. The Event Triggers are a sequenced association of objects. The process here iterates through the collection (Steps 180, 182), causing each Operation Usage identified by the Event Trigger to be invoked (181).

Figure 38:
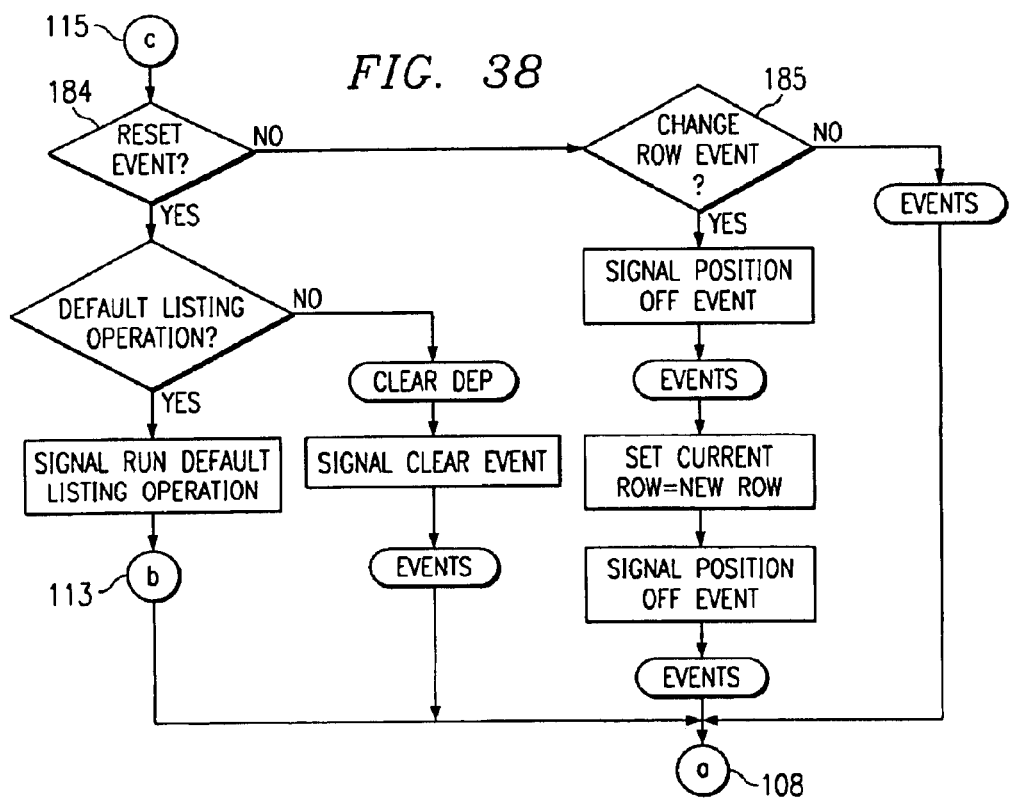
FIG. 38 is a flow diagram for External Application View Events.

FIG. 38 illustrates the process for managing the effect of Application View Events on Application Views and trigger associated Operations. There are two externally available Events which cause Application View Events to be triggered. One is a Reset (Step 184) of the Application View and the other is a change (Step 185) in the current row of an Application View. Both of these events may be signalled internally if raised as a consequence of an Operation Effect. The steps in either case are set out in FIG. 38.

There has, therefore, now been described the Application Engine implemented in 96, which uses information about an Application Design sourced from the IA Object Server to automatically create and manage Application View Instances.

There will now be described a method of implementing of Applications which utilise an Application Design and the services of the Application Engine and other features of the invention.

It will be appreciated that any application is built within a specific computing environment, using specific computer languages, features and the like. The preferred embodiment of the invention is to enable applications to be constructed in Microsoft Corporation's Visual Basic 4.0 programming environment.

In utilising this programming environment, a number of the components comprising an application are implemented as to provide the best 'fit' with the product's features. There now follows a description of some of the specific components used, and the product features adopted.

As previously stated, the invention is implemented using Microsoft Corporation's OLE technology. More preferably the Arranger Object Server is implemented as an OLE control (or OCX), this OCX is also referred to as the Business Task OCX, or Business Task control. The provision of this OCX is useful to aid integration of Application Views into target products by providing two useful services.

The first is embedding the Business Task, including its Application View Design information. The OCX provides the ability to embed (in the OLE sense) the Business Task with a component document/application. This capability removes the need to keep the MON in a separate file the component document/application.

The second is Binding. When the OCX loads its MON, it automatically creates specified integration assistant Object Server and "binds" it by passing the MON as an initialising parameter. The integration assistant object server itself can then initialise its object structure to reflect the MON.

In addition, Arranger provides an OLE control representing an Operation. It has a default appearance of a push button on a user interface, and provides a mechanism for invoking operations at runtime with the following features:

The OCX provides a mechanism for invoking operations at runtime. In some ways it is similar to the functionality supplied by the Arranger's BTI, but has the following distinctions:

this OCX is designed to capture the specification needed to identify which operation usage from those defined in the MON is to be invoked;

as an OCX, it looks like a button and therefore provides a user interface activation method for running the operation;

as an OCX, it supports event handlers. This provides means by which interactions with the Arranger operation information views can provide transformation rules or other processing.

Execution of an operation is divided into two user accessible events:

1. BeforeExecution—after the mapping of Application View Fields into the import Attribute Views, but prior to invoking the operation itself;

2. AfterExecution—after the invocation of the operation itself, but prior to the mapping of export Attribute Views into Application View Fields.

To provide the best integration into Visual Basic of runtime data (Application Views), information is available via an implementation of a Data Source control. The Data Source Control—OCX provides mechanisms to make data available to Data Bound Controls (data consumers) which render a display, or the use of, the data inside the resulting application. Numerous Data Bound Controls which all adhere to this common mechanism are available. An implementation of the data source OCX is supplied with the Visual Basic 4.0 product.

The preferred source of data for a Data Source control is a Microsoft Access database, which is coupled to a Data Source control via a Data Access Object. These three components are standard features available in Visual Basic 4.0 for construction of applications. In order to take advantage of this existing mechanism, the Application Engine interacts with the Data Access Object to maintain Application View instance information (as previously described) in an Access Database.

Figure 41:
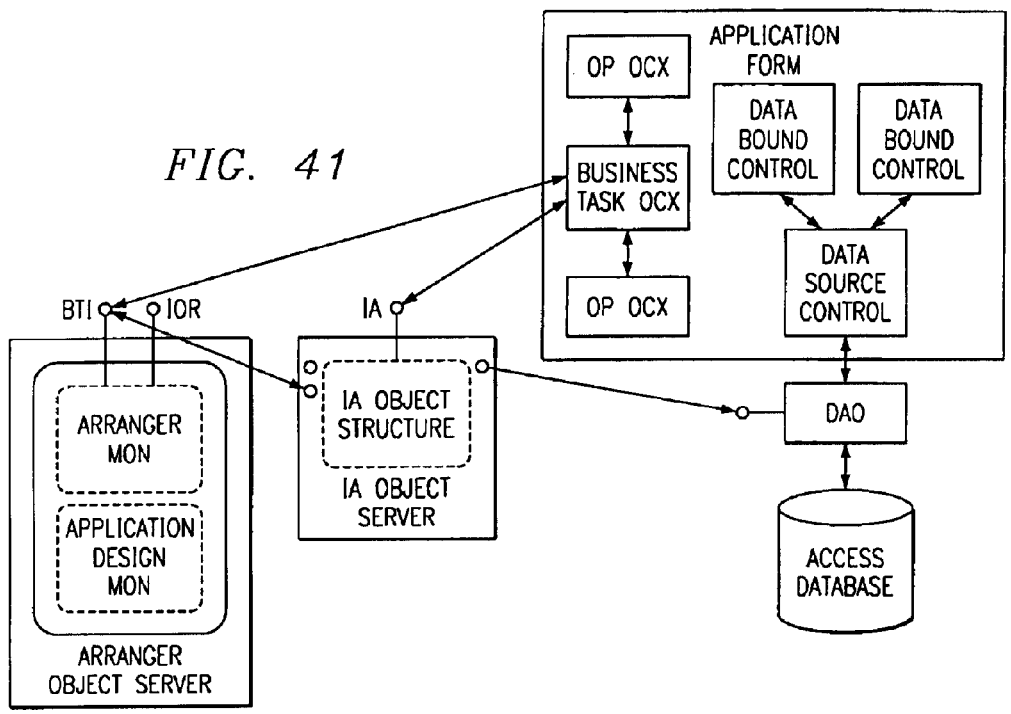
FIG. 41 is a schematic diagram representing an Architecture of a Visual Basic Application incorporating the invention.

FIG. 41 illustrates the architecture of an application built with Visual Basic which uses the business task OCX, the operation OCX and integration assistant object server with runtime data storage handled by a data access object and Access database.

The source code and components (as described above) to create a 'starter' application is delivered as sample Visual Basic program, or template. The template can be compiled immediately into a running program, which only requires a Business Task file containing Application Design to function. Thus the user may choose not to modify the template in any way, but merely to create an executable program from the template. Rather than have the user carry out this potentially unnecessary step, and to bypass the need for the Visual Basic programming environment to be used by the user, the executable program can form part of an embodiment of the invention. This program is also referred to as the Integration Assistant Test Tool. This tool is available from the Application Design Tool to test and visualise any Application Design.

Figure 42:
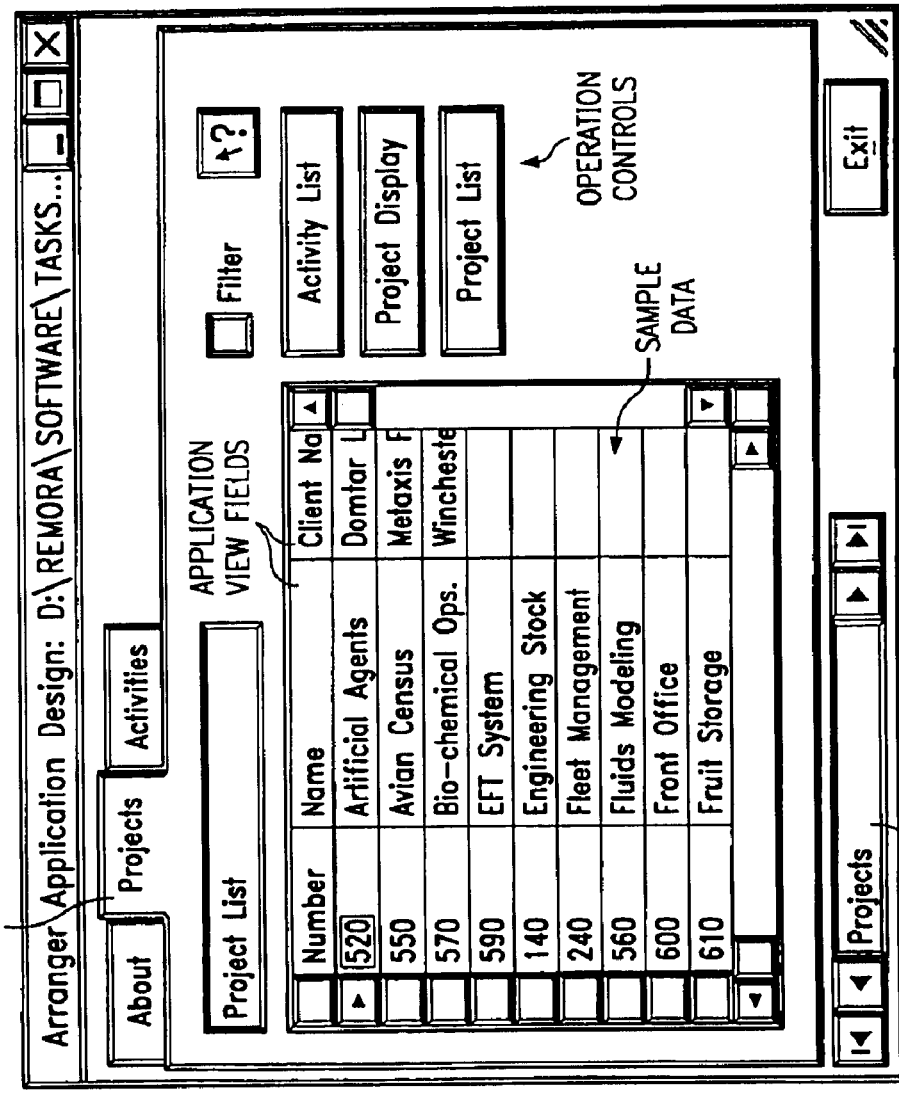
FIG. 42 illustrates a main window of an IA test tool.

When used in this manner the template program will, in the first instance, copy the MON information from the Business Task file into an embedded Business Task control which is present on the main window (invisible to the end user). The MON in now available as an in-memory OLE object structure (as previously described) from the Business Task control. The program will then open a main window which is configured for the Application Design described in the Business Task control. The window offers a 'tab' for each Application View of the Business Task control (for example Projects and Activities in FIG. 42). Each Operation Usage in the Business Task control is represented as an Operation control, for example the push buttons Activity List, Project List and Project Display of FIG. 42 are Operation controls.

The Application View associated with the tab is shown in a grid, or matrix. Each column represents an Application View Field (titled with the name of the Field). Each row represents a set of related values. When an Operation control is pushed, the associated Arranger operation is run via the Application View runtime engine. The data values are retrieved from and placed in a database associated with a Data Source Control in accordance with the Application View engine's rules. The data values in the grid area reflect the relevant values in the associated Data Source Control database, being updated whenever the database changes.

The 'Filter' Option allows the user to filter the list of Operation controls to only those which have some effect on the currently visible Application View tab.

The technique of supplying a template provides the users with the ability to define their own general purpose applications by modifying the template framework. For example, a user may modify the template to provide a different user interface display of the data, or provide clipboard copy and paste of data. Once this enhancement has been added, all Application Designs which are used with this new application will take on that appearance or functionality.

There has, therefore, now been described a template and mechanism for supplying general purpose applications which will work with any Application Design.

There will now be described the implementation of an assembly tool, used within Visual Basic to aid application designers build alternative applications, based on a template.

A Visual Basic AddIn application (An AddIn can be considered as an auxiliary program to the main Visual Basic Program) can provide access through menu options and push buttons on associated windows to access:

Integration Assistant Design Tool (as previously described)

Form Configuration Tool

Layout Manager

The functions of a Form Configuration tool are:

a) To configure a Visual Basic project (a project is the collection of code, window designs and the like which make up the source material of an application) with the template for Application Views for use with a particular Business Task;

b) to provide access to, and layout of, OLE controls which represent:

Operation Usages in the business task control

Application Views in the business task control on user-defined Forms (Forms in Visual Basic are the developer's medium for creating a window design. A form equates to a window. A (OLE) control represents an element on the form (usually it is visible to the user), like a push button, or text area), at the direction of the user c) to provide removal of OLE controls which represent:

Operation Usages in business task control

Application Views in business task control

Figure 1:
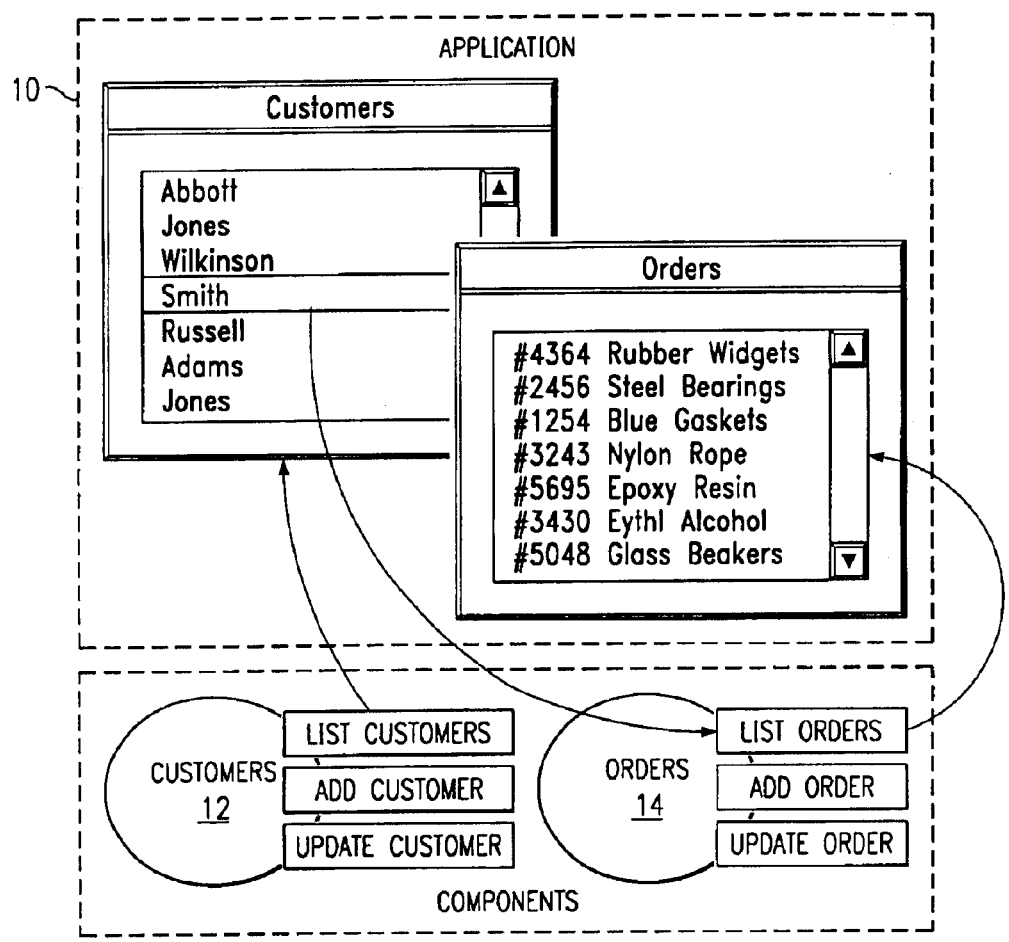
FIG. 1 is a schematic representation of components and an application.
Figure 2:
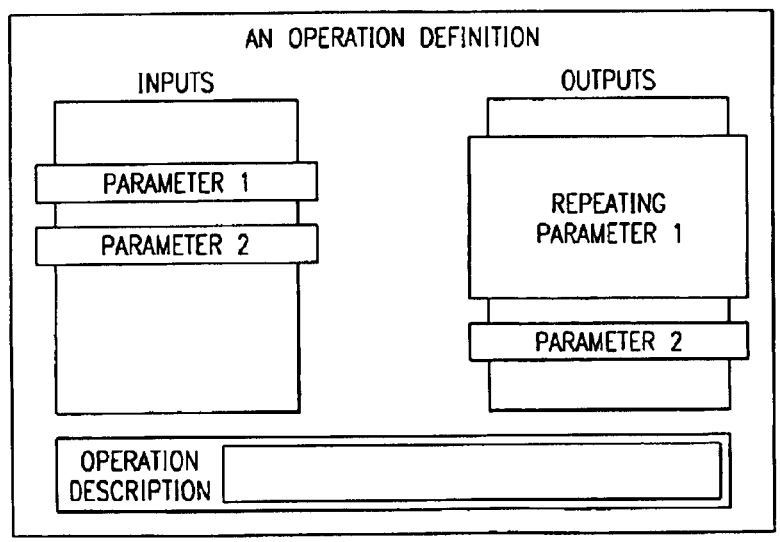
FIG. 2 is a schematic representation of an operation definition.
Figure 3:
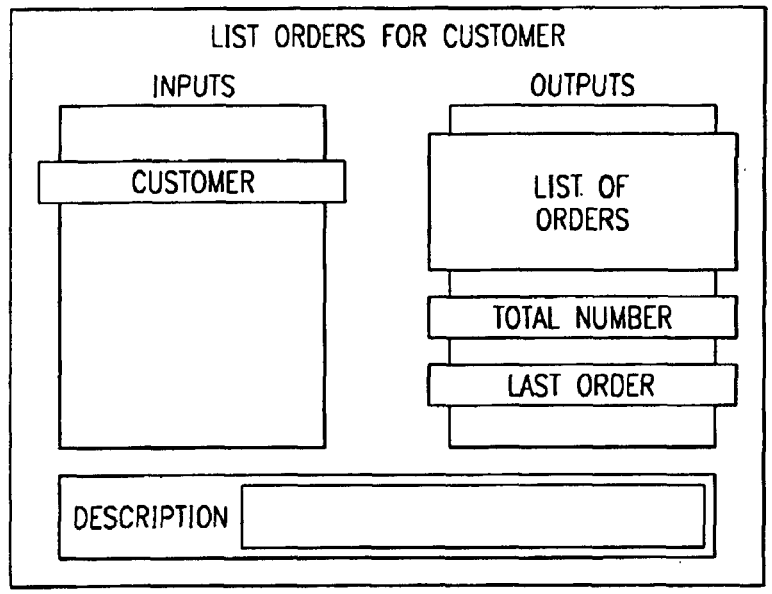
FIG. 3 is an example of an operation definition.
Figure 5:
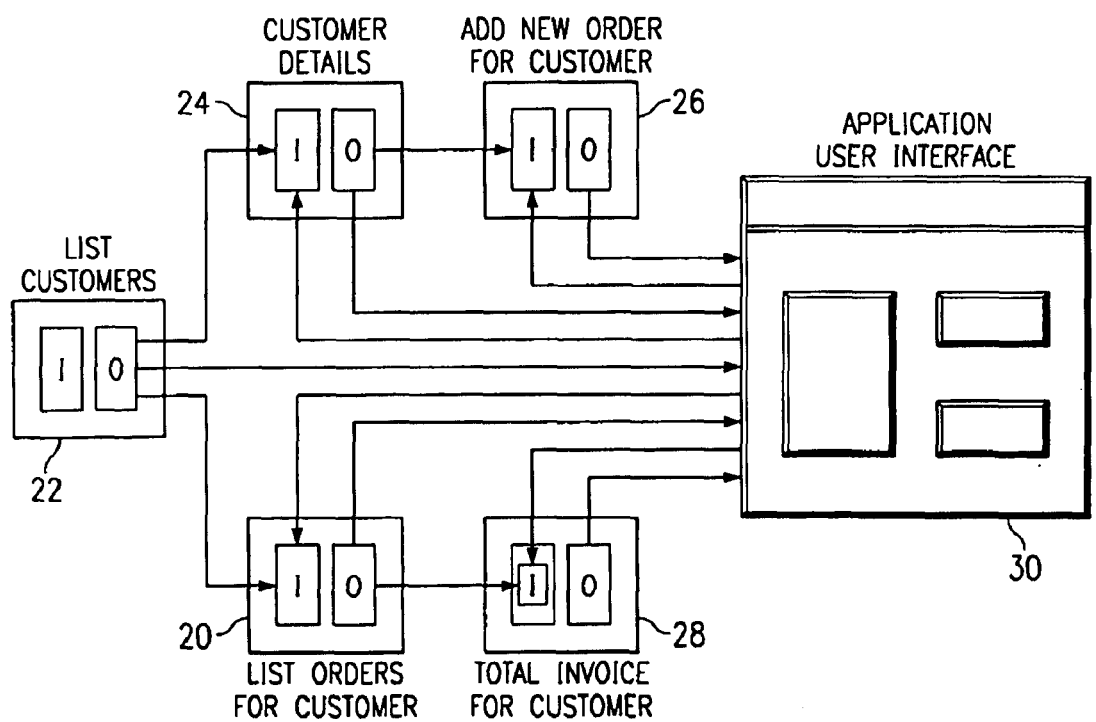
FIG. 5 is a schematic representation of information flows between operations and a user interface.
Figure 4:
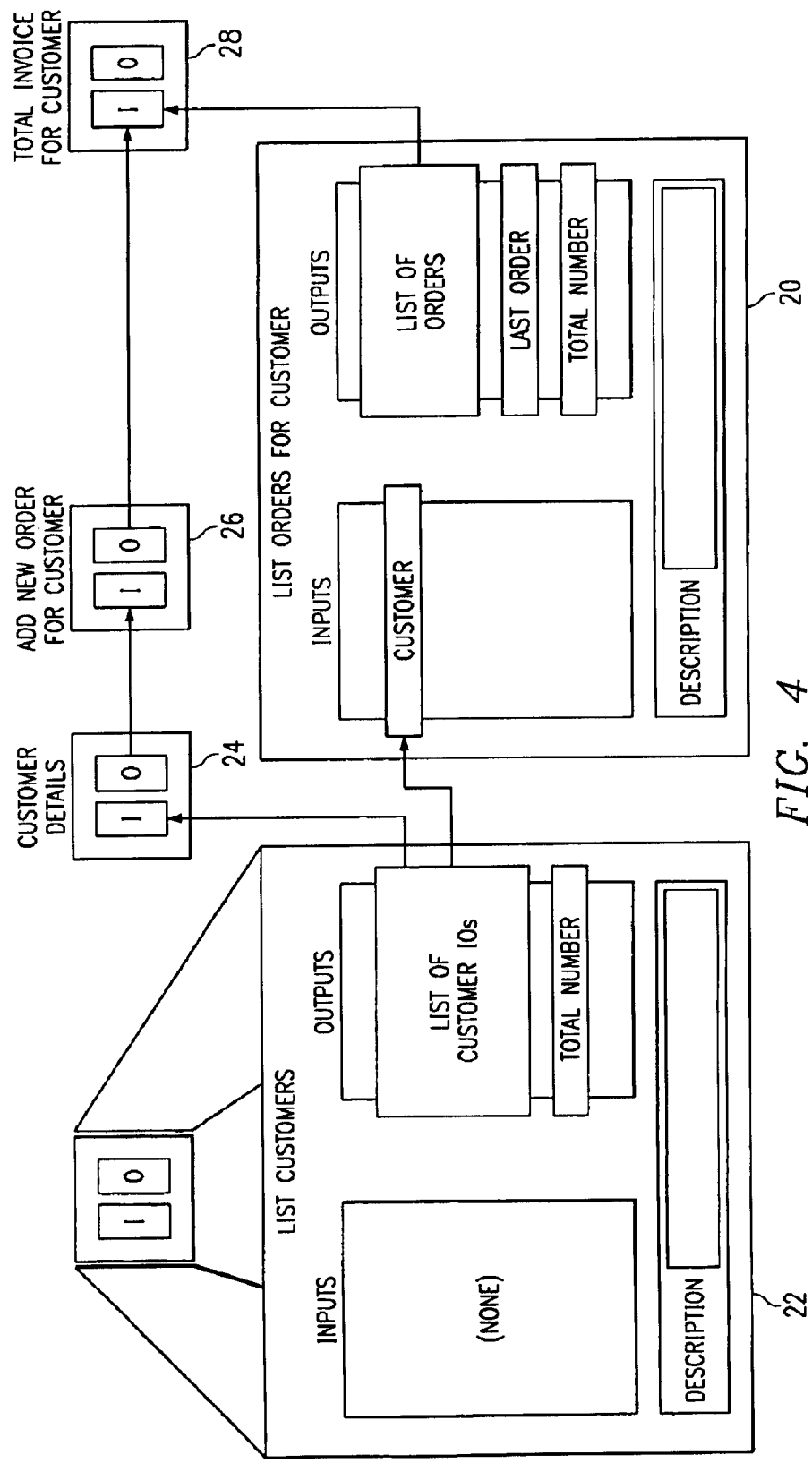
FIG. 4 is a schematic representation of information flows between operations.

As part of the configuration process the designer must identify a Business Task file that is the operational basis of the application, (see FIG. 2). The Business Task becomes an embedded part of the Visual Basic project by utilising the Business Task control.

Once a Business Task is identified, the Configuration tool copies the template framework into the project. The copied framework consists of a visible Visual Basic form (designated the Primary form) and controls and a library of subroutine code associated with that form and controls.

The configuration step also uses the Application Engine to create the Access database for the Application Views of the Business Task control, and sets the database as a property of the data source control.

Following this step the Visual Basic project can be saved as an executable image, or customised further, depending on user preference. The use of such a mechanism and template has the following advantages:

A library of specialised templates can be built up.

The template can be changed without altering the mechanism.

The mechanism can be changed without altering the template

The Layout Manager is responsible for building Visual Basic form definitions. After the project has been initially configured subsequent calls to the Add-In are forwarded directly to this utility.

The main task of the Layout Manager is to facilitate the placement (and removal) of Data Source controls, which correspond to specific Application View definitions, and Operation controls, which correspond to specific Operation Usage definitions.

Figure 43:
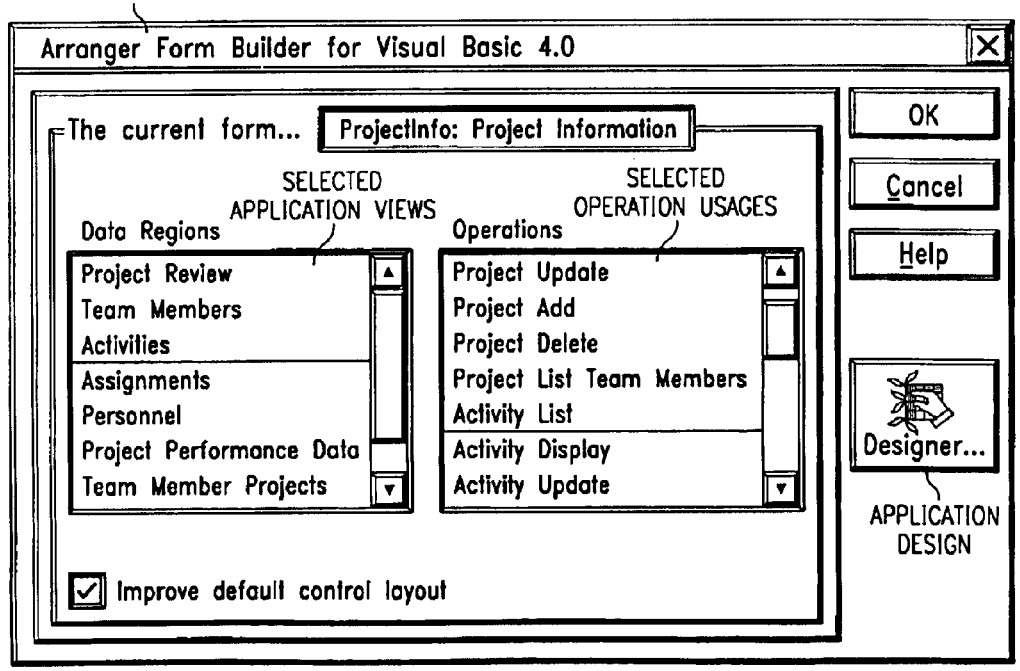
FIG. 43 illustrates a Layout Manager user interface.

FIG. 43 illustrates the user interface to the Layout Manager and user selected Application Views and operation usages. A Visual Basic form is configured for the designer by the Layout Manager. The Help file gives instructions to the user how to work with the placed controls to complete the desired form. It also includes instructions for the designer to control the visibility of the Primary form; (the designer may wish to hide this at runtime).

By clicking on the Design button the system will bring up the Application Design Tool (see FIG. 43). This allows the Application Design to be augmented or edited (as previously described). Once work in that tool is completed, the Layout Manager is updated to reflect the current state of the Application Design.

The designer may manually customise the application further using the resources provided by the Layout Manager. This is typically done by placing other visual controls (supplied by Microsoft or other third parties) on the Form and declaring an interaction between these controls and those initialised by the Layout Manager.

Figure 44:
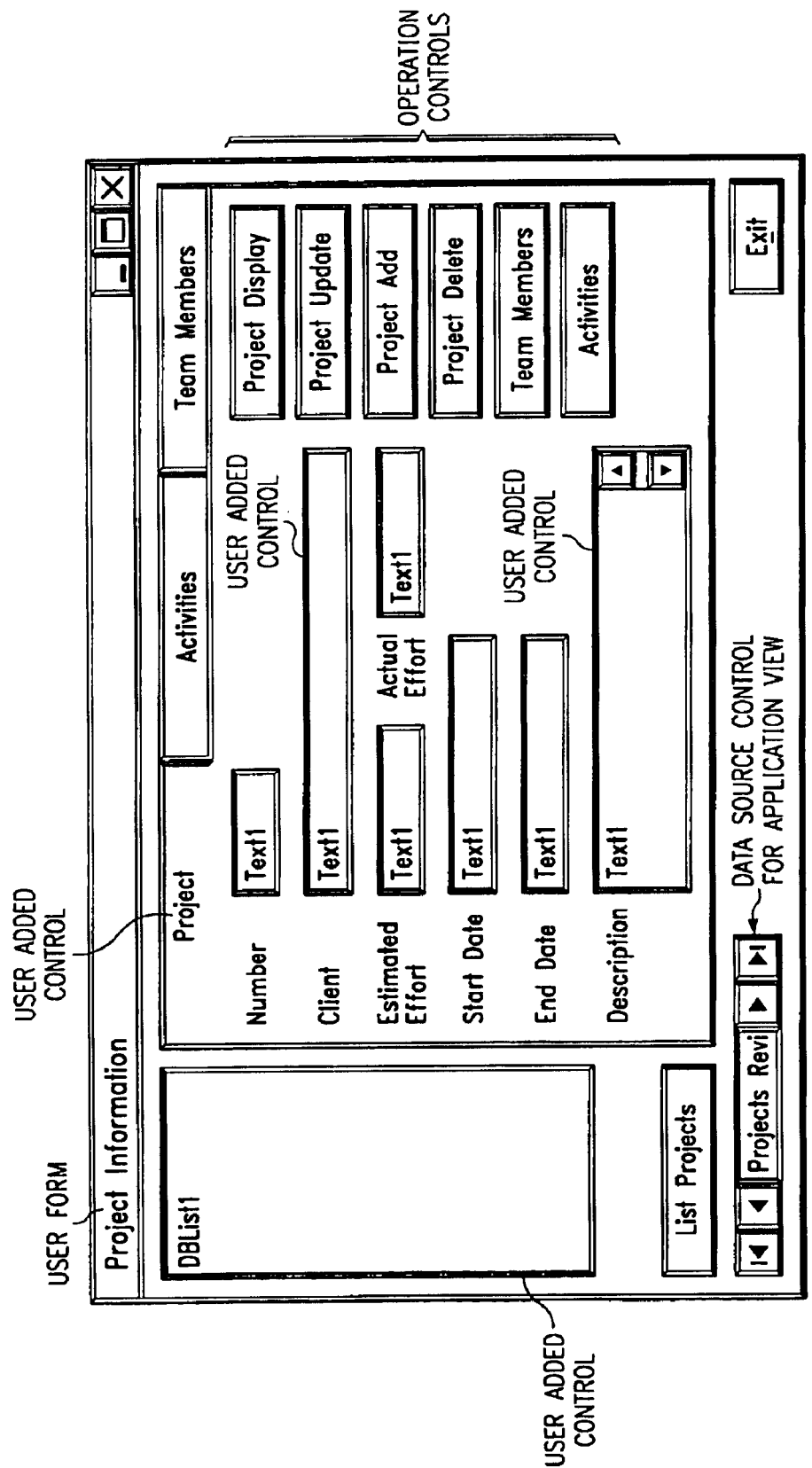
FIG. 44 illustrates the result of designer customisation.

For data bound controls the declaration of interaction is typically done through setting of properties on the control. For other control types, code would normally be written to provide the interaction. FIG. 44 shows the results of a typical form customisation session.

Figure 45:
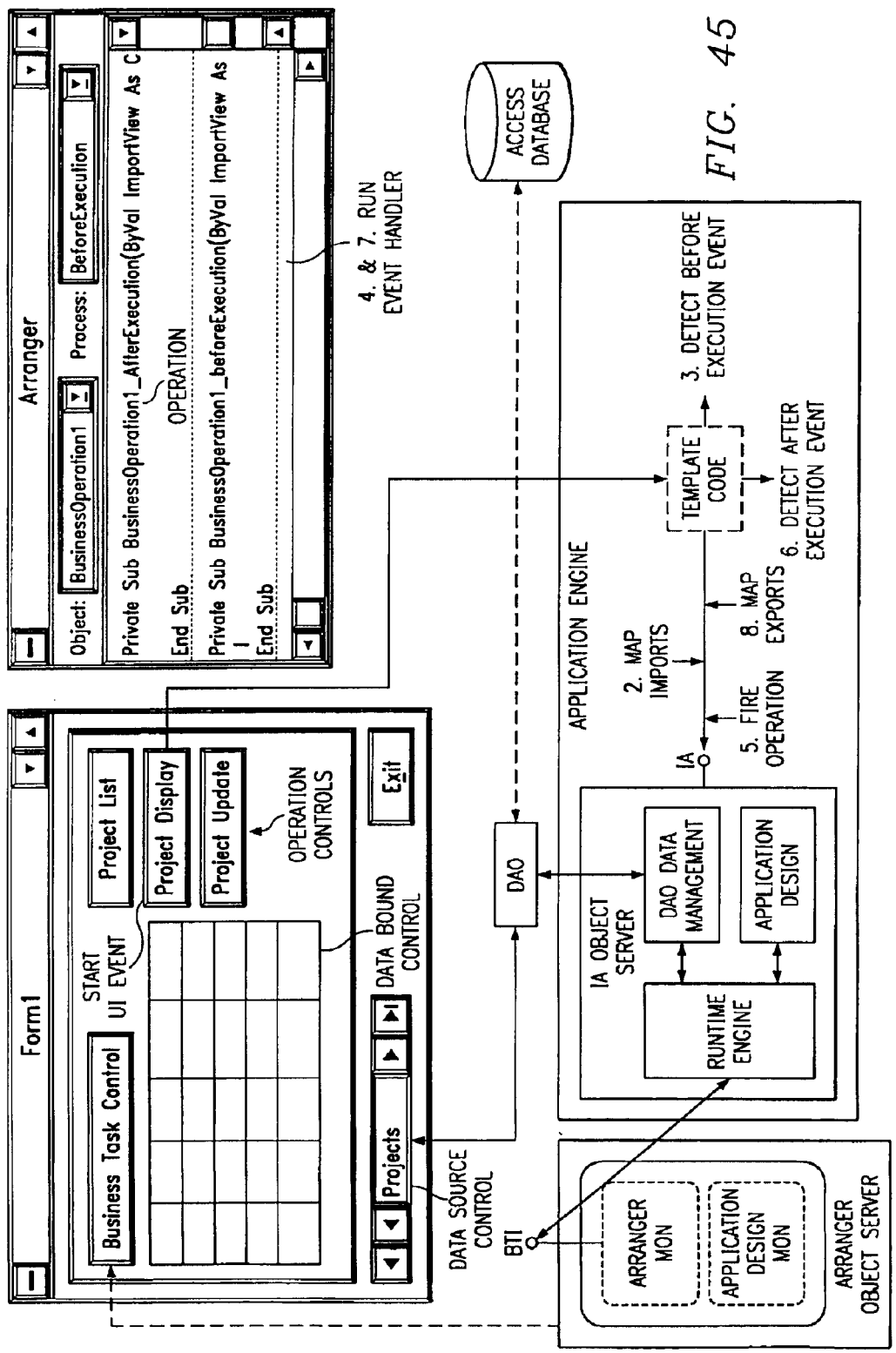
FIG. 45 illustrates components of an application at runtime and a sequence of actions in running an operation.

FIG. 45 show the architecture of a resulting application (and Application Test Tool) and the sequence of interaction for the elements involved in running an operation.

Figure 46:
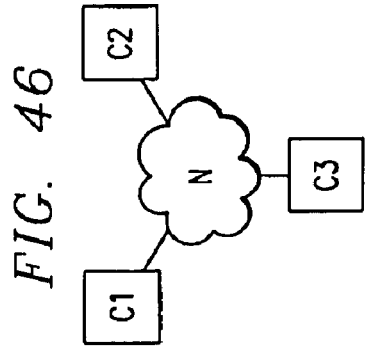
FIG. 46 is a schematic representation of a multicomputer distributed computing system on which an embodiment of the present application may be implemented.

FIG. 46 is a schematic representation of a multicomputer computing system comprising a plurality of computers C1, C2, C3, etc, connected via a network N. The individual computers can have any standard form. They can, for example, be microprocessor based personal computers, powerful workstations, mini computer systems or mainframe computers. The network N can be any form of network, whether a LAN, WAN, or a loosely connected network via the Internet or the like.

In a preferred embodiment of the invention, the design and runtime tools of the present invention are preferably implemented on one of the computers, for example computer Cl, in software in an appropriate environment, for example Microsoft's OLE environment mentioned above. The present invention can be used to manage applications distributed over the network using standard networking protocols. However, embodiments of the invention could equally be implemented on a stand-alone computer for managing an application within a single computer.

Although particular embodiments of the invention have been described, it will be appreciated that the invention is not limited thereto, and many modifications and/or additions may be made within the spirit and scope of the invention as defined in the appended claims. For example, different combinations of the features of the dependent claims may be combined with the features of the independent claims. Also, although further embodiments of the invention are implemented in software, it will be appreciated that alternative embodiments could implement at least some of the functions described above by means of special purpose hardware or firmware. Also, although a particular environment has been described, it will be appreciated that the application could be implemented for different environments.

What is claimed is:

1. A method for forming an object-based computer system comprising:
   providing a first existing executable module and a second existing executable module;
   determining a first operation associated with the first existing executable module;
   determining a second operation associated with the second existing executable module;
   determining a mapping between the first and second operations; and
   managing an interaction between the first and second operations based on the mapping.

2. The method according to claim 1, wherein the first and second existing executable modules respectively comprise an executable component object.

3. The method according to claim 2 and further comprising assembling the executable component objects to form an object-based application.

4. The method according to claim 2 and further comprising managing runtime interactions between the executable component objects.

5. The method according to claim 4, wherein managing the runtime interactions comprises configuring a user interface based on the mapping for managing the runtime interactions.

6. The method according to claim 1, wherein determining the mapping comprises specifying an intermediate representation of information for communication between the first and second operations.

7. The method according to claim 6, wherein the intermediate representation is associated with a user interface.

8. The method according to claim 6, wherein the intermediate representation indicates how the first operation responds to a user interface event.

9. The method according to claim 1, wherein determining the mapping comprises determining how a parameter associated with the first operation flows to the second operation.

10. The method according to claim 1 and further comprising managing a data value associated with the first operation when the first operation is invoked.

11. The method according to claim 1 and further comprising:
    mapping an output parameter associated with the first operation; and
    mapping an input parameter associated with the second operation.

12. The method according to claim 1, wherein the first operation has an associated field and further comprising generating a characteristic associated with the first operation based on the field and user input.

13. The method according to claim 1, wherein determining the mapping comprises determining a declarative mapping between a first parameter associated with the first operation and a second parameter associated with the second operation.

14. A system for forming an object-based computer system comprising:
    a first existing executable module;
    a second existing executable module;
    means for determining a first operation associated with the first existing executable module;
    means for determining a second operation associated with the second existing executable module;
    means for determining a mapping between the first and second operations; and
    means for managing an interaction between the first and second operations based on the mapping.

15. The system according to claim 14, wherein the first and second existing executable modules respectively comprise an executable component object.

16. The system according to claim 15 and further comprising means for assembling the executable component objects to form an object-based application.

17. The system according to claim 15 and further comprising means for managing runtime interactions between the executable component objects.

18. The system according to claim 17, wherein the means for managing the runtime interactions comprises means for configuring a user interface based on the mapping for managing the runtime interactions.

19. The system according to claim 14, wherein the means for determining the mapping comprises means for specifying an intermediate representation of information for communication between the first and second operations.

20. The system according to claim 14, wherein means for determining the mapping comprises means for determining how a parameter associated with the first operation flows to the second operation.

21. The system according to claim 14 and further comprising:
    means for mapping an output parameter associated with the first operation; and
    means for mapping an input parameter associated with the second operation.

22. The system according to claim 14, wherein the first operation has an associated field and further comprising means for generating a characteristic associated with the first operation based on the field and user input.

23. The system according to claim 14, wherein the means for determining the mapping comprises means for determining a declarative mapping between a first parameter associated with the first operation and a second parameter associated with the second operation.

24. A system for forming an object-based computer system comprising software stored on storage and operable to:

provide a first existing executable module and a second existing executable module;

determine a first operation associated with the first existing executable module;

determine a second operation associated with the second existing executable module;

determine a mapping between the first and second operations; and manage an interaction between the first and second operations based on the mapping.

25. A method for forming an object-based computer system comprising:

providing a first existing executable component object and a second existing executable component object;

determining a first operation associated with the first existing executable component object;

determining a second operation associated with the second existing executable component object;

mapping an output parameter associated with the first operation to an input parameter associated with the second operation;

managing the flow of the output parameter to the input parameter based on the mapping;

assembling the first and second executable component objects to form an object-based application;

configuring a user interface based on the mapping for managing the runtime interactions between the output parameter and the input parameter; and managing a data value associated with the first operation when the first operation is invoked.

* * * * *